US012757257B2

(12) United States Patent
Ko et al.

(10) Patent No.: US 12,757,257 B2
(45) Date of Patent: Oct. 6, 2026

(54) WIRELESS COMMUNICATION METHOD USING MULTI-LINK, AND WIRELESS COMMUNICATION TERMINAL USING SAME

(71) Applicant: WILUS INSTITUTE OF STANDARDS AND TECHNOLOGY INC., Gyeonggi-do (KR)

(72) Inventors: Geonjung Ko, Gyeonggi-do (KR); Juhyung Son, Gyeonggi-do (KR); Sanghyun Kim, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 251 days.

(21) Appl. No.: 18/232,806

(22) Filed: Aug. 10, 2023

(65) Prior Publication Data

US 2024/0049304 A1 Feb. 8, 2024

Related U.S. Application Data

(63) Continuation of application No. PCT/KR2022/002057, filed on Feb. 10, 2022.

(30) Foreign Application Priority Data

Feb. 10, 2021 (KR) ........................ 10-2021-0019409
Feb. 19, 2021 (KR) ........................ 10-2021-0022885
Apr. 22, 2021 (KR) ........................ 10-2021-0052041

(51) Int. Cl.
*H04W 74/0833* (2024.01)
*H04L 69/14* (2022.01)
(Continued)

(52) U.S. Cl.
CPC ..... *H04W 74/085* (2013.01); *H04W 74/0866* (2013.01)

(58) Field of Classification Search
CPC ........... H04W 74/085; H04W 74/0866; H04W 74/004; H04W 74/006; H04W 74/06;
(Continued)

(56) References Cited

U.S. PATENT DOCUMENTS 11,653,416 B2 5/2023 Das et al.
2016/0157266 A1 6/2016 Wang et al.
(Continued)

FOREIGN PATENT DOCUMENTS

CN 106063368 A * 10/2016 ........ H04W 28/0205
CN 112188563 A * 1/2021 ............ H04W 72/20
(Continued)

OTHER PUBLICATIONS

Sharon et al., "Advanced IEEE 802.11ax TCP aware scheduling under unreliable channels," arXiv:1803.10649v1 [cs.NI] Mar. 27, 2018. (Year: 2018).*
(Continued)

*Primary Examiner* — Alina A Boutah
(74) *Attorney, Agent, or Firm* — EIP US LLP

(57) ABSTRACT

Disclosed is a method by which a station (STA) transmits a frame in a wireless communication system. The STA according to the present invention receives, from an access point (AP), a trigger frame indicating uplink transmission, and transmits a physical layer protocol data unit (PPDU) to the AP and/or another STA within a shared transmission opportunity (TXOP), on the basis of the trigger frame. Here, the trigger frame is used to share, with the STA, a part or all of the TXOP obtained by the AP. Also, the PPDU includes duration information indicating the TXOP for transmission
(Continued)

of the PPDU, and the duration information is configured on the basis of the shared TXOP.

12 Claims, 29 Drawing Sheets

(51) Int. Cl.

| | |
|---|---|
| ***H04W 72/50*** | (2023.01) |
| ***H04W 74/00*** | (2009.01) |
| ***H04W 74/06*** | (2009.01) |
| ***H04W 74/08*** | (2024.01) |

(58) Field of Classification Search
CPC ........... H04W 74/0816; H04W 74/002; H04W 76/15; H04W 84/12; H04W 72/535; H04L 69/14
See application file for complete search history.

(56) References Cited

U.S. PATENT DOCUMENTS

| | | | | |
|---|---|---|---|---|
| 2016/0262173 | A1* | 9/2016 | Josiam | H04W 72/543 |
| 2016/0315681 | A1* | 10/2016 | Moon | H04W 74/0816 |
| 2016/0330764 | A1 | 11/2016 | Kim et al. | |
| 2017/0127451 | A1 | 5/2017 | Chun et al. | |
| 2018/0014302 | A1* | 1/2018 | Asterjadhi | H04W 52/365 |
| 2018/0027591 | A1 | 1/2018 | Shinohara et al. | |
| 2018/0146426 | A1* | 5/2018 | Park | H04L 27/2603 |
| 2018/0184401 | A1* | 6/2018 | Ghosh | H04W 72/04 |
| 2018/0324851 | A1 | 11/2018 | Zhang et al. | |
| 2018/0359807 | A1 | 12/2018 | Kim et al. | |
| 2019/0021091 | A1* | 1/2019 | Ko | H04W 72/0453 |
| 2019/0373599 | A1 | 12/2019 | Ghosh et al. | |
| 2020/0045723 | A1* | 2/2020 | Chun | H04W 72/23 |
| 2021/0127420 | A1* | 4/2021 | Lu | H04W 74/0808 |
| 2021/0195540 | A1* | 6/2021 | Fischer | H04W 56/0005 |
| 2021/0337564 | A1* | 10/2021 | Kwon | H04W 72/0446 |
| 2022/0174732 | A1* | 6/2022 | Xia | H04W 16/14 |
| 2022/0264566 | A1 | 8/2022 | Chu et al. | |
| 2023/0413327 | A1* | 12/2023 | Kim | H04W 74/0816 |

FOREIGN PATENT DOCUMENTS

| | | | | | |
|---|---|---|---|---|---|
| CN | 107439035 | B | * | 4/2021 | H04W 72/21 |
| CN | 113676298 | A | * | 11/2021 | H04W 72/0446 |
| DE | 102020128477 | A1 | * | 4/2021 | H04W 74/0808 |
| JP | 2016-136725 | | | 7/2016 | |
| JP | 7683961 | A | | 5/2025 | |
| JP | 2016511580 | A | | 4/2026 | |
| KR | 10-2164966 | | | 10/2020 | |
| KR | 10-2212170 | | | 2/2021 | |
| KR | 20210032292 | A | * | 3/2021 | H04W 74/0816 |
| WO | 2016/136725 | | | 9/2016 | |
| WO | 2016/200182 | | | 12/2016 | |
| WO | WO-2020050541 | A1 | * | 3/2020 | H04W 72/535 |
| WO | 2020225474 | A1 | | 11/2020 | |
| WO | 2022/056009 | | | 3/2022 | |
| WO | 2022/173251 | | | 8/2022 | |
| WO | 2022/198546 | | | 9/2022 | |
| WO | 2022/212468 | | | 10/2022 | |
| WO | WO-2022212468 | A1 | * | 10/2022 | H04W 74/085 |

OTHER PUBLICATIONS

Charfi et al., "IEEE 802.11ac TXOP sharing technique: Performance evaluation," 2016 12th Annual Conference on Wireless On-demand Network Systems and Services (WONS), Laboratory of Electronics and Information Technologies (LETI), University of Sfax, National School of Engineering. (Year: 2016).*
Office Action dated Jun. 17, 2024 for Japanese Patent Application No. 2023-548732 and its English translation provided by Applicant's foreign counsel.
Yunbo Li et al.: "NAV Setting in Multi-AP Operation", doc.: IEEE 802.11-20/0644r0, Apr. 10, 2020, slides 1-9.
International Search Report for PCT/KR2022/002057 mailed on May 12, 2022 and its English translation from WIPO (now published as WO 2022/173251).
Written Opinion of the International Searching Authority for PCT/KR2022/002057 mailed on May 12, 2022 and its English translation from WIPO (now published as WO 2022/173251).
Das, Dibakar et al.: "MAC: Triggered SU Operation", doc.: IEEE 802.11-yy/xxxxr0, Jan. 31, 2021, pp. 1-3.
Stanley, Dorothy (HP Enterprise): "Liaison from ITU-T Focus Group on Vehicular Multimedia", doc.: IEEE 802.11-20/0223r0, Jan. 17, 2020, pp. 1-4.
Das, Dibakar, Intel et al.: "Resolving TBDs in Triggered SU operation", doc.: IEEE 802.11-14/0270r0, Feb. 1, 2021, slides 1-14.
LAN/MAN Standards Committee of IEEE Computer Society: "Draft Standard for Information technology _ Telecommunications and information exchange between systems Local and metropolitan area networks _ Specific requirements Part 11: Wireless LAN Medium Access Control (MAC) and Physical Layer (PHY) Specifications Amendment 8: Enhancements for extremely high throughput (EHT)", IEEE P802.11beTM/D0.3, Jan. 3, 2021, pp. 1-389.
Office Action dated Nov. 25, 2024 for Japanese Patent Application No. 2023-548732 and its English translation provided by Applicant's foreign counsel.
Geonjung Ko (Wilus): "Issues on BSS Color Bits Collision", doc.: IEEE 802.11-16/0396r0, Mar. 14, 2016, slides 1-18.
Geonjung Ko (Wilus): "Bss Color Collision", doc.: IEEE 802.11-16/0640r0, May 16, 2017, slides 1-13.
Indian Examination Report dated 2026-02-04 for Indian Patent Application No. 202327053980.
Japanese Office Action dated Feb. 13, 2026 for Japanese Patent Application No. 2025-078096.
Korean Office Action dated Feb. 27, 2026 for Korean Patent Application No. 10-2023-7027023.
Nunez et al.: TXOP sharing with Coordinated Spatial Reuse in Multi-AP Cooperative IEEE 802.11be WLANs; Dec 21, 2021 arXiv:2112.00515v2 [cs.NI] 7 pages.
Japanese Decision of Refusal in JP Appln. No. 2025078096, dated Jun. 23, 2026, 7 pages with English Translation.
Chinese Office Action in CN Appln. No. 202280014346.X, dated Jul. 9, 2026, 30 pages with English Translation.
IEEE P802.11, Wireless LANs, "MAC: Triggered SU Operation", Jan. 2021, 5 pages.
IEEE P802.11, Wireless LANs, "PDT: Channel Access for Triggered TXOP Sharing", Mar. 2021, 5 pages.

* cited by examiner

FIG. 16

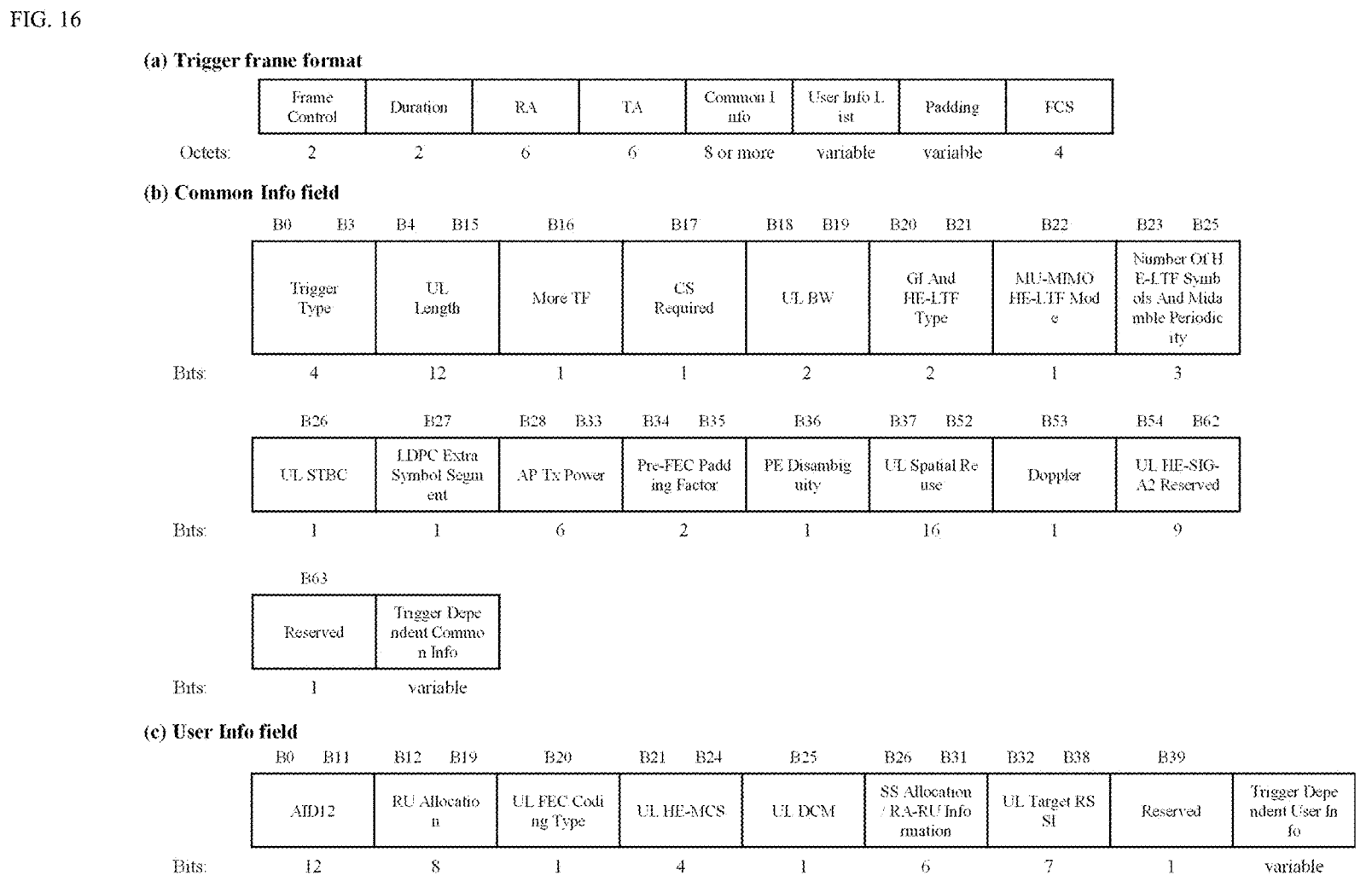

(a) Trigger frame format

| | | | | | | | | |
|---|---|---|---|---|---|---|---|---|
| | Frame Control | Duration | RA | TA | Common I nfo | User Info L ist | Padding | FCS |
| Octets: | 2 | 2 | 6 | 6 | 8 or more | variable | variable | 4 |

(b) Common Info field

| | | | | | | | | |
|---|---|---|---|---|---|---|---|---|
| | B0 B3 | B4 B15 | B16 | B17 | B18 B19 | B20 B21 | B22 | B23 B25 |
| | Trigger Type | UL Length | More TF | CS Required | UL BW | GI And HE-LTF Type | MU-MIMO HE-LTF Mod e | Number Of H E-LTF Symb ols And Mida mble Periodic ity |
| Bits: | 4 | 12 | 1 | 1 | 2 | 2 | 1 | 3 |

| | | | | | | | | |
|---|---|---|---|---|---|---|---|---|
| | B26 | B27 | B28 B33 | B34 B35 | B36 | B37 B52 | B53 | B54 B62 |
| | UL STBC | LDPC Extra Symbol Segm ent | AP Tx Power | Pre-FEC Padd ing Factor | PE Disambig uity | UL Spatial Re use | Doppler | UL HE-SIG-A2 Reserved |
| Bits: | 1 | 1 | 6 | 2 | 1 | 16 | 1 | 9 |

| | | |
|---|---|---|
| | B63 | |
| | Reserved | Trigger Depe ndent Commo n Info |
| Bits: | 1 | variable |

(c) User Info field

| | | | | | | | | | |
|---|---|---|---|---|---|---|---|---|---|
| | B0 B11 | B12 B19 | B20 | B21 B24 | B25 | B26 B31 | B32 B38 | B39 | |
| | AID12 | RU Allocatio n | UL FEC Codi ng Type | UL HE-MCS | UL DCM | SS Allocation / RA-RU Info rmation | UL Target RS SI | Reserved | Trigger Depe ndent User In fo |
| Bits: | 12 | 8 | 1 | 4 | 1 | 6 | 7 | 1 | variable |

FIG. 17

| AID12 subfield | Description |
|---|---|
| 0 | User Info field allocates one or more contiguous RA-RUs for associated STAs |
| 1-2007 | User Info field is addressed to an associated STA whose AID is equal to the value in the AID12 subfield |
| 2008-2044 | Reserved |
| 2045 | User Info field allocates one or more contiguous RA-RUs for unassociated STAs |
| 2046 | Unallocated RU |
| **2047** | **Response to the Trigger frame is transmitted in EHT TB PPDU** |
| **2048** | **Response to the Trigger frame is transmitted in NEXT TB PPDU** |
| 2049-4094 | Reserved |
| 4095 | Start of Padding field |

| | Frame Control | Duration | RA | TA | Common I nfo (Type: MU -RTS) | User Info (AID12: 20 07) | Padding | FCS |
|---|---|---|---|---|---|---|---|---|
| Octets: | 2 | 2 | 6 | 6 | 8 or more | | variable | 4 |

FIG. 22

WIRELESS COMMUNICATION METHOD USING MULTI-LINK, AND WIRELESS COMMUNICATION TERMINAL USING SAME

CROSS-REFERENCE TO RELATED APPLICATIONS

This application is a continuation of International Patent Application No. PCT/KR2022/002057 filed on Feb. 10, 2022, which claims the priority to Korean Patent Application No. 10-2021-0019409 filed in the Korean Intellectual Property Office on Feb. 10, 2021, Korean Patent Application No. 10-2021-0022885 filed in the Korean Intellectual Property Office on Feb. 19, 2021, and Korean Patent Application No. 10-2021-0052041 filed in the Korean Intellectual Property Office on Apr. 22, 2021, the entire contents of which are incorporated herein by reference.

TECHNICAL FIELD

The present invention relates to a wireless communication method using multi-link and a wireless communication terminal using same and, particularly, to a method and a terminal for setting a TXOP to transmit and receive data.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11 ad has been provided. The IEEE 802.11 ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band. IEEE 802.11be has proposed technologies including a 30 MHz bandwidth, a multi-link operation, a multi-access point (multi-AP) operation, and a retransmission operation (hybrid automatic repeat request HARQ), etc.

A multi-link operation may be performed in various types according to the operation scheme and implementation method thereof. However, this operation may face a problem that has not occurred in a conventional IEEE 802.11-based wireless LAN communication operation, and thus a definition for a detailed operation method of a multi-link operation is needed.

Meanwhile, this background section is written for improving understanding of the background of the disclosure, and may include contents other than a prior art already known to a person skilled in the art.

DISCLOSURE OF INVENTION

Technical Problem

An aspect of the present invention to provide a method and a device for transmitting and receiving data through setting of a transmission opportunity (TXOP) in a multi-link operation.

Furthermore, an aspect of the present invention is to provide a method and a device which allow a non-AP STA to share a TXOP set by an access point (AP), so that the non-AP STAs can transmit and receive data.

Furthermore, an aspect of the present invention is to provide a method and a device for setting a network allocation vector (NAV) in order for a non-AP STA to transmit and receive data within a shared TXOP.

Technical tasks to be achieved in the specification are not limited to the above-described technical tasks. Other technical tasks, which have not been described above, may be clearly understood by a person skilled in the art to which the present invention belongs from the description below.

Solution to Problem

A station (STA) in a wireless communication system may include a transceiver and a processor configured to control the transceiver, wherein the processor is configured to receive a trigger frame indicating uplink transmission from an access point (AP), the trigger frame being used to allow the STA to share a part or all of a transmission opportunity (TXOP) acquired by the AP, and transmit a physical layer protocol data unit (PPDU) to the AP and/or another STA within the shared TXOP based on the trigger frame, the PPDU including duration information indicating a TXOP for transmission of the PPDU, and the duration information being set based on the shared TXOP.

Furthermore, in the present invention, an end time point of duration indicated by the duration information is identical to an end time point of the shared TXOP.

Furthermore, in the present invention, the duration indicated by the duration information ends before the end time point of the shared TXOP.

Furthermore, in the present invention, in case that a network allocation vector (NAV) is set by a frame transmitted by the AP within the TXOP, the PPDU is transmitted regardless of the set NAV within the shared TXOP.

Furthermore, in the present invention, in case that another STA sets, based on the trigger frame, a NAV and a NAV timeout period indicating an end time of the NAV within the shared TXOP, even when the NAV timeout period expires within the shared TXOP, the NAV set by the other STA within the shared TXOP is not be reset by the expiration of the NAV timeout period.

Furthermore, in the present invention, the trigger frame includes a subfield indicating whether the TXOP is shared by the trigger frame.

Furthermore, in the present invention, in case that the subfield indicates sharing of the TXOP, a value of the subfield indicates whether transmission to or reception from the other STA is possible within the shared TXOP.

Furthermore, in the present invention, the trigger frame includes a type field indicating a type of the trigger frame, and the sharing of the part or all of the TXOP is set based on the type of the trigger frame indicated by the type field.

Furthermore, the present invention provides a method including, receiving a trigger frame indicating uplink transmission from an access point (AP), the trigger frame being used to allow the STA share a part or all of a transmission opportunity (TXOP) acquired by the AP, and transmitting, based on the trigger frame, a physical layer protocol data unit (PPDU) to the AP and/or another STA within the shared TXOP, the PPDU including duration information indicating a TXOP for transmission of the PPDU, and the duration information being configured based on the shared TXOP.

Advantageous Effects of Invention

According to an embodiment of the present invention, a TXOP set by an AP is shared with a non-AP STA, and thus the non-AP STA may efficiently transmit and receive data.

Furthermore, according to an embodiment of the present invention, within the shared TXOP, the non-AP STA may efficiently transmit data by setting an NAV for transmission and reception of data based on the shared TXOP or interpreting the set NAV based on the shared TXOP.

The effects which can be obtained from the present invention are not limited to the above-described effects and other effects that have not been described will be clearly understood by a person skilled in the art, to which the present invention belongs, from the following description.

BRIEF DESCRIPTION OF DRAWINGS

FIG. 16 illustrates a trigger frame format according to an embodiment of the present invention.

FIG. 17 illustrates a method for soliciting a trigger-based (TB) PPDU format according to an embodiment of the present invention.

FIG. 22 illustrates an example of a trigger frame for sharing a TXOP according to an embodiment of the present invention.

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is “coupled” to another element, the element may be “directly coupled” to the other element or “electrically coupled” to the other element through a third element. Further, unless explicitly described to the contrary, the word “comprise” and variations such as “comprises” or “comprising”, will be understood to imply the inclusion of stated elements but not the exclusion of any other elements. Moreover, limitations such as “or more” or “or less” based on a specific threshold may be appropriately substituted with “more than” or “less than”, respectively. Hereinafter, in the present invention, a field and a subfield may be interchangeably used.

Figure 1:
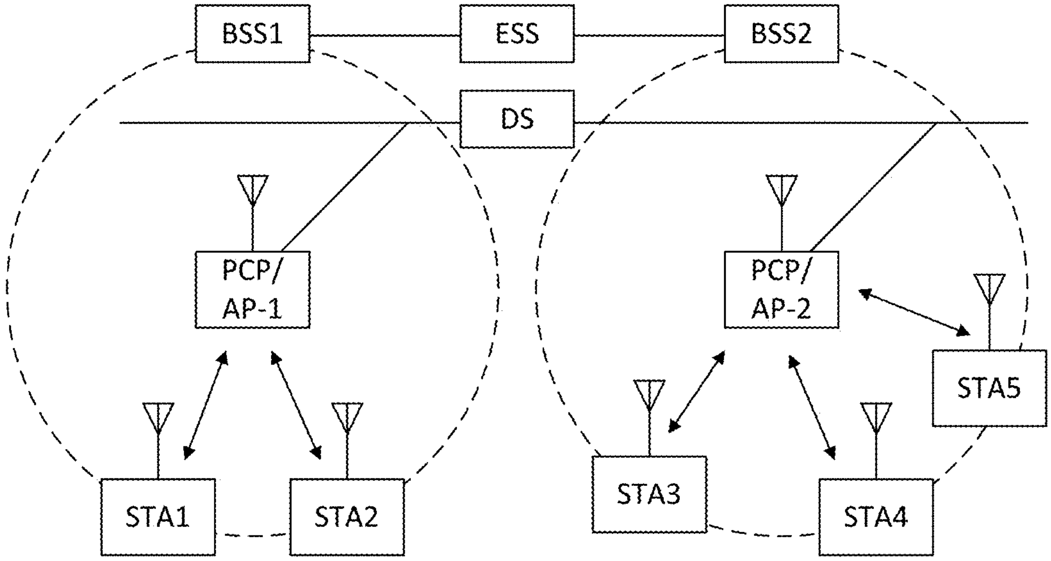
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term ‘terminal’ may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
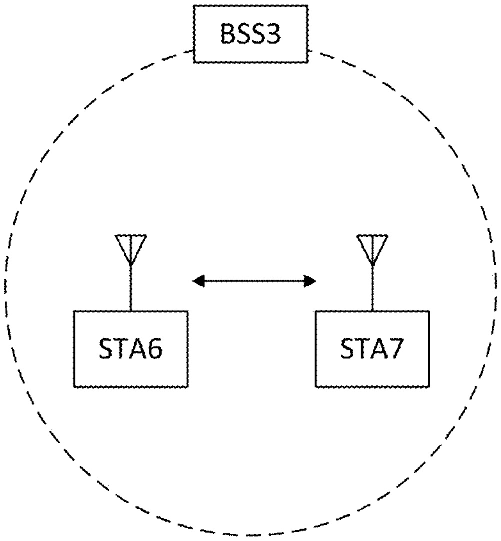
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
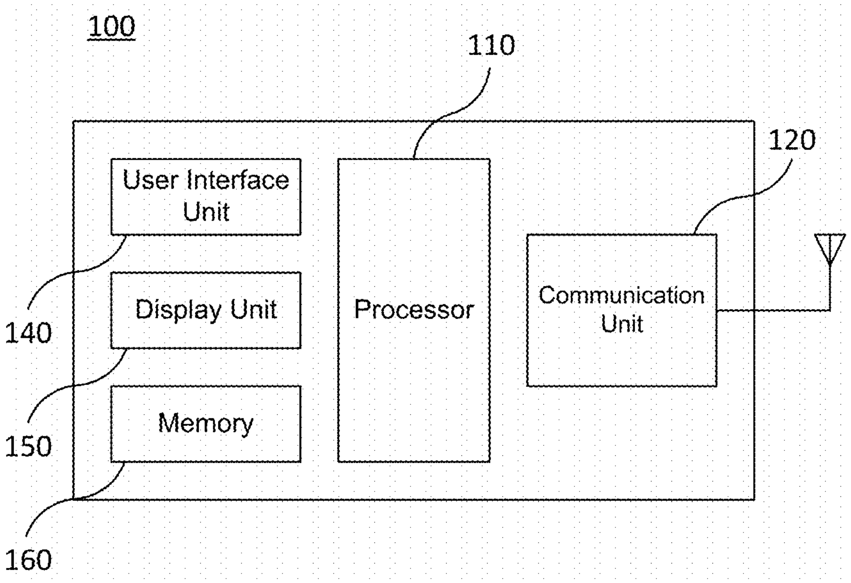
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
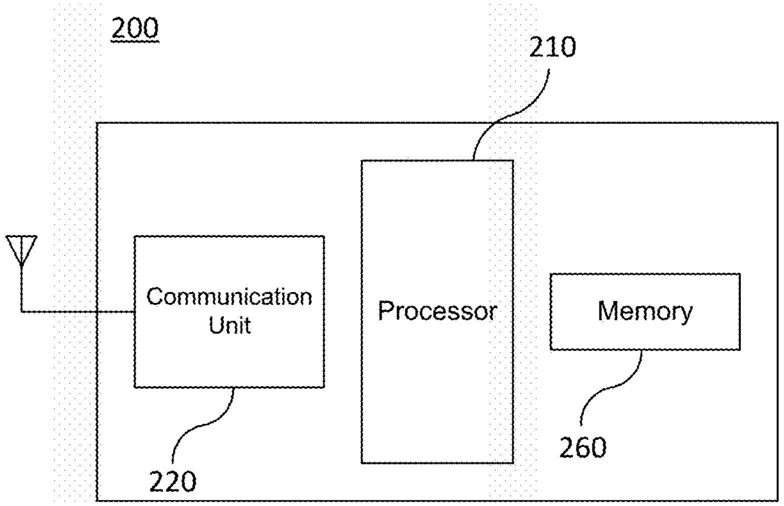
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
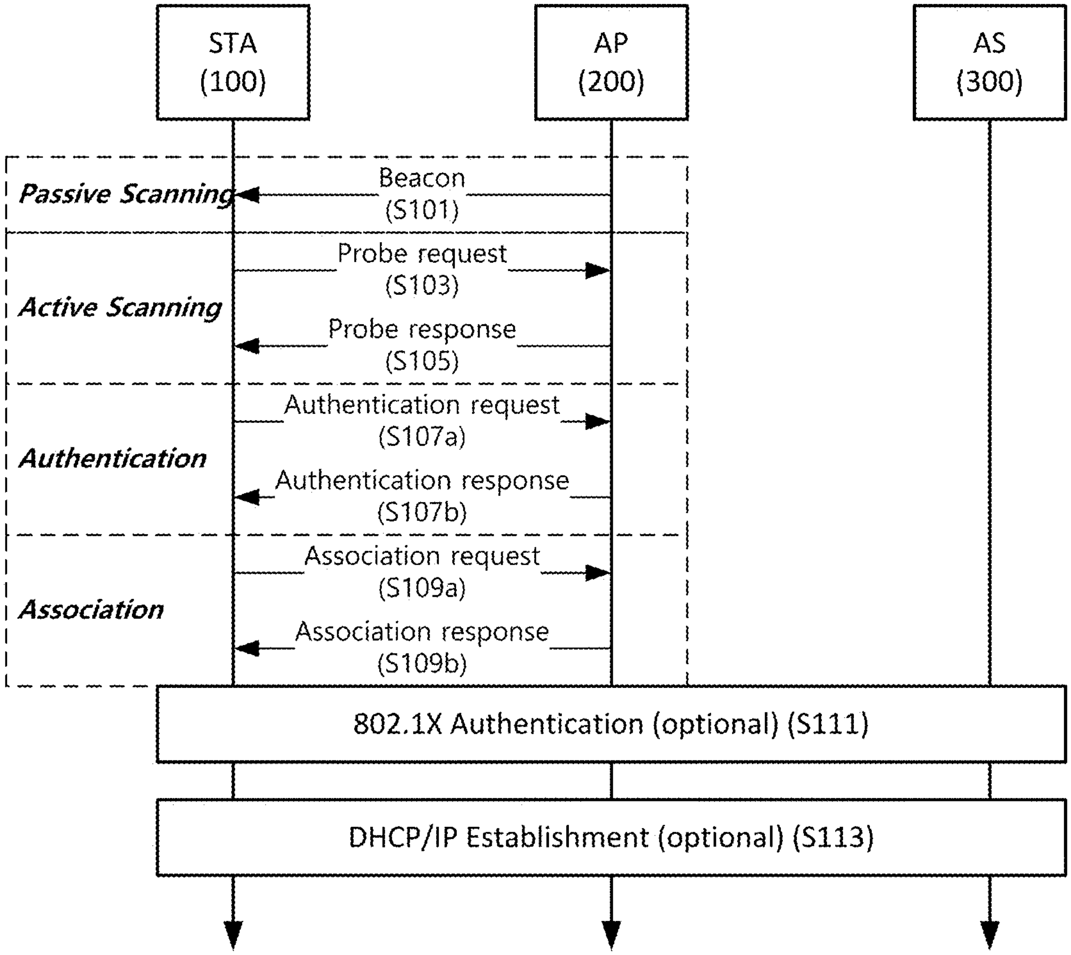
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
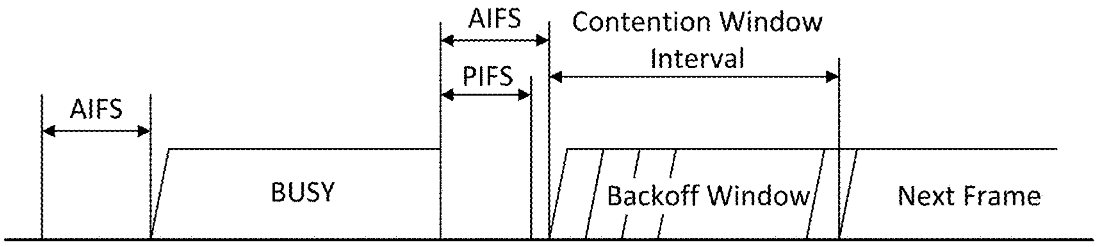
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Hereinafter, a terminal of the present invention is referred to as a non-AP STA, an AP STA, an AP, a STA, a receiving device or a transmitting device, but the present invention is not limited thereto. In addition, the AP STA of the present invention may be referred to as the AP.

Examples of Various PPDU Formats

Figure 7:
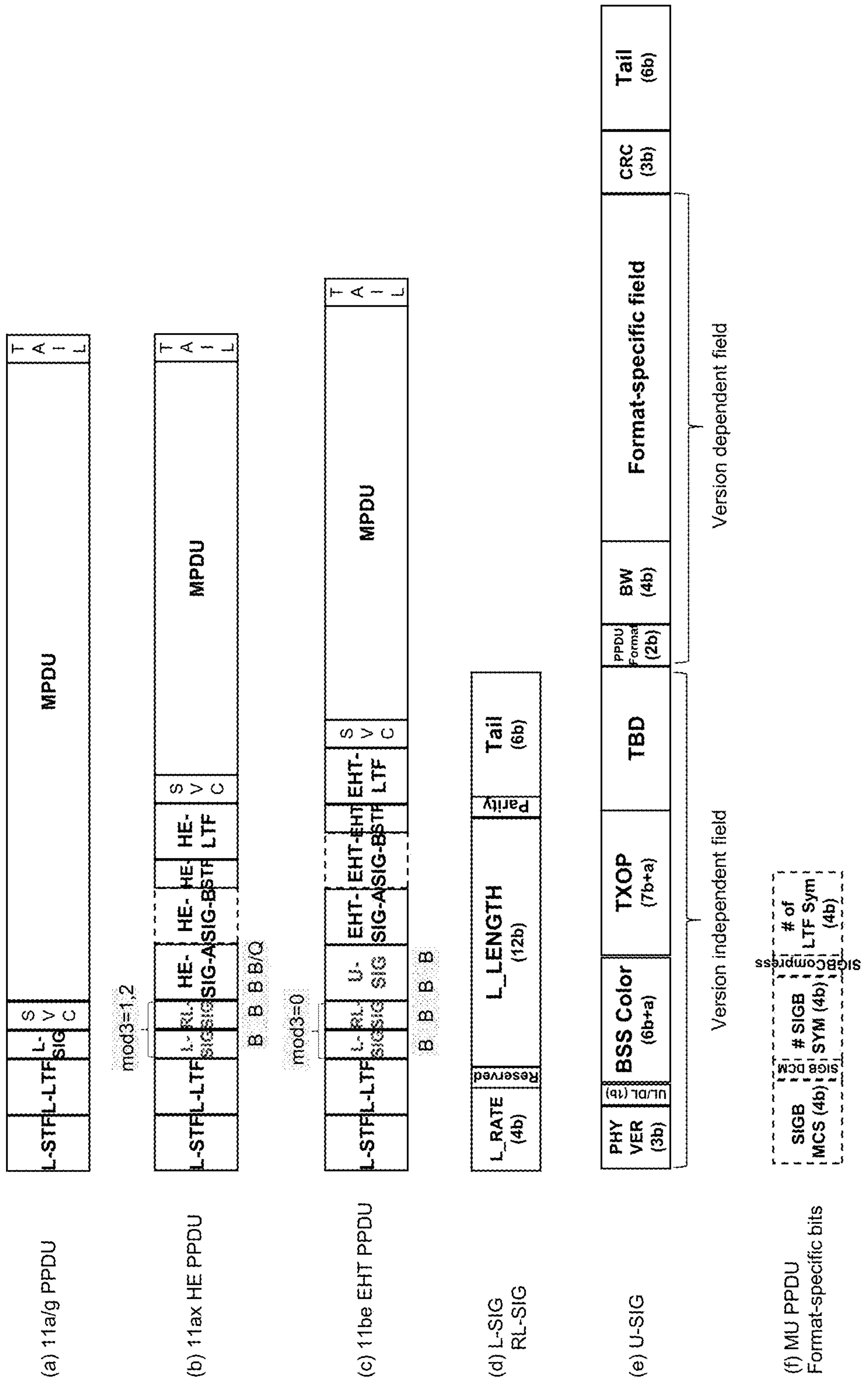
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(*a*) illustrates an embodiment of a legacy PPDU format based on 802.11a/g, FIG. 7(*b*) illustrates an embodiment of an HE PPDU format based on 802.11ax, and FIG. 7(*c*) illustrates an embodiment of a non-legacy PPDU (i.e., EHT PPDU) format based on 802.11be. FIG. 7(*d*) illustrates detailed field configurations of RL-SIG and L-SIG commonly used in the PPDU formats.

Referring to FIG. 7(*a*), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(*b*), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(*c*), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(*d*) illustrates a 24-bit information configuration of L-SIG.

Referring to FIG. 7(*d*), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-QAM/64-QAM, etc. and an inefficiency of ½, ⅔, ¾, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

Firstly, a method of interpreting the length of the PPDU by the legacy terminal and the non-legacy terminal by using the L_LENGTH field is described below. When a value of the L_RATE field is configured to indicate 6 Mbps, 3 bytes during 4 us which is one symbol duration of 64 FET (i.e., 24 bits) may be transmitted. Therefore, the 64 FET standard symbol number after an L-SIG is acquired by adding 3 bytes corresponding to a SVC field and a Tail field to the L_LENGTH field value and then dividing the same by 3 bytes which is a transmission amount of one symbol. When multiplying the acquired symbol number by 4 us which is one symbol duration and then adding 20 us which is consumed to transmit the L-STF, the L-LTF, and the L-SIG, the length of a corresponding PPDU, i.e., a receipt time (RXTIME) is acquired, which is expressed by Equation 1 below.

$$RXTIME(us) = \left(\left\lceil \frac{\text{L\_LENGTH} + 3}{3} \right\rceil\right) \times 4 + 20 \quad \text{[Equation 1]}$$

In this case, $\lceil x \rceil$ denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$\text{L\_LENGTH(byte)} = \left(\left\lceil \frac{TXTIME - 20}{4} \right\rceil\right) \times 3 - 3 \quad \text{[Equation 2]}$$

Herein, TXTIME is the total transmission time constituting the corresponding PPDU, and is expressed by Equation 3 below. In this case, TX represents the transmission time of X.

$$\text{TXTIME (us)} = T_{L\text{-}STF} + T_{L\text{-}LTF} + T_{L\text{-}SIG} + T_{RL\text{-}SIG} + T_{U\text{-}SIG} + (T_{EHT\text{-}SIG\text{-}A}) + (T_{EHT\text{-}SIG\text{-}B}) + T_{EHT\text{-}STF} + N_{EHT\text{-}LTF} \cdot T_{EHT\text{-}LTF} + T_{DATA} \quad \text{[Equation 3]}$$

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to FIG. 7(*e*), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

The present invention suggests a signaling technique of a discontinuous channel type of the SU PPDU and illustrates the discontinuous channel type determined according to the suggested technique. In addition, the present invention suggests a signaling technique of a puncturing type of each of a primary 160 MHz and a secondary 160 MHz in 320 MHz BW configuration of the SU PPDU.

In addition, an embodiment of the present invention suggests a technique which differs in the configuration of the PPDU indicating the preamble puncturing BW values according to the PPDU format signaled in the PPDU format field. If the length of the BW field is 4 bits, in case of the EHT SU PPDU or the TB PPDU, the EHT-SIG-A of 1 symbol may be additionally signaled after the U-SIG, or the EHT-SIG-A may be never signaled, so that by considering this, it is necessary to completely signal a maximum of 11 puncturing modes through only the BW field of the U-SIG. However, in case of the EHT MU PPDU, since the EHT-SIG-B is additionally signaled after the U-SIG, the maximum of 11 puncturing modes may be signaled by a method different from the SU PPDU. In case of the EHT ER PPDU, the BW field is configured as 1 bit to signal information on whether the PPDU uses 20 MHz or 10 MHz band.

FIG. 7(*f*) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
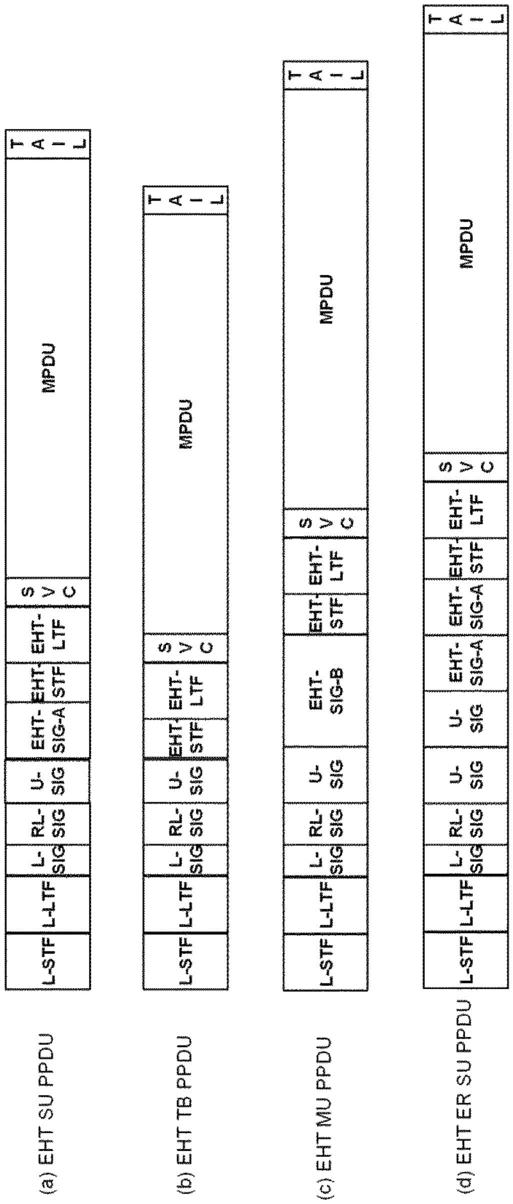
FIG. 8 illustrates an example of various extremely high throughput (EHT) physical protocol data unit (PPDU) formats and a method for indicating the same according to an embodiment of the present invention.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(*a*) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(*b*) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(*c*) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(*d*) shows an example of an EHT ER SU PPDU format used for single user transmission with an STA in an extended range. An EHT ER SU PPDU may be used for single user transmission with an STA of a wider range compared to the EHT SU PPDU described in FIG. 8(*a*), and a U-SIG field may be repeatedly located on a time axis.

The EHT MU PPDU described in FIG. 8(*c*) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

Two or more PPDUs illustrated in FIG. 8 may be indicated by a value indicating the same PPDU format. That is, two or more PPDUs may be indicated by the same PPDU format through the same value. For example, the EHT SU PPDU and the EHT MU PPDU may be indicated by the same value through the U-SIG PPDU format subfield. At this time, the EHT SU PPDU and the EHT MU PPDU may be divided by the number of the STAs receiving the PPDU. For example, the PPDU receiving one STA may be identified as the EHT SU PPDU, and when the number of the STAs is configured to receive two or more STAs, the PPDU may be identified as the EHT MU PPDU. In other words, two or more PPDU formats illustrated in FIG. 8 may be indicated through the same subfield value.

In addition, a part field among the fields illustrated in FIG. 8 or part information of the field may be omitted, and the case that the part field or the part information of the field is omitted may be defined as a compression mode or a compressed mode.

Figure 9:
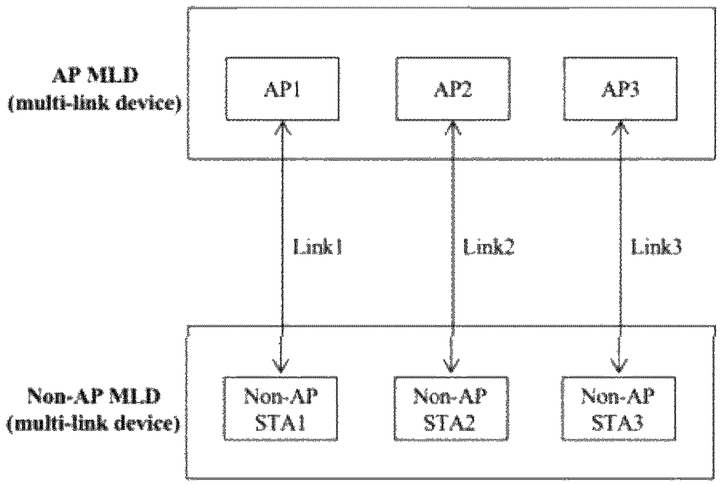
FIG. 9 illustrates a multi-link device according to an embodiment of the present invention

FIG. 9 illustrates a multi-link device according to an embodiment of the present invention.

Referring to FIG. 9, a concept of a device to which one or more STAs are affiliated may be defined. According to an embodiment of the present invention, as another embodiment, devices to which more than one STA (i.e., two or more STAs) are affiliated may be defined. In this case, the device may be a logical concept. Accordingly, the devices to which one or more STAs or more than one STA having such a concept are affiliated may be referred to as a multi-link device (MLD), a multi-band device, or a multi-link logical entry (MLLE).

Alternatively, the devices of the concept above may be referred to as a multi-link entity (MLE). In addition, the MLD may have one medium access control service access point (MAC SAP) until a logical link control (LLC), and the MLD may have one MAC data service.

It is possible for STAs included in the MLD to operate in one or more links or channels. That is, it is possible for the STAs included in the MLD to operate in multiple different channels. For example, it is possible for the STAs included in the MLD to operate using channels of different frequency bands of 2.4 GHz, 5 GHz, and 6 GHz. Accordingly, it is possible for the MLD to acquire gain in channel access, and increase the performance of the entire network. The conventional wireless LAN operates in a single link, but the MLD operation may acquire much more channel access opportunities by using multiple links, or an STA may efficiently operate in the multiple links in consideration of a channel condition.

In addition, when STAs affiliated to the MLD are APs, the MLD to which the APs are affiliated may be an AP MLD. However, when the STAs affiliated to the MLD are non-AP STAs, the MLD to which the non-APs are affiliated may be a non-AP MLD.

In addition, an AP multi-link device (MLD) may be a device including one or more wireless access points (APs), and may be a device connected to a higher layer through one interface. That is, the AP MLD may be connected to a logical link control (LLC) layer through one interface. Multiple APs included in the AP MLD may share some functions in a MAC layer. The respective APs in the AP MLD may operate in different links. An STA MLD may be a device including one or more non-AP STAs, and may be a device connected to a higher layer through one interface.

That is, the STA MLD may be connected to an LLC layer through one interface. Multiple STAs included in the STA MLD may share some functions in a MAC layer. In addition, the STA MLD may be also called a non-AP MLD. In this case, the AP MLD and the STA MLD may perform a multi-link operation of performing communication using multiple individual links. That is, when the AP MLD includes multiple APs, each of the APs configures a separate link to perform a frame transmission or reception operation using multiple links with each terminal included in the STA MLD. In this case, each link may operate in a 2.4 GHz, 5 GHz, or 6 GHz band, and a bandwidth extension operation may be performed in each link. For example, when the AP MLD sets up one link in the 2.4 GHz band and two links in the 5 GHz band, in the 2.4 GHz band, frame transmission may be performed in a 40 MHz band through a bandwidth extension scheme, and in each link using the 5 GHz band, frame transmission may be performed in a maximum of 320 MHz band by utilizing a non-consecutive bandwidth.

Meanwhile, in the AP MILD or the STA MILD, while one terminal in the MLD performs a transmission operation, another terminal may not be able to perform a reception operation, due to an interference problem inside the device. As such, an operation in which while one AP or terminal in an MLD performs a transmission operation, another AP or terminal in the MLD performs reception is referred to as simultaneous transmission and reception (STR). The AP MLD may perform an STR operation for all links. Alternatively, the STR operation may not be possible in some links of the AP MLD. A terminal MLD which can perform the STR operation may be associated with the AP MLD, and an MLD which cannot perform the STR operation for some or all links may be associated with the AP MLD. In addition, a terminal (for example, IEEE 802.11a/b/g/n/ac/ax terminal) not belonging to an MLD may be additionally associated with an AP included in an AP MLD.

In the scanning and association process described in FIG. 5, the AP MLD and the STA MLD may perform a negotiation process for a multi-link use operation. For example, in the scanning process described in FIG. 5, an AP included in the AP MLD may transmit a beacon frame including an indicator indicating that a multi-link operation is available, the number of available links, and information on multiple available links. Alternatively, a terminal belonging to the STA MLD may transmit a probe request frame including an indicator indicating that a multi-link operation is available, and an AP belonging to the AP MLD may include an indicator indicating that a multi-link operation is available, in a probe response frame. In this case, the AP may additionally include the number of available links during a multi-link operation, link information, etc., and transmit the same.

The STA MLD having identified, in the scanning process above, whether the multi-link operation is available for the AP MILD and the information on the available links may perform an association process with the AP MLD. In this case, the AP MLD and the STA MLD may start a negotiation process for the multi-link operation. In this case, the negotiation process for the multi-link operation may be performed in an association process between the AP belonging to the AP MLD and the terminal belonging to the STA MLD. That is, a random terminal (for example, STA1) belonging to the STA MLD may transmit an indicator indicating that a multi-link operation of the terminal is available and a request indicator for requesting to perform the multi-link operation to a random AP (for example, AP1) belonging to the AP MLD while transmitting an association request frame. The AP having received the association request frame from the terminal may identify the indicator for requesting the multi-link operation, and when the AP can perform the multi-link operation, the AP may include information on a link to be used for the multi-link operation, a parameter used in each link, etc. in an association response frame allowing the multi-link operation, and transmit the association response frame to the corresponding terminal. The parameter for the multi-link operation may include one or more of a band of each link, a bandwidth extension direction, a target beacon transmission time (TBTT), and whether an STR operation is performed. The AP MLD and the STA MLD between which the association request frame and the response frame have been exchanged and which have identified the use of the multi-link operation may perform a frame transmission operation using multiple links by using multiple APs included in the AP MLD and multiple terminals included in the STA MLD after the corresponding association process.

Referring to FIG. 9, there may be an MILD including multiple STAs, and the multiple STAs included in the MILD may operate in multiple links. In FIG. 9, an MILD including AP1, AP2, and AP3, which are APs, may be called an AP MLD, and an MLD including non-AP STA1, non-AP STA2, and non-AP STA3, which are non-AP STAs, may be called a non-AP MLD. The STAs included in the MLD may operate in Link 1, Link 2), Link 3), or some of Links 1 to 3.

According to an embodiment of the present invention, the multi-link operation may include a multi-link setup operation. The multi-link setup operation may be an operation corresponding to association performed in a single link operation. To exchange a frame in multiple links, the multi-link setup needs to performed first. The multi-link setup operation may be performed using a multi-link setup element. Here, the multi-link setup element may include capability information related to the multi-link, and the capability information may include information related to whether an STA included in an MLD can simultaneously receive a frame through one link while another STA included in the MILD transmits a frame through another link. That is, the capability information may include information related to whether STAs (non-AP STAs) and/or APs (or AP STAs) can simultaneously transmit/receive frames in different transmission directions through links included in the MLD. In addition, the capability information may further include information related to an available link and an operating channel. The multi-link setup may be performed through a negotiation between peer STAs, and the multi-link operation may be set up through one link.

According to an embodiment of the present invention, there may be a mapping relationship between links of a TID and an MLD. For example, when the TID is mapped to a link, the TID may be transmitted through the mapped link. The mapping between the TID and the link may be performed on the basis of a transmission direction. For example, the mapping may be performed for both directions between MLD 1 and MLD 2. In addition, there may be a default setup for the mapping between the TID and the link. For example, the mapping between the TID and the link may correspond to mapping of all TIDs to a link by default.

Figure 10:
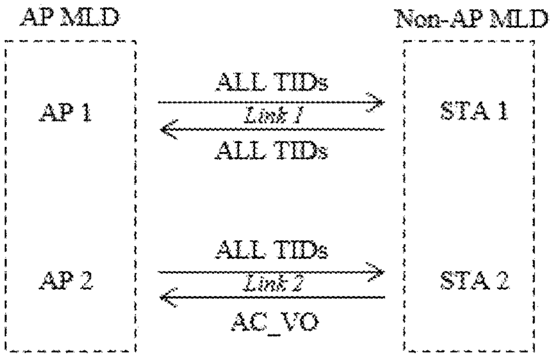
FIG. 10 illustrates an example of a TID-to-link mapping method according to an embodiment of the present invention.

FIG. 10 illustrates an example of a TID-to-link mapping method according to an embodiment of the present invention.

Referring to FIG. 10, as described in FIG. 9, there may be a mapping relationship between a TID and a link. In addition, in the present invention, the mapping between the TID and the link may be referred to as TID-to-link mapping, TID to link mapping, TID mapping, link mapping, etc. A TID may be a traffic identifier. In addition, the TID may be an identifier (ID) for classifying traffic, data, etc. to support a quality of service (QoS).

In addition, the TID may be an ID used or allocated in a layer higher than a MAC layer. The TID may indicate traffic categories (TCs) and traffic streams (TSs). In addition, the TID may have 16 values, which can be indicated as, for example, values of 0 to 15. In addition, a used TID value may vary according to an access policy or channel access and medium access methods. For example, when an enhanced distributed channel access (EDCA) (hybrid coordination function (HCF) contention-based channel access) is used, a possible TID value may be 0 to 7. In addition, when the EDCA is used, the TID value may indicate a user priority (UP), and the UP may relate to a TC or a TS. In addition, the UP may be a value allocated in a layer higher than the MAC. In addition, HCF controlled channel access (HCCA) or SPCA is used, a possible TID value may be 8 to 15. In addition, when the HCCA or the SPCA is used, the TID may indicate a TSID. In addition, when HEMM or SEMM is used, a possible TID value may be 8 to 15. In addition, when the HEMM or the SEMM is used, the TID may indicate a TSID.

In addition, there may be a mapping relationship between the UP and an access category (AC). The AC may be a label for providing the QoS in the EDCA, or a label indicating a set of EDCA parameters. The EDCA parameter of the set of the EDCA parameters may be used for channel connection. The AC may be used by a QoS STA.

An AC value may be configured as one of AC_BK, AC_BE, AC_VI, and AC_VO. AC_BK, AC_BE, AC_VI, and AC_VO may indicate background, best effort, video, and voice, respectively. In addition, AC_BK, AC_BE, AC_VI, and AC_VO may be subdivided. For example, AC_VI may be subdivided into AC_VI primary and AC_VI alternate. In addition, AC_VO may be subdivided into AC_VO primary and AC_VO alternate. In addition, the UP value or the TID value may be mapped to the AC value. For example, UP or TID values 1, 2, 0, 3, 4, 5, 6, and 7 may be mapped to AC_BK, AC_BK, AC_BE, AC_BE, AC_VI, AC_VI, AC_VO, and AC_VO, respectively. Alternatively, UP or TID values 1, 2, 0, 3, 4, 5, 6, and 7 may be mapped to AC_BK, AC_BK, AC_BE, AC_BE, AC_VI alternate, AC_VI primary, AC_VO primary, and AC_VO alternate, respectively. In addition, UP or TID values 1, 2, 0, 3, 4, 5, 6, and 7 may have sequentially have higher priorities. That is, a value near UP or TID value 1 may have a low priority, and a value near UP or TID value 7 may have a high priority. Accordingly, AC_BK, AC_BE, AC_VI, and AC_VO may have sequentially higher priorities. In addition, AC_BK, AC_BE, AC_VI, and AC_VO may correspond to AC indices (ACIs) 0, 1, 2, and 3, respectively.

Accordingly, there may be a relationship between the TID and the AC. Accordingly, the TID-to-link mapping of the present invention may correspond to a mapping relationship between an AC and a link. In addition, in the present invention, when the TID is mapped, it may mean that the AC is mapped, and when the AC is mapped, it may mean that the TID is mapped.

According to an embodiment of the present invention, there may be a TID mapped to each link of a multi-link. For example, there may be mapping relating to one of multiple links through which a TID or an AC is allowed to perform transmission and reception. In addition, such mapping may be defined separately for both directions of the link. In addition, as described above, there may be a default setup for the mapping between the TID and the link. For example, the mapping between the TID and the link may correspond to mapping of all TIDs to a link by default. In addition, according to an embodiment, at a specific time point, a TID or an AC may be mapped to at least one link. In addition, a management frame or a control frame may be transmitted in all links.

In the present invention, a data frame corresponding to a TID or an AC mapped to a direction of a link may be transmitted. In addition, a data frame corresponding to a TID or an AC not mapped to a direction of a link may not be transmitted.

According to an embodiment, the TID-to-link mapping may be applied to acknowledgement. For example, a block ack agreement may be based on the TID-to-link mapping. Alternatively, the TID-to-link mapping may be based on the block ack agreement. For example, there may be a block ack agreement for a TID for which the TID-to-link mapping is performed.

By performing the TID-to-link mapping, a QoS service can be provided. For example, by mapping an AC or a TID having a high priority to a link in which a channel state is good or there are small number of STAs, data of the corresponding AC or TID may be promptly transmitted. Alternatively, the TID-to-link mapping can assist in power saving (or entering into a doze state) by an STA of a specific link.

Referring to FIG. 10, there may be an AP MLD including AP 1 and AP 2. In addition, there may be a non-AP MLD including STA 1 and STA 2. In addition, in the AP MLD, there may be Link 1 and Link 2 which are multiple links. AP 1 and STA 1 may be associated in Link 1, and AP 2 and STA 2 may be associated in Link 2.

Accordingly, Link 1 may include a link for transmission from AP 1 to STA 1 and/or a link for transmission from STA 1 to AP 1, and Link 2 may include a link for transmission from AP 2 to STA 2 and/or a link for transmission from STA 2 to AP 2. In this case, each link may be mapped to a TID and/or an AC.

For example, all TIDs and all ACs may be mapped to the link for transmission from AP 1 to STA 1 in Link 1, and a link for transmission from STA 1 to AP 1 in Link 1. In addition, only AC_VO or a TID corresponding to AC_VO may be mapped to a link for transmission from STA 2 to AP 2 in Link 2. In addition, only data of the mapped TID and/or AC can be transmitted in the corresponding link. In addition, data of the TID or AC not mapped to a link cannot be transmitted in the corresponding link.

Figure 11:
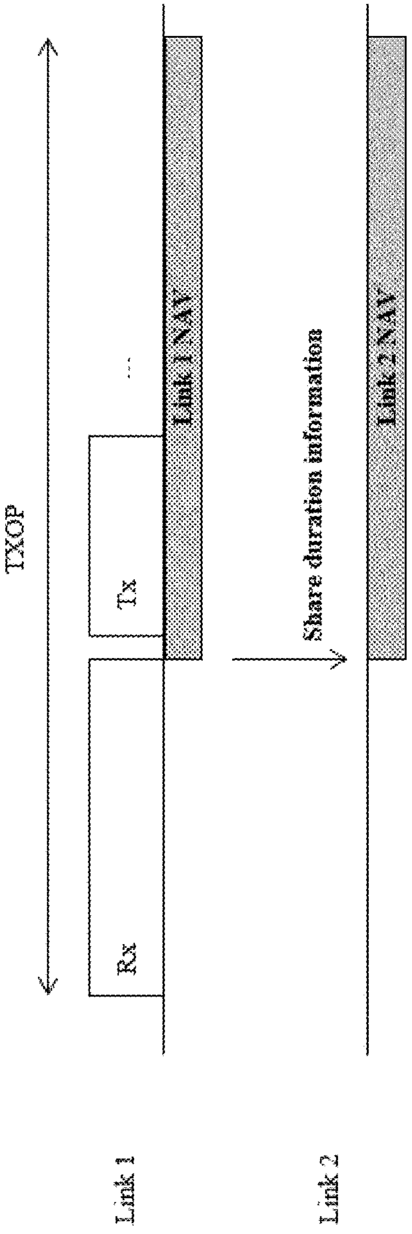
FIG. 11 illustrates an example of a multi-link NAV setup operation according to an embodiment of the present invention.

FIG. 11 illustrates an example of a multi-link NAV setup operation according to an embodiment of the present invention.

An operation of performing simultaneous transmission and reception (STR) by an MLD may be restricted, which may be associated with a frequency spacing between multiple links operating as a multi-link.

Accordingly, according to an embodiment of the present invention, when a spacing between links is m MHz, simultaneous transmission and reception may be restricted, and a spacing between links is n MHz (where, m is greater than n), simultaneous transmission and reception may not be restricted. This embodiment is provided to solve the problem that the simultaneous transmission and reception is restricted, and a redundant description can be omitted. In addition, this embodiment is applicable to an MILD which cannot perform the STR.

According to an embodiment of the present invention, duration information may be shared among links operating as a multi-link. In an embodiment, the duration information may be TXOP duration information transmitted in a signaling field of a preamble. The signaling field may be the above-described U-SIG field. Alternatively, the signaling field may be the above-described HE-SIG-A field. In another embodiment, the duration information may be duration information indicated by a duration/ID field included in a MAC header. In another embodiment, the duration information may be duration information indicated by a length field (L length field) included in an L-SIG field. According to an embodiment, the duration information indicated by the U-SIG field, the HE-SIG-A field, or the duration/ID field may be a value indicating a TXOP duration. According to an embodiment, the duration information indicated by the L-SIG field may be a value indicating the length of a physical layer protocol data unit (PPDU) including the L-SIG field or the end of the PPDU including the L-SIG field.

In addition, according to an embodiment of the present invention, it may be restricted to perform transmission or channel access in a period based on the duration information shard among the links. A method for restricting transmission or channel access may include setting up an NAV. Alternatively, to resume the transmission or channel access, the NAV may be reset. In this case, the NAV may be an intra-BSS NAV. The intra-BSS NAV may be an NAV set up by an intra-BSS frame (or PPDU). That is, an STA belonging to an MLD may set up an NAV on the basis of a frame (or PPDU) directed to another STA belonging to the MLD.

According to an embodiment of the present invention, there may be an inter-link NAV. The inter-link NAV may be an NAV used by STAs of multiple links belonging to an MILD in a case of operating as a multi-link. For example, transmission may not be performed in Link 2 on the basis of the inter-link NAV configured on the basis of the duration information received in Link 1. In addition, the inter-link NAV may exist or may be used for an MLD which cannot perform the STR. For example, when an inter-link NAV is set up, an MLD having set up the corresponding inter-link NAV may not perform transmission or channel access in multiple links (or all links used by the MLD).

In addition, as one of types of NAV, there may be a basic NAV other than the intra-BSS NAV. The basic NAV may be an NAV set up by an inter-BSS frame (or PPDU), and the basic NAV may be set up by a frame (or PPDU) which is not determined as either an intra-BSS or an inter-BSS.

In a case where an inter-link NAV is separately used, it may be advantageous in a situation in which an NAV setup is updated, compared to a case where the inter-link NAV is not used. For example, there may be a situation in which it is allowed to reset an NAV set up by another link. For example, it may be allowed to set up an inter-link NAV on the basis of a frame (or PPDU), and then reset the set inter-link NAV upon determination that the frame (or PPDU) is not directed to the same MLD. If there is an MLD operating in Link 1 and Link 2, an NAV for Link 1 may be set up on the basis of a frame received in Link 1. Thereafter, the NAV of Link 1 may be updated on the basis of the frame of Link 2. In addition, in a case where the NAV by the Link 2 does not need to be maintained, when the NAV of Link 1 is reset, information of the NAV set up on the basis of the frame received in Link 1 may be lost. If the inter-link NAV is used together with the NAV for each link, the NAV for each link can be maintained even though the inter-link NAV is reset, and thus such a problem can be solved.

In an embodiment of the present invention, the NAV setup is provided as an example, but the embodiment of the present invention is not limited thereof, and is applicable to a case of indicating suspension of channel access or indicating a channel state as busy to a physical layer. In addition, the present invention is not limited to a case of resetting an NAV, and is also applicable to a case of indicating continuing channel access to a physical layer or indicating a channel state as idle to a physical layer. In this case, the primitive exchanged between the physical layer and the MAC layer may be used. Alternatively, the primitive exchanged between one STA and another STA of an MLD may be used. Alternatively, the primitive exchanged between one MAC layer and another MAC layer of an MLD may be used.

According to an embodiment of the present invention, when an STA belonging to an MLD starts PPDU reception, another STA belonging to the MLD may need to stop performing channel access. As described above, the channel access can be stopped on the basis of the received duration information, but there may be a time required to acquire duration information from a time point at which the PPDU reception starts due to the location of a field including the duration information or a time required to perform decoding, etc. Accordingly, if the channel access is performed and the transmission starts during this time, the above-described problem may occur. Accordingly, according to an embodiment of the present invention, an STA of an MLD may suspend channel access from a time point at which another STA of the MLD starts to perform reception. In addition, when it is identified that a frame received after another STA of the MLD starts performing reception is not directed to another STA, channel access can be restarted.

Figure 12:
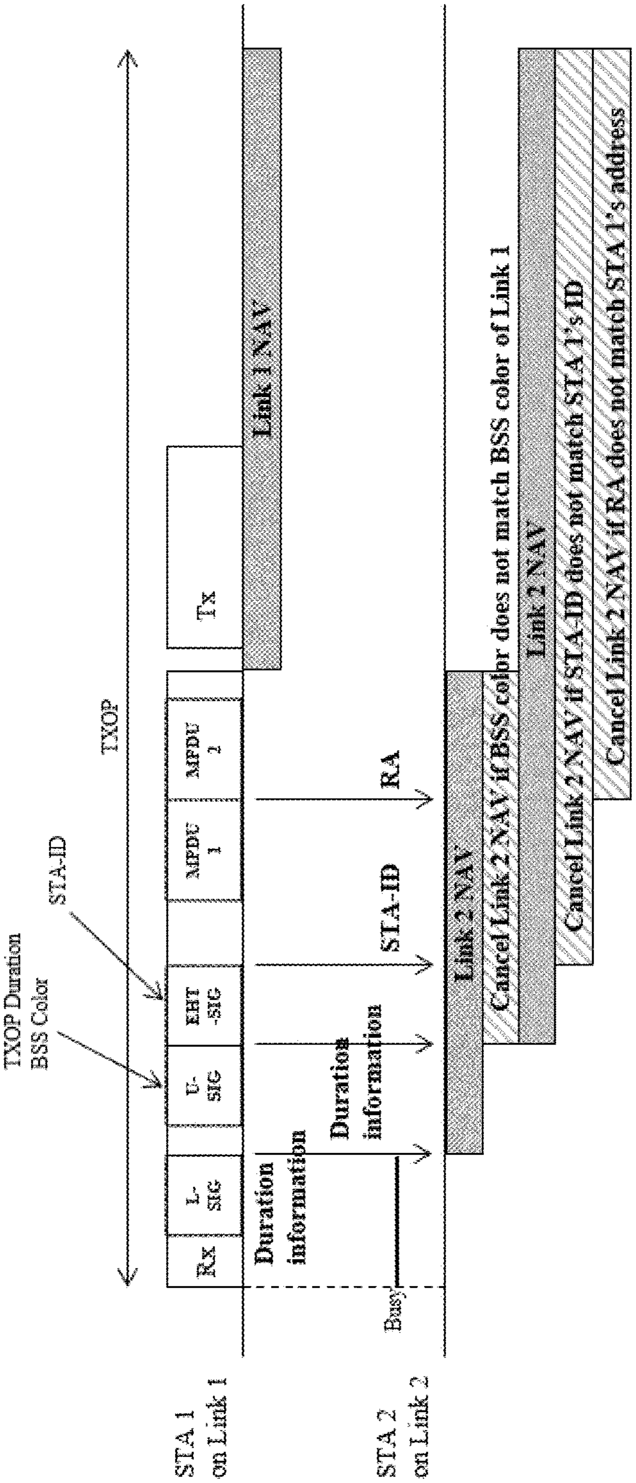
FIG. 12 illustrates another example of a multi-link NAV setup operation according to an embodiment of the present invention.

FIG. 12 illustrates another example of a multi-link NAV setup operation according to an embodiment of the present invention.

FIG. 12 is a detailed description of a specific method of the embodiment described in FIG. 11, and a redundant description can be omitted.

As described above, on the basis of a frame or a PPDU received by an STA belonging to an MLD, another STA belonging to the same MLD may suspend or resume channel access or transmission. In the present invention, suspending channel access or transmission may include an operation of setting up (updating) an NAV, determining a channel as busy, suspending CCA, etc. In addition, resuming channel access or transmission may include an operation of resetting an NAV, canceling a NAV setup, determining a channel as idle, performing CCA, etc. Hereinafter, such an operation may be indicated as suspending or resuming. In addition, hereinafter, it may be described that STA 1 and STA 2 belong to an MLD, and STA 1 and STA 2 operate in Link 1 and Link 2, respectively. In addition, a frame and a PPDU may be interchangeable indicated. In addition, the NAV in this case may be an intra-BSS NAV or an inter-link NAV as described in FIG. 11.

According to an embodiment of the present invention, when STA 1 starts receiving a frame, STA 2 may suspend channel access. In addition, when STA 1 acquires duration information from an L-SIG, STA 2 may continue the state of suspending the channel access. In this case, the state of suspending the channel access by STA 2 may be determined to last by the end of the frame received by STA 1. In addition, when STA 1 fails to accurately decode the L-SIG (in a case of invalid L-SIG), STA 2 may resume channel access.

In addition, a TXOP duration and a BSS color may be received from the U-SIG of the frame received by the STA 1. If the received BSS color indicates an intra-BSS or the BSS color is a BSS color corresponding to STA 1, channel access may be suspended. In an embodiment, in this case, a channel access suspending duration may last by the end of the received frame. In this case, it is advantageous in that channel access can be started faster after the received frame ends. In another embodiment, in this case, the channel access suspending duration may be a TXOP duration. In this case, the duration of the channel access suspended on the basis of the L-SIG may be updated. In this case, it is advantageous in that a sequence after the received frame can be better protected.

Alternatively, there may be a case where a TXOP duration and a BSS color are received from the U-SIG of the frame received by STA 1, and the received BSS color indicates non-intra-BSS, or the BSS color is not a BSS color corresponding to STA 1. Alternatively, there may be a case where STA 1 fails to successfully decode the U-SIG. In this case, STA 2 may resume channel access.

Alternatively, when information acquired from the U-SIG of the frame received by STA 1 indicates that the corresponding frame is a frame not received by STA 1, STA 2 may resume channel access. For example, when a PHY identifier acquired from the U-SIG is an ID corresponding to a future standard or an unrecognizable ID, STA 2 may resume channel access.

In addition, the case of receiving the U-SIG is described, but the same embodiment is also applicable to a case of receiving a HE PPDU and a case of receiving a HE-SIG-A. For example, the HE-SIG-A may include a TXOP duration and a BSS color, and accordingly, the operation as described above may be performed.

In addition, an STA-ID may be received from an EHT-SIG of the frame received by STA 1. If the received STA-ID is an indicator which needs to be received by STA 1, for example, if the STA-ID indicates STA 1, the STA-ID indicates a group to which STA 1 belongs, or the STA-ID indicates broadcast, STA 2 may continue the state of suspending the channel access.

Alternatively, an STA-ID may be received from an EHT-SIG of the frame received by STA 1. If the received STA-ID is an indicator not corresponding to STA 1, for example, if the STA-ID does not indicate an indicator corresponding to STA 1, the STA-ID does not indicate a group to which STA 1 belongs, or the STA-ID does not indicate broadcast, STA 2 may resume channel access. Alternatively, also in a case where STA 1 fails to successfully decode the EHT-SIG, STA 2 may resume channel access.

In addition, the case of receiving the EHT-SIG is described, but the same embodiment is also applicable to a case of receiving a HE PPDU and a case of receiving a HE-SIG-B. For example, the HE-SIG-B may include the STA-ID, and accordingly, the operation as described above may be performed.

In addition, a MAC header of the frame received by STA 1 may be received. If a receiver address (RA) or a destination address (DA) included in the received MAC header indicates a value which needs to be received by STA 1, for example, if the RA or DA indicates STA 1 or indicates a group to which STA 1 belongs to, or the STA-ID indicates broadcast, STA 2 may continue the state of suspending the channel access. In this case, the duration of the suspended channel access may be based on duration information included in the received MAC header. More specifically, the duration of the suspended channel access may be based on duration information indicated by a duration/ID field included in the received MAC header.

In addition, a MAC header of the frame received by STA 1 may be received. If an RA or DA included in the received MAC header is an indicator not corresponding to STA 1, for example, if the RA or DA does not indicate an indicator corresponding to STA 1, does not indicate a group to which STA 1 belongs to, or does not indicate broadcast, STA 2 may resume channel access. Alternatively, STA 1 may fail to receive all MAC headers. For example, STA 1 may fail to receive all MPDU included in an A-MPDU. In this case, STA 2 may resume channel access.

The suspending and resuming of the channel access, described in FIG. 12, may be sequentially performed according to an order of decoding as STA 1 starts receiving a frame (or PPDU) and sequentially performs decoding. The decoding order may be based on a PPDU format, a frame format, etc. For example, the decoding may be performed in the sequence of the L-SIG, the U-SIG, the EHT-SIG, and the MAC header (in a case of an EHT PPDU). Alternatively, the decoding may be performed in the sequence of the L-SIG, the HE-SIG-A, and the MAC header (in a case of a HE SU PPDU or a HE TB PPDU). Alternatively, the decoding may be performed in the sequence of the L-SIG, the HE-SIG-A, the HE-SIG-B, and the MAC header (in a case of a HE MU PPDU). Alternatively, the decoding may be performed in the sequence of the L-SIG and the MAC header (in a case of an 11a/g PPDU).

According to an embodiment of the present invention, the above-mentioned STA-ID may be a value indicating an intended receiver of a PPDU or a resource unit (RU). In addition, the STA-ID may be included in the EHT-SIG field, the HE-SIG-B field, or the like. In addition, the STA-ID may indicate a value corresponding to a single STA. For example, when multiple STAs are included in an MLD, the STA-ID may indicate a value corresponding to one of the multiple STAs. In addition, the STA-ID may be a value based on a MAC address or an AID of the STA.

Figure 13:
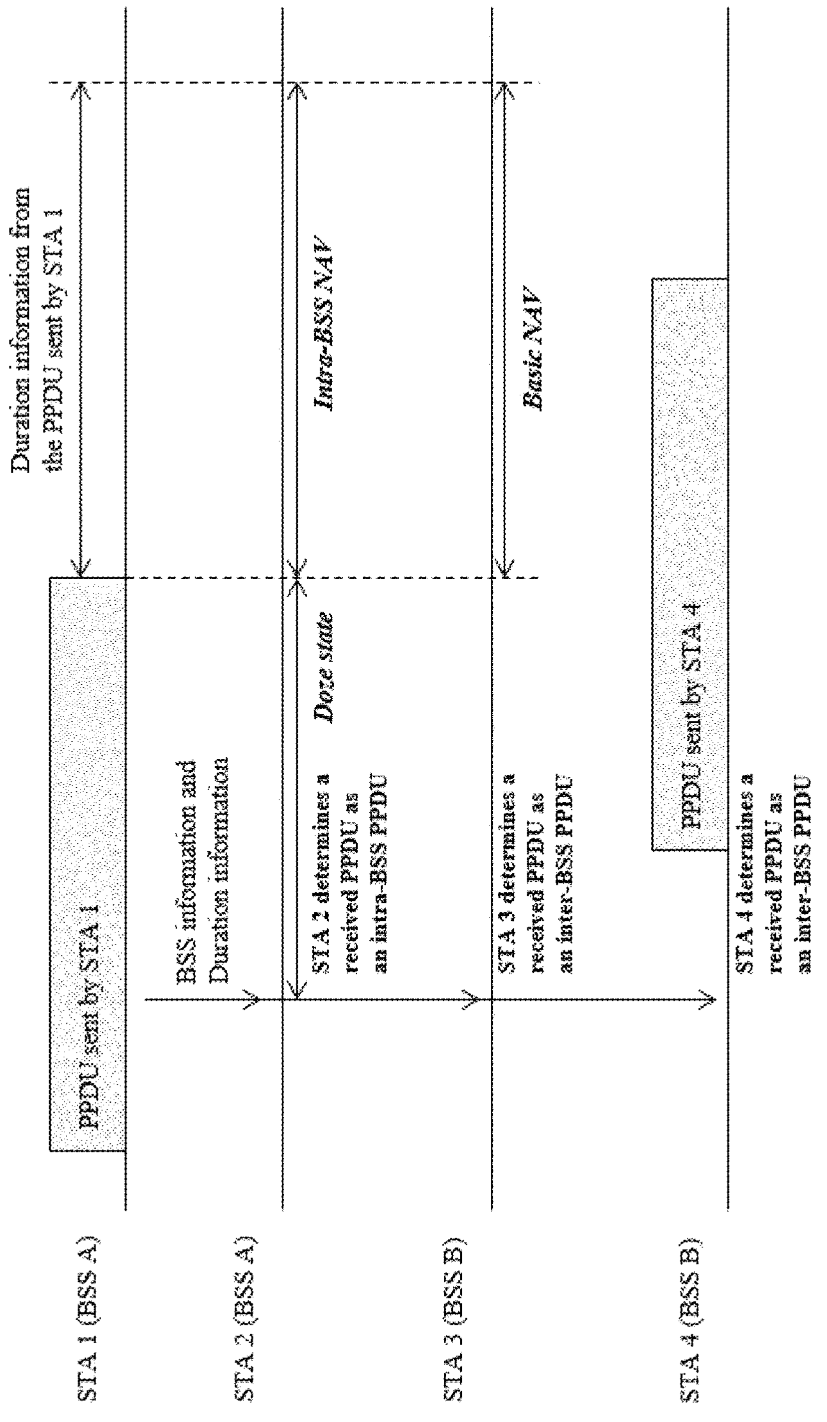
FIG. 13 illustrates an example of BSS classification and an operation based thereon according to an embodiment of the present invention.

FIG. 13 illustrates an example of BSS classification and an operation based thereon according to an embodiment of the present invention.

According to an embodiment of the present invention, an STA may classify (or determine) a BSS on the basis of a received frame or a received PPDU. Classifying the BSS may include an operation of classifying whether the received frame or the received PPDU corresponds to a BSS to which the classifying STA belongs. Alternatively, classifying the BSS may mean an operation of classifying whether the received frame or the received PPDU has been transmitted from a BSS to which the classifying STA belongs. In addition, classifying the BSS may include an operation of classifying whether the received frame or the received PPDU corresponds to a BSS to which the classifying STA does not belong. Alternatively, classifying the BSS may mean an operation of classifying whether the received frame or the received PPDU has been transmitted from a BSS to which the classifying STA does not belong. In addition, classifying the BSS may include an operation of classifying a BSS to which the received frame or the received PPDU belongs. Alternatively, classifying the BSS may mean an operation of classifying a BSS from which the received frame or the received PPDU has been transmitted. According to an embodiment of the present invention, a BSS to which the classifying STA belongs may be called an intra-BSS. Alternatively, BSSs including a BSS to which the classifying STA belongs may be called an intra-BSS. In addition, a BSS other than the intra-BSS may be called an inter-BSS. Alternatively, a BSS other than the intra-BSS may be an inter-BSS or an unclassified BSS. Alternatively, the inter-BSS may include the unclassified BSS. In addition, a BSS to which the classifying STA does not belong may be called an inter-BSS.

According to an embodiment, when it is determined that the received frame or the received PPDU corresponds to the intra-BSS or has been transmitted from the intra-BSS, the received frame and the received PPDU may be called an intra-BSS frame and an intra-BSS PPDU, respectively. In addition, when it is determined that the received frame or the received PPDU corresponds to the inter-BSS or has been transmitted from the inter-BSS, the received frame and the received PPDU may be called an inter-BSS frame and an inter-BSS PPDU, respectively. In addition, a PPDU including the intra-BSS frame may be an intra-BSS PPDU. In addition, a PPDU including the inter-BSS frame may be an inter-BSS PPDU.

According to an embodiment of the present invention, a BSS may be classified on the basis of one or more BSS classification conditions. For example, the BSS may be classified according to whether at least one of the one or more BSS classification conditions is satisfied.

The BSS classification condition may include a condition based on a BSS color. The BSS color may be an identifier for a BSS. In addition, the BSS color may be included in a preamble of a PPDU, more specifically, a signaling field (e.g., a HE-SIG-A field, a U-SIG field, or a VHT-SIG-A field). In addition, the BSS color may be included in TXVECTOR transferred from a MAC layer to a PHY layer of a transmitter. In addition, the BSS color may be included in RXVECTOR transferred from a PHY layer to a MAC layer of a receiver. Parameters included in TXVECTOR and RXVECTOR may be called a TXVECTOR parameter and an RXVECTOR parameter, respectively. In addition, the BSS color may be included in the TXVECTOR parameter or the RXVECTOR parameter. In addition, a BSS color configured by an AP may be notified to STAs. According to an embodiment, the BSS may be classified on the basis of a BSS color included in a received PPDU. If a BSS color included in a received PPDU differs from a BSS color of a BSS corresponding to an STA, the STA may classify the received PPDU as an inter-BSS PPDU. Alternatively, if a BSS color included in a received PPDU differs from a BSS color of a BSS corresponding to the STA and has a value other than 0, the STA may classify the received PPDU as an inter-BSS PPDU. In addition, if a BSS color included in a received PPDU is identical to a BSS color of a BSS corresponding to the STA, the STA may classify the received PPDU as an intra-BSS PPDU.

The BSS classification condition may include a condition based on a MAC address. The MAC address may be included in a MAC header of a frame. In addition, the MAC address may include a receiver address (RA), a transmitter address (TA), a BSSID, a source address (SA), a designation address (DA), etc. According to an embodiment, a BSS may be classified on the basis of a MAC address included in a received frame. If a MAC address included in a received frame differs from a BSSID of a BSS corresponding to an STA, the received frame may be classified as an inter-BSS frame. More specifically, if all MAC addresses included in the received frame differ from a BSSID of a BSS corresponding to the STA, the received frame may be classified as an inter-BSS frame. In addition, if a MAC address included in the received frame is identical to a BSSID of a BSS corresponding to the STA, the received frame may be classified as an intra-BSS frame. More specifically, if at least one of MAC addresses included in the received frame is identical to a BSSID of a BSS corresponding to the STA, the received frame may be classified as an intra-BSS frame.

The corresponding BSS may include an BSS to with which an STA is associated. In addition, the corresponding BSS may include a BSS included the same multiple-BSSID set as that of a BSS with which the STA is associated. In addition, the corresponding BSS may include a BSS included in the same co-hosted BSSID set as that of a BSS with which the STA is associated. In addition, one or more BSSs included in the same multiple-BSSID set or the same co-hosted BSSID set may transfer information relating to the one or more BSSs through a frame.

The BSS classification condition may include a condition based on a partial AID field value included in a VHT PPDU. The partial AID field may be included in a preamble of the VHT PPDU. In addition, the partial AID field may be included in a VHT-SIG-A field included in the VHT PPDU. According to an embodiment, the partial AID field may indicate apart of a BSS color. For example, when a partial BSS color function is used, the partial AID field may indicate a part of the BSS color. Alternatively, when an AID assignment rule is used, the partial AID field may indicate a part of the BSS color. The AID assignment rule may be a method for assigning an AID on the basis of a BSS color. In addition, when a group ID field included in the VHT-SIG-A field of the VHT PPDU has a pre-configured value (for example, when the group ID field is configured as 63), the partial AID field may indicate a part of the BSS color. According to an embodiment, when a partial AID field of a received PPDU indicates a part of the BSS color and a received partial AID field value differs from the part of the BSS color corresponding to the receiving STA, the received PPDU may be classified as an inter-BSS PPDU.

In addition, when a partial AID field of a received PPDU indicates a part of the BSS color and a received partial AID field value is identical to the part of the BSS color corresponding to the receiving STA, the received PPDU may be classified as an intra-BSS PPDU. In addition, in this case, the part of the BSS color may be 4 LSBs of the BSS color. According to another embodiment, the partial AID field may indicate a part of a BSSID. For example, when a group ID field included in the VHT-SIG-A field of the VHT PPDU has a pre-configured value (for example, when a group ID field is configured as 0), the partial AID field may indicate a part of a BSSID. According to an embodiment, when a partial AID field of a received PPDU indicates a part of the BSSID and a received partial AID field value differs from the part of the BSSID corresponding to the receiving STA, the received PPDU may be classified as an inter-BSS PPDU. In addition, when a partial AID field of a received PPDU indicates a part of the BSSID and a received partial AID field value is identical to the part of the BSSID corresponding to the receiving STA, the received PPDU may be classified as an intra-BSS PPDU. In addition, in this case, the part of the BSSID may be 9 MSBs of the BSSID. In addition, the partial AID field value may be included in TXVECTOR parameter PARTIAL_AID or RXVECTOR parameter PARTIAL_AID. In addition, the group ID field value may be included in TXVECTOR parameter GROUP_ID and RXVECTOR parameter GROUP_ID.

The BSS classification condition may include a condition for receiving a PPDU of a pre-configured condition by an AP. For example, the PPDU of the pre-configured condition may include a downlink PPDU. According to an embodiment, the downlink PPDU may include a VHT MU PPDU. In addition, the downlink PPDU may include a PPDU in which signaling indicating either an uplink or a downlink is configured as a pre-configured value. The signaling indicating either the uplink or the downlink may be included in a signaling field of a HE PPDU. Alternatively, the signaling indicating either the uplink or the downlink may be included in a U-SIG. The U-SIG may be included in a preamble of an EHT PPDU or a PPDU after the EHT standard.

In addition, there may be a case where classification into an intra-BSS PPDU or an inter-BSS PPDU cannot be made. For example, when both the condition for making classification into an intra-BSS PPDU and the condition for making classification into an inter-BSS PPDU, which are described above, fail to be satisfied, classification into the intra-BSS PPDU or the inter-BSS PPDU cannot be made.

In addition, in a case where classification results upon multiple conditions do not match when classifying the BSS, a final result may be determined according to a pre-configured condition. For example, when a result upon the condition based on the BSS color and a result upon the condition based on the MAC address do not match, the result upon the condition based on the MAC address is prioritized, or the result upon the condition based on the MAC address may be determined as a final result. Alternatively, when both the condition for making classification into the intra-BSS PPDU and the condition for making classification into the inter-BSS PPDU are satisfied, classification into an intra-BSS PPDU can be made.

According to an embodiment of the present invention, an STA may perform an operation based on a classified BSS. The operation based on the classified BSS may include an intra-PPDU power save operation. The intra-PPDU power save operation may be a power save operation based on a received PPDU. When a pre-configured condition is satisfied, the intra-PPDU power save operation may be performed. The pre-configured condition may include a condition for classifying the received PPDU as an intra-BSS PPDU. In addition, the pre-configured condition may include a condition in which an intended receiver of the received PPDU is not an STA having received the PPDU. For example, when an ID or an address included in a PPDU does not correspond to an STA having received the PPDU, an intended receiver of the PPDU may not be the STA having received the PPDU. The ID may be included in a preamble of a PPDU. For example, the ID may be STA_ID included in a preamble of a PPDU. In addition, STA_ID may be included in a HE MU PPDU or an EHT PPDU. In addition, the address may be the above-described MAC address. In addition, when the signaling indicating either the uplink or the downlink, which is included in the received PPDU, indicates the uplink, the intended receiver of the PPDU may not be the STA having received the PPDU. In addition, when a configuration of the received PPDU is not supported by the STA having received the PPDU, the intended receiver of the PPDU may not be the STA having received the PPDU. The configuration of the received PPDU may include an MCS of the PPDU, the number of spatial streams, a channel width, etc. In addition, when the configuration of the received PPDU is not supported by the STA having received the PPDU, the PHY-RXEND.indication (UnsupportedRate) primitive may be received. In addition, when the received PPDU has a pre-configured format, the intended receiver of the PPDU may not be the STA having received the PPDU. The pre-configured format may include a TB PPDU. The TB PPDU may include a HE TB PPDU and an EHT TB PPDU. In addition, the TB PPDU may be a PPDU transmitted as a response to a triggering frame. The triggering frame may include a trigger frame. The triggering frame may include a frame including information to be triggered. The information to be triggered may be included in a MAC header, for example, an A-control field. In addition, the information to be triggered or information included in the trigger frame may include the length of a responding PPDU, an RU to be used during responding, a PHY configuration and a MAC configuration to be used during responding, etc. The intra-PPDU power save operation may be an operation of entering into a doze state by the end of the received PPDU. In another embodiment, when it is determined that an intended receiver of a received PPDU or frame is not an STA, the STA may suspend reception or decoding of the PPDU or frame.

The operation based on the classified BSS may include an operation of setting up (or updating) a NAV. According to an embodiment, an STA may operate one or more NAVs. In addition, when an STA receives a PPDU or a frame, the STA may set up a NAV corresponding to a BSS classified on the basis of the received PPDU or the received frame. For example, an intra-BSS VAN may be a NAV corresponding to an intra-BSS PPDU. In addition, a basic NAV may be a NAV corresponding to a PPDU other than the intra-BSS PPDU. Alternatively, the basic NAV may be a NAV corresponding to an inter-BSS PPDU. In addition, when a NAV is set up on the basis of the received PPDU or the received frame, duration information included in the received PPDU or the received frame may be used. The duration information may include a TXOP. The TXOP may mean a value included in a TXOP field. The TXOP field may be included in a preamble of a PPDU. For example, the TXOP field may be included in a HE-SIG-A field of a HE PPDU. Alternatively, the TXOP field may be included in a U-SIG field of an ETH PPDU or a PPDU of a standard after the EHT. In addition, the duration information may be included in a MAC header. For example, the duration information may be included in a duration/ID field included in the MAC header.

The operation based on the classified BSS may include a spatial reuse operation. In addition, the operation based on the classified BSS may include a channel access operation. The spatial reuse operation may be a channel access operation. When an STA receives a PPDU or a frame and a pre-configured condition is satisfied, the spatial reuse operation may be performed. The pre-configured condition may include a condition in which a received PPDU or a received frame corresponds to an inter-BSS. In addition, the pre-configured condition may include a condition in which a signal strength of the received PPDU or the received frame is less than a threshold. For example, the threshold may be variable. In addition, the threshold may be a threshold for an OBSS PD-based spatial reuse operation. In addition, the threshold may be a value equal to or greater than a CCA threshold. In addition, the threshold may be a value based on power at transmission is to be performed. The spatial reuse operation may include an operation of transmitting a PPDU. In addition, the spatial reuse operation may include an operation of resetting a PHY. For example, the PHY resetting operation may be an operation of issuing the PHY-CCARESET.request primitive. In addition, the spatial reuse operation may include an operation of not setting up a NAV on the basis of a received PPDU or a received frame. If an STA performs the spatial reuse operation, the STA may transmit a PPDU while the received PPDU or the received frame is transmitted or received.

Referring to FIG. 13, there may be BSS A and BSS B, and BSS A and BSS B may be different from each other. In addition, each of BSS A and BSS B may correspond to an inter-BSS. That is, a PPDU or a frame transmitted by an STA associated with BSS A in BSS B may be classified as an inter-BSS PPDU or an inter-BSS frame. In addition, there may be STA 1 and STA 2 belonging to BSS A (or associated with an AP operating BSS A). There may be STA 3 and STA 4 belonging to BSS B (or associated with an AP operating BSS B). Referring to FIG. 13, STA 1 may transmit a PPDU. In addition, a PPDU transmitted by STA 1 may include information on a BSS. For example, the information on the BSS may be the above-described information for classifying the BSS. In addition, a PPDU transmitted by STA 1 may include duration information.

STA 2 may receive the PPDU transmitted by STA 1 and classify a BSS for the PPDU. In addition, STA 2 and STA 1 belong to BSS A, and thus the PPDU received by STA 2 may be classified as an inter-BSS PPDU. In addition, the PPDU received by STA 2 may be a UL PPDU or a PPDU, the intended receiver of which is not the STA. Accordingly, according to the above-described embodiment, STA 2 may perform intra-PPDU power saving. Referring to FIG. 13, STA 2 may enter into a doze state by the end of the received PPDU. In addition, STA 2 may set up a NAV on the basis of duration information included in the received PPDU. STA 2 has classified the received PPDU as the intra-BSS PPDU, the NAV may be set up as an intra-BSS NAV.

STA 3 may receive the PPDU transmitted by STA 1 and classify a BSS for the PPDU. In addition, STA 3 and STA 1 belong to BSS B and BSS A, respectively, and thus the PPDU received by STA 3 may be classified as an inter-BSS PPDU. In addition, STA 3 may set up a NAV on the basis of duration information included in the received PPDU. STA 3 has classified the received PPDU as the inter-BSS PPDU, the NAV may be set up as a basic NAV.

STA 4 may receive the PPDU transmitted by STA 1 and classify a BSS for the PPDU. In addition, STA 4 and STA 1 belong to BSS B and BSS A, respectively, and thus the PPDU received by STA 4 may be classified as an inter-BSS PPDU. In addition, a signal strength of the PPDU received by STA 4 may be less than a threshold. Accordingly, the PPDU received by STA 4 has been classified as the inter-BSS PPDU and the signal strength of the PPDU received by STA 4 is less than the threshold, and thus STA 4 may perform a spatial reuse operation. Accordingly, STA 4 may perform channel access and a backoff procedure, and start performing transmission. For example, STA 4 may start performing transmission at a time point at which the PPDU transmitted by STA 1 does not end.

Figure 14:
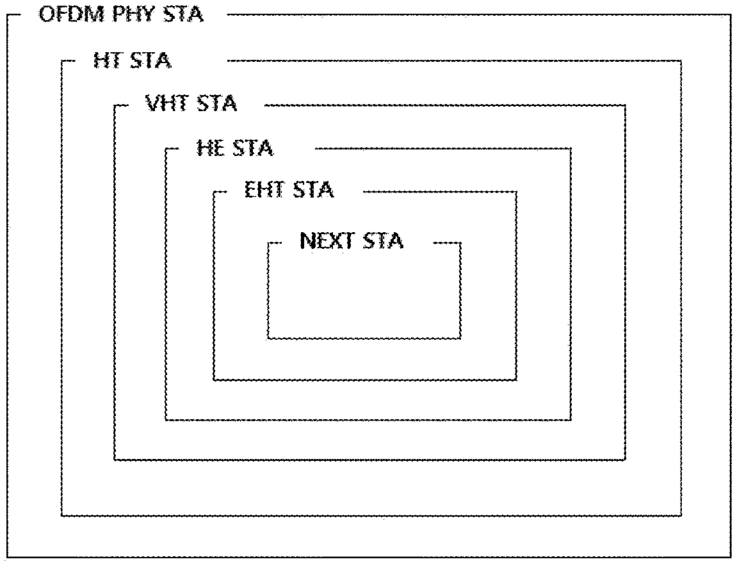
FIG. 14 illustrates a wireless LAN function according to an embodiment of the present invention.

FIG. 14 illustrates the function of an STA according to an embodiment of the present invention.

According to an embodiment of the present invention, an STA conforming to a wireless LAN standard may include functions of a previous wireless LAN standard. This is for backward compatibility. For example, an STA that supports a particular wireless LAN standard may support functions of wireless LAN standards of previous generations and may additionally support new functions. For example, an HT STA may support a basic function of an OFDM PHY STA. Therefore, the HT STA may be classified as an OFDM PHY STA. In addition, the HT STA may support functions of the OFDM PHY STA as well as additional functions not supported by the OFDM PHY STA. A VHT STA supports a basic function of an HT STA, and may support functions that the HT STA does not support. The VHT STA may be classified as an HT STA. In addition, an HE STA may support a basic function of a VHT STA and may support functions that the VHT STA does not support. The HE STA may be classified as a VHT STA. An EHT STA may also be an HE STA. Furthermore, the EHT STA may support a basic function of an HE STA and may support functions that the HE STA does not support. Furthermore, the EHT STA may be classified as an HE STA. Furthermore, a wireless LAN standard after the EHT standard may be newly defined. In the present invention, the standard after the EHT standard is referred to as a NEXT standard, and an STA conforming to the NEXT standard is referred to as a NEXT STA. The NEXT STA may support the basic function of an EHT STA and may support functions that are not supported by the EHT STA. The NEXT STA may be classified as an EHT STA.

FIG. 14 is a diagram showing the relationship between STAs supporting each wireless LAN standard. Referring to FIG. 14, an EHT STA may be an HE STA, a VHT STA, an HT STA, and an OFDM PHY STA. Also, a NEXT STA may be an EHT STA, an HE STA, a VHT STA, an HT STA, and an OFDM PHY STA.

Figure 15:
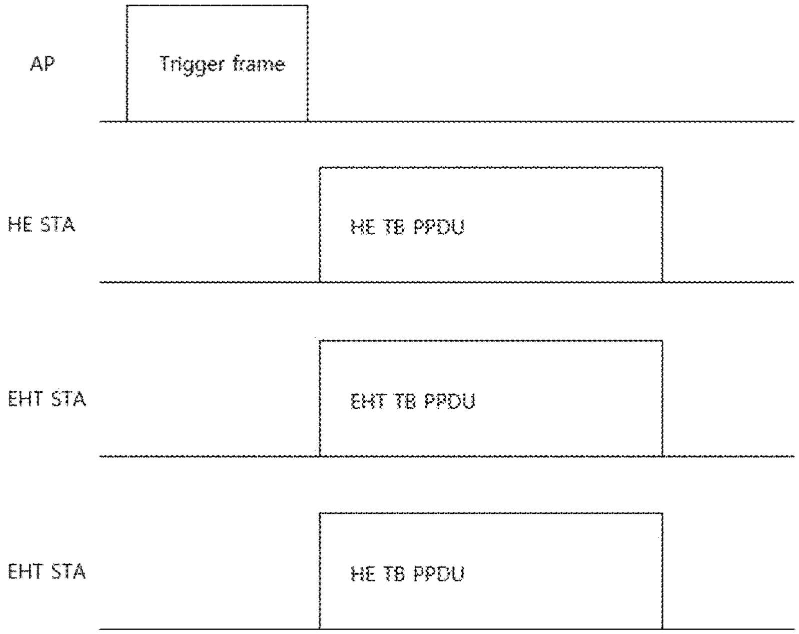
FIG. 15 illustrates an uplink (UL) multi-user (MU) operation according to an embodiment of the present invention.

FIG. 15 illustrates an uplink (UL) multi-user (MU) operation according to an embodiment of the present invention.

In an embodiment of the present invention, an access point may transmit a frame that solicits multi-user (MU) transmission. The frame is referred to as a triggering frame. One or more STAs that receive a triggering frame may perform an uplink transmission based on the triggering frame. Specifically, one or more STAs receiving a triggering frame may transmit a response frame corresponding to the frame. In this case, the inter-space between a PPDU including the triggering frame and a PPDU used for uplink transmission may be SIFS. Specifically, each of multiple STAs may receive a triggering frame and transmit a simultaneous immediate response. The immediate response indicates that the inter-space between a previously received PPDU and a PPDU including the response is SIFS.

The triggering frame may be a type of control frame, and may be a trigger frame including trigger information. Furthermore, the triggering frame may be a frame that includes trigger information in a MAC header. In this case, the trigger information may be triggered response scheduling (TRS) included in a HT control field, a control subfield, or an A-control subfield of the MAC header. Additionally, the trigger information may be information that solicits transmission of a TB PPDU.

The TB PPDU is a PPDU format that includes a response frame to a triggering frame. The TB PPDU may include an HE TB PPDU and an EHT TB PPDU. In addition, the TB PPDU may include a NEXT TB PPDU as defined by the NEXT wireless LAN standard. The HE TB PPDU may include a preamble including L-STF, L-LTF, L-SIG, RL-SIG, HE-SIG-A, HE-STF, and HE-LTF in order, and may include data and a packet extension (PE) following the preamble. Furthermore, the EHT TB PPDU, or the NEXT TB PPDU may include a preamble including L-STF, L-LTF, L-SIG, RL-SIG, U-SIG, (EHT-/NEXT-)STF, and (EHT-/NEXT-)LTF in order, and may include data and packet extension (PE) following the preamble.

The triggering frame may include information necessary for transmission of the TB PPDU. When type subfields B3 and B2 of a MAC frame have a value of 01b and when subtype subfields B7, B6, B5, and B4 have a value of 0010b, the triggering frame may indicate a MAC frame trigger frame.

When multiple STAs responding to a trigger frame transmit TB PPDUs in different formats, it may be difficult for an access point to receive the TB PPDUs. Also, when TB PPDUs transmitted by the multiple STAs have different preambles, it may be difficult for the access point to receive the TB PPDUs. In particular, when RUs in which TB PPDUs having different formats are transmitted overlap, it may be difficult for the access point to receive the TB PPDUs. Therefore, multiple STAs transmitting responses to a single triggering frame may use TB PPDUs having an identical format. In addition, TB PPDUs transmitted by multiple STAs transmitting responses to a single triggering frame may have identical preamble information.

As illustrated with reference to FIG. 14, an HE STA may transmit an HE TB PPDU. Furthermore, an EHT STA may transmit an EHT TB PPDU or an HE TB PPDU. Furthermore, a NEXT STA may transmit a NEXT TB PPDU, an EHT TB PPDU, or an HE TB PPDU.

In the embodiment of FIG. 15, the AP transmits a trigger frame that schedules the transmission of an HE STA and the transmission of an EHT STA. When the trigger frame does not indicate the format of a TB PPDU to be transmitted in response to the trigger frame, the HE STA and the EHT STA or different EHT STAs may transmit TB PPDUs having different formats. This may result in failed TB PPDU transmission and wasted transmission opportunity. For ease of description, trigger frames defined in the HE, EHT, and NEXT standards are referred to as an HE trigger frame, an EHT trigger frame, and a NEXT trigger frame, respectively. Also, TRS defined in the HE, EHT, and NEXT standards are referred to as HE TRS, EHTTRS, and NEXT TRS. The format of the trigger frame will be described with reference to FIG. 16.

FIG. 16 illustrates the format of a trigger frame and subfields included in the trigger frame according to an embodiment of the present invention.

Specifically, FIG. 16A shows the format of a trigger frame, FIG. 16B shows a Common Info field of the trigger frame, and FIG. 16C shows a User Info field of the trigger frame. An MAC header of the trigger frame includes a Frame Control field, a Duration field, and an Address field. The Address field includes an RA field and a TA field. The trigger frame also includes a Common Info field and a User Info List field. The Common Info field includes information for all stays triggered by the trigger frame. Furthermore, the User Info List field may include a User Info field. In a specific embodiment, a specific type of trigger frame may not include a User Info List field. Furthermore, the trigger frame may include a Padding field and an FCS field. The Padding field may serve to increase the length of the frame in order to ensure the time required for an STA receiving the trigger frame to prepare a response, and may be optionally present.

The Common Info field may include a Trigger Type subfield. The Trigger Type subfield identifies a trigger frame variant. The trigger frame may indicate the type of trigger frame through a value of the Trigger Type subfield. In addition, information included in Trigger Dependent Common Info subfield and Trigger Dependent User Info subfield, and the length of the Trigger Dependent Common Info subfield and the Trigger Dependent User Info subfield are determined depending on the Trigger Type subfield. For example, the Trigger Type subfield may be represented by bits B0 to B3 of the Common Info field.

In addition, the Common Info field may include a UL Length subfield. The UL Length subfield may include information about the length of a TB PPDU responding to the trigger frame. Alternatively, the UL Length subfield may include information about the length of a frame responding to the trigger frame. In addition, the UL Length subfield may indicate a value to be included in a Length subfield of an L-SIG of the TB PPDU responding to the trigger frame. Therefore, an STA responding with a TB PPDU may set a Length subfield of an L-SIG of the TB PPDU, based on a value of an UL Length subfield included in the received trigger frame. More specifically, the STA responding with a TB PPDU may set the Length subfield of the L-SIG of the TB PPDU to the value of the UL Length subfield included in the received trigger frame. For example, the UL Length subfield may be represented by bits B4 to B15 of the Common Info field.

In addition, the Common Info field may include a UL BW subfield. The UL BW subfield may indicate a bandwidth (BW) value to be included in signaling fields of a TB PPDU responding to the trigger frame, e.g., the HE-SIG-A field or the U-SIG field. In addition, the UL BW subfield may indicate the maximum bandwidth of the TB PPDU responding to the trigger frame.

In addition, the Common Info field may include information or the like which is to be included in the signaling fields of the TB PPDU responding to the trigger frame, such as the HE-SIG-A field or U-SIG field.

The User Info field may include an AID12 subfield. The AID12 subfield may serve to indicate an intended receiver of the User Info field including the AID12 subfield, or the function of the User Info field. Thus, the AID12 subfield may serve to indicate an intended receiver of a trigger frame including the AID12 subfield, or the function of the trigger frame. For example, when the value of the AID12 subfield is a predetermined value, the User Info field may indicate a random-access resource unit (RA-RU). More specifically, when the value of the AID12 subfield is 0, the User Info field may indicate an RA-RU for an associated STA. Also, when the value of the AID12 subfield is 2045, the User Info field may indicate an RA-RU for an unassociated STA. A value of the AID12 subfield may indicate that a response is triggered by a User Info field containing a STA AID12 subfield corresponding to a STAID, for example, an association ID (AID), which the value of the AID12 subfield indicates, or a trigger frame containing the AID12 subfield. For example, the AID12 subfield may represent AID or 12 LSBs of the AID. An STA corresponding to a value of the AID12 subfield may respond to the trigger frame with a TB PPDU. In addition, the value of the AID12 subfield may be in the range of 1 to 2007 (including 1 and 2007). Furthermore, when the AID12 subfield has a predetermined value, for example, 2046, it may be indicated that a corresponding RU is not assigned to any STA. Additionally, when the AID12 subfield has a predetermined value, for example, 4095, it may be indicated that padding of the trigger frame is initiated.

In addition, information in the User Info field including the AID12 subfield may be information corresponding to an STA indicated by the AID12 subfield. For example, an RU Allocation subfield may indicate the size and location of an RU. In this case, a value of the RU Allocation subfield of the User Info field including an AID12 subfield may be information corresponding to an STA indicated by the AID12 subfield. The User Info field may also indicate a coding method (UL FEC Coding Type), a modulation method (UL HE-MCS or UL DCM), and transmission power (UL Target RSSI) used in a response to the trigger frame including the User Info field.

As discussed above, there may be a problem depending on a PPU format in which TB PPDUs transmitted simultaneously in response to a trigger frame are transmitted. In this regard, a triggering frame transmission method will be described with reference to FIG. 14.

FIG. 17 illustrates information indicated by a value of an AID12 subfield of a trigger frame according to an embodiment of the present invention.

An EHT STA according to an embodiment of the present invention may selectively transmit an HE TB PPDU or an EHT TB PPDU. Furthermore, a NEXT STA may selectively transmit an HE TB PPDU, an EHT TB PPDU, or a NEXT TB PPDU. This allows STAs of multiple wireless LAN standards to be scheduled in one frame or one PPDU. This may increase the efficiency of use of a transmission medium. For example, an HE STA, which does not support the EHT standard, and an EHT STA may be configured to respond with an HE TB PPDU in one frame.

Furthermore, information for selecting a TB PPDU format may be included in a trigger frame, TRS, a PPDU including the trigger frame, or a PPDU including the TRS.

According to an embodiment of the present invention, information about responding TB PPDU format may exist at a MAC level. According to an embodiment of the present invention, a trigger frame may be classified into an HE trigger frame, an EHT trigger frame, and a NEXT trigger frame. Furthermore, responses triggered by the HE trigger frame, the EHT trigger frame, and the NEXT trigger frame may be made with an HE TB PPDU, an EHT TB PPDU, and a NEXT TB PPDU, respectively.

Furthermore, the division into the HE trigger frame, the EHT trigger frame, and the NEXT trigger frame may have the same meaning as dividing TB PPDU formats to respond to trigger frames into an HE TB PPDU, an EHT TB PPDU, and a NEXT TB PPDU, respectively. Tha is, depending on the format of a trigger frame, the format of a TB PPDU corresponding thereto may also vary, and a next generation trigger frame may also instruct the transmission of a previous generation TB PPDU. That is, an EHT trigger frame may instruct the transmission of both an HE TB PPDU and an EHT TB PPDU. However, an HE trigger frame may not instruct the transmission of an EHT TB PPDU.

In a specific embodiment, a trigger frame may be determined to correspond to one of an HE trigger frame, an EHT trigger frame, and a NEXT trigger frame the trigger frame, based on a Frame Control field of a MAC header included in a trigger frame. For example, a trigger frame may be determined to correspond to one of an HE trigger frame, an EHT trigger frame, and a NEXT trigger frame, based on at least one of a Type subfield, a Subtype subfield, or a Control Frame Extension subfield of the Frame Control field of the MAC header included in the trigger frame. For example, when the Type subfield, the Subtype subfield, or the Control Frame Extension subfield of the Frame Control field of the MAC header included in the trigger frame has a first value, the trigger frame may be classified as an HE trigger frame. In addition, when the Type subfield, the Subtype subfield, or the Control Frame Extension subfield of the Frame Control field of the MAC header included in the trigger frame has a second value, the trigger frame may be classified as an EHT trigger frame. In addition, when the Type subfield, the Subtype subfield, or the Control Frame Extension subfield of the Frame Control field of the MAC header included in the trigger frame has a third value, the trigger frame may be classified as a NEXT trigger frame. When the value of the Type subfield in the Frame Control field of the MAC header is 01b and when the value of the Subtype subfield is 0010b, the trigger frame may be classified as an HE trigger frame. The Type subfield, the Subtype subfield, and the Control Frame Extension subfield are limited to 2 bits, 4 bits, and 4 bits, respectively. Therefore, this embodiment has the disadvantage of limiting a type can be used in the future by using the limited bit field values.

In another specific embodiment, a trigger frame may be determined to correspond to one of an HE trigger frame, an EHT trigger frame, and a NEXT trigger frame, based on a Common Info field included in the trigger frame. For example, when a Trigger Type subfield of a Common Info field of a trigger frame has a first value, the trigger frame may be classified as an HE trigger frame. When a Trigger Type subfield of a Common Info field of a trigger frame has a second value, the trigger frame may be classified as an EHT trigger frame. When a Trigger Type subfield of a Common Info field of a trigger frame has a third value, the trigger frame may be classified as a NEXT trigger frame. Specifically, when the value of a Trigger Type subfield of a Common Info field of a trigger frame is 0 to 7, the trigger frame may be classified as an HE trigger frame. Also, when the value of a Trigger Type subfield of a Common Info field of a trigger frame is not 0 to 7, the trigger frame may be classified as an EHT trigger frame or a NEXT trigger frame. Due to the limited number of bits in the Trigger Type subfield, this embodiment has the disadvantage of limiting a trigger type that can be used in the future by using the limited bit field values.

In another specific embodiment, a trigger frame may be determined to correspond to one of an HE trigger frame, an EHT trigger frame, and a NEXT trigger frame, based on a UL Length field included in the trigger frame. For example, when a UL Length field of a trigger frame has a remainder of a first value when divided by 3, the trigger frame may be classified as an HE trigger frame. When a UL Length field of a trigger frame has a remainder of a second value when divided by 3, the trigger frame may be classified as an EHT trigger frame. When a UL Length field of a trigger frame has a remainder of a third value when divided by 3, the trigger frame may be classified as a NEXT trigger frame. When a UL Length field of a trigger frame has a remainder other than 0 when divided by 3, the trigger frame may be classified as an HE trigger frame. When a UL Length field of a trigger frame has a remainder of 1 when divided by 3, the trigger frame may be classified as an HE trigger frame. When a UL Length field of a trigger frame has a remainder of 0 when divided by 3, the trigger frame may be classified as an EHT trigger frame or a NEXT trigger frame. Furthermore, a trigger frame may be determined to correspond to one of an HE trigger frame, an EHT trigger frame, and a NEXT trigger frame, based on, in addition to the value of a UL Length field of the trigger frame, at least one of a Format Identifier, a PHY Identifier, and TB PPDU format signaling of the trigger frame.

In another specific embodiment, a trigger frame may be determined to correspond to one of an HE trigger frame, an EHT trigger frame, and a NEXT trigger frame, based on a User Info field included in the trigger frame. Specifically, a trigger frame may be determined to correspond to one of an HE trigger frame, an EHT trigger frame, and a NEXT trigger frame, based on a value of an AID12 subfield of a User Info field of the trigger frame. For example, the trigger frame may be determined to correspond to one of an HE trigger frame, an EHT trigger frame, and a NEXT trigger frame, based on whether the value of the AID12 subfield of the User Info field of the trigger frame is a predetermined value. In this case, a User Info field including the AID12 subfield indicating the type of trigger frame may be the first User Info field in a User Info field list. The User Info field including the AID12 subfield indicating the type of trigger frame may be located before a User Info field including an AID12 subfield indicating AID of an STA. This allows an STA receiving a trigger frame to determine the type of trigger frame at an early stage. In another specific embodiment, a User Info field including an AID12 subfield indicating the type of trigger frame may be located after a User Info field for an HE STA in the list of User Info fields. This may prevent problems caused by the inability of a legacy STAs, i.e., an HE STAs, to determine the meaning of a value of the AID12 subfield. In addition, the User Info field including the AID12 subfield indicating the type of trigger frame may not include a subfield other than the AID12 subfield. This is because the User Info field is intended to indicate the trigger frame type, so information other than the trigger frame type may not be required. In this embodiment, the length of the User Info field varies depending on the value of the AID12 subfield. FIG. 17 illustrates the meaning of the value of an AID12 subfield when this embodiment is applied. When the value of an AID12 subfield is a first value, the AID12 subfield may indicate that a trigger frame including an AID12 subfield triggers the transmission of an EHT TB PPDU. The first value may be 2047. When the value of an AID12 subfield is a second value, the AID12 subfield may indicate that a trigger frame including an AID12 subfield triggers the transmission of a NEXT TB PPDU. The second value may be 2048.

In another specific embodiment, an STA may determine the format of a TB PPDU, which is transmitted in response to a trigger frame, based on the location of a User Info field that triggers the STA. Specifically, the STA may determine the format of a TB PPDU, which is transmitted in response to a trigger frame, based on whether a User Info field that triggers the STA is located after a User Info field that includes an AID12 subfield having a predetermined value. In this case, the STA may determine the format of a TB PPDU, which is transmitted in response to a trigger frame, based on whether the User Info field that triggers the STA is located after a User Info field including a AID12 subfield having a first value or after a User Info field including an AID12 subfield having a second value. In the embodiment of FIG. 17, when a User Info field triggering an STA is located after a User Info field including an AID12 subfield having a value of 2047, the STA may transmit an EHT TB PPDU in response to a trigger frame. In addition, when the User Info field that triggers the STA is located after a User Info field including an AID12 subfield having a value of 2048, the STA may transmit a NEXT TB PPDU in response to the trigger frame. In addition, when the User Info field that triggers the STA is located after the User Info field including the AID12 subfield having a value of 2047 and the User Info field containing the AID12 subfield having a value of 2048, the STA may transmit a NEXT TB PPDU in response to the trigger frame. Also, when the User Info field that triggers the STA is located before the User Info field including the AID12 subfield having a value of 2047 and the User Info field including the AID12 subfield having a value of 2048, the STA may transmit an HE TB PPDU in response to the trigger frame.

Based on a subfield of the User Info field other than the AID12 subfield, a trigger frame may be determined to correspond to one of an HE trigger frame, an EHT trigger frame, and a NEXT trigger frame.

A trigger frame may be determined to correspond to one of an HE trigger frame, an EHT trigger frame, and a NEXT trigger frame, based on a Padding field of the trigger frame. For example, a trigger frame may be determined to correspond to one of an HE trigger frame, an EHT trigger frame, or a NEXT trigger frame, based on whether the Padding field of the trigger frame includes a predetermined value.

Furthermore, the above-described embodiments may be applied in combination. For example, the above-described factors that contribute to determining whether a trigger frame is one of an HE trigger frame, an EHT trigger frame, and a NEXT trigger frame may be determined in combination.

Furthermore, the above-described embodiments may be used to determine the format of a TB PPDU to be transmitted in response to a TRS field.

Figure 18:
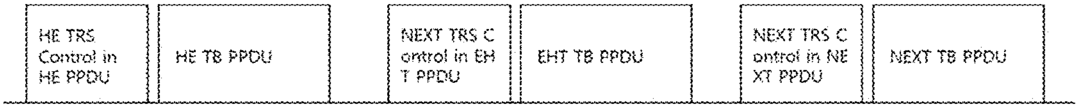
FIG. 18 illustrates a UL MU operation according to an embodiment of the present invention.

FIG. 18 illustrates a UL MU operation according to an embodiment of the present invention.

As described above, a trigger frame may include TRS in a MAC frame header. The TRS may be included in an HT Control field, as described above. Specifically, when the HT Control field includes an A-Control field, the HT Control field may include TRS. In addition, TRS may be included in a TRS Control field. Control List fields may be consecutively positioned in an A-Control field. In this case, the Control List fields may include TRS.

An STA that is an intended receiver of a MAC frame including TRS may transmit a PPDU based on a TRS field. In this case, the TRS may include information (UL Data Symbols) about the length of a frame or a PPDU to be transmitted by the STA in response to the MAC frame including the TRS. The TRS may include information about the power of transmission of response to the MAC frame including the TRS (AP Tx Power, UL Target RSSI), the location and size of an RU to be used when transmitting the response to the MAC frame including the TRS (RU Allocation), and information about a modulation method for the transmission of the response to the MAC frame including the TRS (UL HE-MCS).

The TRS may be defined for each wireless LAN standard. In this case, an STA, which has received a MAC frame including TRS, may determine, based on the format of the TRS, i.e., based on which WLAN standard defines the TRS, the format of a TB PPDU to be transmitted in response to the TRS. Specifically, when the STA receives an HE TRS, the STA may transmit an HE TB PPDU in response to the TRS. Also, when the STA receives EHT TRS, the STA may transmit an EHT TB PPDU in response to the TRS. Furthermore, when the STA receives NEXT TRS, the STA may transmit a NEXT TB PPDU in response to the TRS. In this case, the STA may determine which wireless LAN standard defines the TRS, based on a Control ID subfield of an A-Control subfield. TRS may be divided into HE TRS and TRS which is not HE TRS.

The format of TRS may be determined based on whether an HT Control field including the TRS is an HE variant, an EHT variant, or a NEXT variant. When the HT Control field including the TRS is an EHT variant, the TRS may be EHT TRS. Also, when the HT Control field including the TRS is a NEXT variant, the TRS may be NEXT TRS. Furthermore, the format of TRS may be determined based on whether the HT Control field is an HE variant, an EHT variant, or a NEXT variant, depending on what is the value of a predetermined bit among bits of the HT Control field including the TRS. For example, when values of the first and second bits B0 and B1 of the HT Control field are 11*b*, the HT Control field may be an HE variant. Furthermore, based on the first and second bits B0 and B1 of the HT Control field and an additional bit, such as a 32nd bit B31, it may be determined whether the HT Control field is an HE variant, an EHT variant, or a NEXT variant.

In the embodiment of FIG. 18, when TRS is included in an HE PPDU, an STA, which has received the HE PPDU, transmits an HE TB PPDU in response to the TRS. When TRS is included in an EHT PPDU, an STA, which has received the EHT PPDU, transmits an EHT TB PPDU in response to the TRS. When TRS is included in a NEXT PPDU, an STA, which has received the NEXT PPDU transmits a NEXT TB PPDU in response to the TRS.

In addition, depending on the format of a PPDU including TRS, information represented by a subfield included in the TRS may vary. When TRS is included in an HE PPDU, a subfield regarding an MCS included in the TRS, such as a UL HE-MCS subfield, may indicate a value corresponding to an HE MCS table. Also, when TRS is included in an EHT PPDU, a subfield regarding an MCS included in the TRS, for example, a UL HE-MCS subfield, may indicate a value corresponding to an EHT MCS table. Also, when TRS is included in a NEXT PPDU, a subfield regarding an MCS included in the TRS, for example, a UL HE-MCS subfield, may indicate a value corresponding to a NEXT MCS table. Also, information represented by the RU Allocation subfield may vary depending on the format of a PPDU including TRS.

Figure 19:
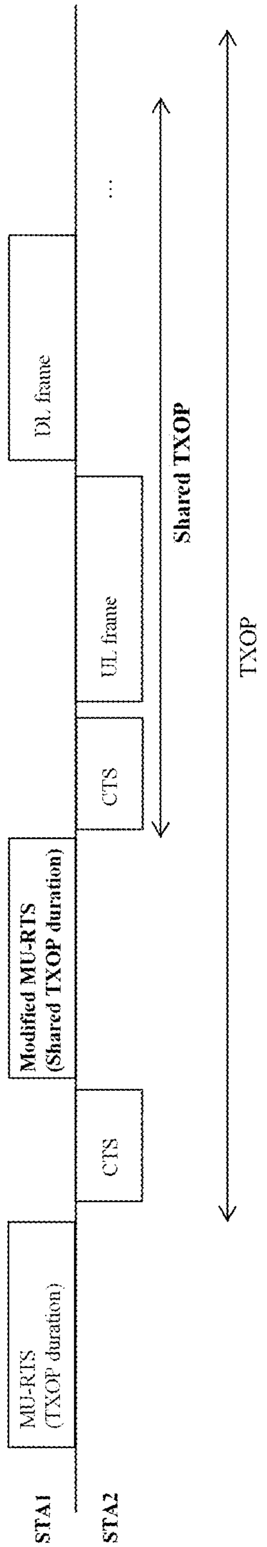
FIG. 19 illustrates a method for sharing a TXOP according to an embodiment of the present invention.

FIG. 19 illustrates a method for sharing a TXOP according to an embodiment of the present invention.

Referring to FIG. 19, a part or all of the TXOP set by an AP may be shared with a non-AP STA, and the non-AP STA may use the shared TXOPs to transmit a PLCP Protocol Data Unit (PPDU) to another non-AP STA (a third STA) and/or the AP. Hereinafter, in the present invention, sharing a TXOP with another STA may be referred to as TXOP sharing. Furthermore, an STA may be an AP or AP-STA that transmits a trigger frame, or a non-AP STA that receives the trigger frame. In addition, an STA may share TXOP or receive TXOP sharing.

Specifically, an STA may set (or acquire) a TXOP by transmitting a frame to establish the TXOP and then receiving a response thereto. After setting the TXOP, the STA may perform TXOP sharing by sharing the set TXOP. The response to the frame for setting the TXOP may include information about the length of the TXOP, and the length of the TXOP may be greater than zero. In this case, the response to the frame for setting the TXOP may be an immediate response, and may be transmitted after a specific time (e.g., SIFS) from the end of the frame (e.g., a PPDU) for setting the TXOP.

The length of the TXOP may be indicated based on duration information included in a frame transmitted by the STA. For example, the duration information may be included in a duration/ID field of an MAC header of a PPDU, and the length of the TXOP may be based on the duration information. The length of TXOP may be included in a preamble included in a PPDU of the frame transmitted by the STA. That is, the duration information may be included in a TXOP field included in a signaling field of the PPDU, and the signaling field may be a HE-SIG-A field or a U-SIG field.

TXOP sharing may be performed within a set TXOP, and one or more TXOPs may be shared during the set TXOP. That is, within the TXOP set by an STA, one or more TXOPs may be shared with another STA.

An STA that received TXOP sharing may transmit a PPDU during the shared TXOP to a STA that shared the TXOP or to another STA, wherein the transmitted PPDU may be a PPDU which is not a TB PDU (e.g., a non-TB PPDU). That is, the STA that received TXOP sharing may transmit a PPDU without receiving a trigger frame from an AP during the shared TXOP. In other words, an STA that received TXOP sharing, even when the SAT is not individually allocated a separate RU via a trigger frame during the shared TXOP, may transmit a PPDU by using an RU allocated by a trigger frame transmitted when receiving the shared TXOP, without receiving any additional trigger frame until the shared TXOP ends. Therefore, examples of a PPDU transmitted by the STA during the shared TXOP may include a non-HT PPDU, an HE PPDU, a VHT PPDU, an HE SU PPDU, or an EHT MU PPDU.

In TXOP sharing, during a shared TXOP, an STA that received TXOP sharing may transmit a frame to an STA that shared the TXOP or to a third STA (another STA). That is, when an AP sets a TXOP and shares a part or all of the set TXOP with an STA, the STA that received TXOP sharing may transmit a frame to the AP that shared the TXOP or to a third STA. In this case, the frame transmitted by the STA to the third STA are a frame transmitted between non-AP STAs, and thus may be a peer-to-peer (P2P) frame.

The TXOP sharing may be set through a specific frame. That is, a specific frame may indicate that a part or all of a set TXOP is shared, and an STA may receive the frame to use the shared TXOP. In this case, the specific frame may be transmitted by the STA that shares the TXOP. For example, TXOP sharing may be performed through a trigger frame transmitted by an AP. In this case, the trigger frame for TXOP sharing may be a specific type of trigger frame (e.g., an MU-RTS frame, or an MU-RTS trigger frame, etc.), and may be identified by the value of the trigger type subfield of the trigger frame described with reference to FIG. 16. That is, when the value of the trigger type subfield is set to a predetermined value (e.g., "3"), an STA receiving a trigger frame may recognize that a TXOP is shared, and may transmit a PPDU through the shared TXOP.

An MU-RTS frame, which is the frame for TXOP sharing, may be a frame that instructs transmission of a CTS frame from one or more STAs. For example, a CTS frame may be transmitted in immediate response to the MU-RTS frame, and the CTS frame may be a non-HT PPDU. Hereinafter, in the present invention, the MU-RTS frame for TXOP sharing may be referred to as a modified MU-RTS frame or an MU-RTS TXS trigger frame. However, the present invention is not limited thereto, and the frame for TXOP sharing may be have various names.

The sharing of a part or all of a TXOP may be configured for only one STA, or may be configured for one or more STAs. That is, in the case of TXOP sharing through a frame, one or more STAs for TXOP sharing may be indicated by the frame. In this case, the TXOP sharing may be configured within a TXOP set by a sharing STA, as described above. That is, a shared TXOP may not exceed the TXOP set by the sharing STA.

A duration of the shared TXOP may be indicated by a specific frame (e.g., a modified MU-RTS frame) for TXOP sharing. For example, the modified MU-RTS frame may include a UL length subfield, and the UL length subfield may include the duration of the shared TXOP. In this case, the UL length subfield may be the UL length subfield described with reference to FIG. 16. When the trigger frame indicates transmission of a TB PPDU, the UL length subfield may include information about the length of the indicated TB PPDU (or interval information for transmission of the TB PPDU).

Whether a transmitted MU-RTS frame is an MU-RTS frame for TXOP sharing (a modified MU-RTS frame) or an MU-RTS frame which is not used for TXOP sharing may be indicated by a specific field included in the frame. For example, when the value of a specific field included in a frame is a predetermined value, the MU-RTS frame may be a modified MU-RTS frame for TXOP sharing. In this case, the specific frame may be a GI and HE-LTF type subfield. For example, when a type field included in a trigger frame indicates an MU-RTS frame, whether the MU-RTS frame is a trigger frame for TXOP sharing may be identified depending on the value of a GI and HE-LTF type subfield may identify. That is, when the GI and HE-LTF type subfield is set to a predetermined value, a corresponding trigger frame may be a trigger frame for TXOP sharing (e.g., a modified MU-RTS frame or an MU-RTS TXS trigger frame).

Alternatively, whether a received frame is an MU-RTS frame for TXOP sharing (a modified MU-RTS frame or an MU-RTS TXS trigger frame) may be determined based on whether the MU-RTS frame includes a specific field and/or the number of specific fields. In this case, the specific field may be the User Info field or the User Info List field illustrated in FIG. 16. Specifically, whether a received MU-RTS frame is a frame for TXOP sharing may be determined based on the number of user information fields included in the MU-RTS frame. For example, when an MU-RTS frame does not include any user information field (when the number of user information fields is "0"), the MU-RTS frame may be a frame for TXOP sharing. In this case, when the MU-RTS frame is not a frame for TXOP sharing, the MU-RTS frame may be an MU-RTS frame instructing one or more STAs to transmit an existing CTS frame, or the existing MU-RTS frame may be an MU-RTS frame as defined by the 802.11ax standard.

Immediately after a CTS frame is transmitted in response to an existing MU-RTS frame, an STA (e.g., an AP) that transmitted the existing MU-RTS frame may transmit a frame or a PPDU. Also, immediately after a CTS frame is transmitted in response to a modified MU-RTS frame, an STA that transmitted the CTS frame may transmit a frame or a PPDU. Alternatively, in response to a modified MU-RTS frame, an STA that received TXOP sharing may transmit a PPDU or a frame other than a CTS frame. In this case, the frame or the PPDU may be a frame transmitted by the STA, having received the shared TXOP, during the shared TXOP, described above, or a PPDU including the frame transmitted by the STA, having received TXOP sharing, during the shared TXOP, respectively. That is, the frame or the PPDU may be directed to the AP or may be a P2P frame.

The wording "MU-RTS frame" in the present invention may be an existing MU-RTS frame. That is, the wording "MU-RTS frame" in the present invention may be an MU-RTS frame that is not a modified MU-RTS frame.

According to an embodiment of the present invention, a CTS frame may be transmitted in response to a modified MU-RTS frame. The CTS frame may be transmitted by an STA receiving TXOP sharing. In this case, the STA receiving TXOP sharing may transmit a frame immediately after transmitting the CTS frame. The STA receiving TXOP sharing may transmit a frame immediately after transmitting a PPDU including the CTS frame. The frame transmitted immediately after the transmission of the CTS frame may be included in the PPDU transmitted by the STA, having received TXOP sharing, during the shared TXOP described above. Alternatively, the frame transmitted immediately after the transmission of the CTS frame may be included in the above-described non-TB PPDU and transmitted. Also, in the present invention, "transmitting immediately after" may refer to transmitting after SIFS or PIFS time from the end of the PPDU including the CTS frame. The CTS frame may serve to indicate that the STA receiving TXOP sharing has received the TXOP sharing.

According to another embodiment, a CTS frame may not be transmitted in response to a modified MU-RTS frame. Also, immediately after a modified MU-RTS frame, an STA receiving TXOP sharing may transmit a frame. Alternatively, immediately after a PPDU including a modified MU-RTS frame, the STA receiving TXOP sharing may transmit a PPDU. In this case, the frame to be transmitted may be included in a PPDU transmitted by the STA having received TXOP sharing during the shared TXOP described above. Alternatively, in this case, the frame to be transmitted may be included in the above-described non-TB PPDU and transmitted. Also, in the present invention, "transmitting immediately after" may refer to transmitting after SIFS or PIFS time from the end of the PPDU including the modified MU-RTS frame.

According to an embodiment, the modified MU-RTS frame may include signaling about whether the STA receiving TXOP sharing should transmit a CTS frame. According to an embodiment, when the STA receiving TXOP sharing transmits a frame to an AP, it is possible to use a shared TXOP without a CTS frame. Also, when the STA receiving TXOP sharing transmits a P2P frame, it is possible to transmit a CTS frame and use a shared TXOP. Furthermore, even when the STA receiving TXOP sharing transmits a P2P frame, an RA field of a CTS frame transmitted immediately after a modified MU-RTS frame may be configured as an MAC address of an STA that transmitted the modified MU-RTS frame. This is because when the STA receiving TXOP sharing does not transmit, after receiving a modified MU-RTS frame, a frame including an address of an STA that transmitted the modified MU-RTS frame, it may be difficult for an STA performing TXOP sharing to know whether the modified MU-RTS frame has been successfully received by the STA receiving TXOP sharing.

Referring to FIG. 19, STA1 and STA2 may exist and may be associated with each other. Also, STA1 may be an AP. STA2 may be anon-AP STA. STA1 may transmit an MU-RTS frame. The MU-RTS frame may be an existing MU-RTS frame. The MU-RTS frame may include duration information regarding TXOP duration. The MU-RTS frame may solicit a CTS frame from one or more STAs. The one or more STAs may include STA2. STA2 may transmit a CTS frame in response to the MU-RTS frame. In this case, STA1 may be a TXOP holder. The TXOP holder may be an STA that has obtained a TXOP. The TXOP holder may transmit a frame, which the TXOP holder wants to transmit, during the TXOP. Also, in this case, STA2 may be a TXOP responder. The TXOP responder may be an STA that transmits a response to the frame transmitted by the TXOP holder. The TXOP responder may transmit a response to the frame transmitted by the TXOP holder during the TXOP. Alternatively, the TXOP responder may transmit a frame permitted by the TXOP holder during the TXOP. In the embodiment of FIG. 19, a description has been made of an example in which a TXOP is obtained based on an exchange of an MU-RTS frame and a CTS frame, but the present invention is not limited thereto and may be applied to obtaining a TXOP based on an exchange of other frames.

In FIG. 19, STA1 may perform TXOP sharing after acquiring a TXOP. For example, STA1 may transmit a modified MU-RTS frame, which is a frame that indicates TXOP sharing. For example, a modified MU-RTS frame may be transmitted to STA2. A transmitter address (TA) of the modified MU-RTS frame may be configured as an MAC address of STA1 or a value based on the MAC address of STA1. A receiver address (RA) of the modified MU-RTS frame may be configured as an MAC address of STA2 or a value based on the MAC address of STA2. Furthermore, in a User Info field included in the modified MU-RTS frame, a value of an AID12 subfield may indicate STA2. That is, in the User Info field included in the modified MU-RTS frame, the value of the AID12 subfield may indicate 12 LSBs of the AID of STA2. The modified MU-RTS frame may include information about the duration of a shared TXOP.

According to an embodiment, STA2 may transmit a CTS frame in response to a modified MU-RTS frame. Furthermore, STA2 may transmit a frame after transmitting the CTS frame. The frame that STA2 transmits after transmitting the CTS frame may not be a CTS frame. According to another embodiment, STA2 may not transmit a CTS frame in response to a modified MU-RTS frame. In this case, STA2 may transmit a frame, which is not a CTS frame, after the modified MU-RTS frame is transmitted. Furthermore, according to an embodiment, the frame, which is not a CTS frame and STA2 transmits after receiving the modified MU-RTS frame, may be a frame that transmitted to STA1. According to another embodiment, the frame, which is not a CTS frame and STA2 transmits after receiving the modified MU-RTS frame, may be a frame that is transmitted to STA3.

For example, an AP may set the AP's TXOP by transmitting a trigger frame to a non-AP STA (or an STA). In this case, when the AP desires to share a part or all of the TXOP set by the AP with the non-AP STA to which the trigger frame is transmitted, the AP may set a specific field (e.g., a GI and HE-LTF type subfield) of the trigger frame to a predetermined value and then transmit the trigger frame. In this case, the specific field may be referred to as a GI and HE-LTF type/triggered TXOP sharing mode subfield. Specifically, when the AP does not share the TXOP set by the AP, the GI and HE-LTF type/triggered TXOP sharing mode subfield may be set to "0" and may be interpreted as a GI and HE-LTF type subfield. However, when the AP does not share the TXOP set by the AP, the GI and HE-LTF type/triggered TXOP sharing mode subfield may be set to a value of "1" or "2", and may be interpreted as a triggered TXOP sharing mode subfield. When the GI and HE-LTF type/triggered TXOP sharing mode subfield has a value of "1" or "2", the corresponding trigger frame may be referred to as a modified MU-RTS frame or an MU-RTS TXS trigger frame. When the AP shares a part or all of the TXOP set by the AP, the GI and HE-LTF type/triggered TXOP sharing mode subfield of a trigger frame for TXOP sharing indicates a TXOP sharing mode. For example, the GI and HE-LTF type/triggered TXOP sharing mode subfield indicates whether the TXOP is shared only in transmission and reception with the AP that set the TXOP or also in transmission and reception with a third STA (another STA) in addition to the AP. That is, when the GI and HE-LTF type/triggered TXOP sharing mode subfield has a value of "1", the STA may transmit a PPDU to only the AP during the shared TXOP. However, when the GI and HE-LTF type/triggered TXOP sharing mode subfield has a value of "2", the STA may transmit a PPDU to another STA as well as to the AP during the shared TXOP. That is, when the GI and HE-LTF Type/Triggered TXOP Sharing Mode subfield has a value of "2", the STA may also perform peer-to-peer communication during the shared TXOP.

Table 1 below shows an example of TXOP sharing presence and mode based on the value of the GI and HE-LTF Type/triggered TXOP sharing mode subfield.

TABLE 1

| Value of GI and HE-LTF type/triggered TXOP sharing mode subfield | Description |
|---|---|
| 0 | MU-RTS trigger frame that does not initiate an MU-RTS TXOP sharing procedure |
| 1 | MU-RTS trigger frame that initiates a TXOP sharing procedure in which a scheduled STA can transmit a PPDU only to an addressed AP |
| 2 | MU-RTS trigger frame that initiates a TXOP sharing procedure in which a scheduled STA can transmit a PPDU to an addressed AP or another STA |
| 3 | Reserved |

Figure 20:
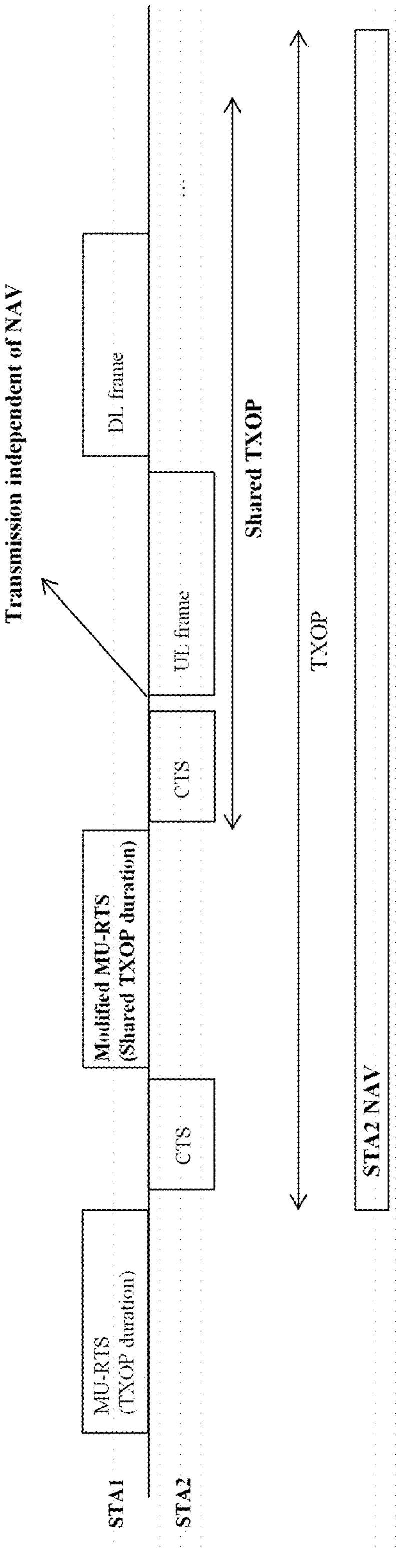
FIG. 20 illustrates a method for sharing a TXOP and setting a NAV according to an embodiment of the present invention.

FIG. 20 illustrates a method related to sharing a TXOP and setting a NAV according to an embodiment of the present invention.

An embodiment in FIG. 20 may be an embodiment that illustrates a problem of difficulty in performing the operation described with reference to FIG. 19 and a solution to the problem. The description of FIG. 19 may be omitted.

According to an embodiment of the present invention, an STA may set a network allocation vector (NAV) based on duration information included in a received frame or a received PPDU. Based on whether the NAV is set, a virtual carrier sense (CS) result may be determined to be idle or busy. When the NAV has a value of 0, the virtual CS result may be idle. When the NAV has a value greater than 0, the virtual CS result may be busy. Physical CS may be a clear channel assessment (CCA). If at least one of virtual CS or physical CS is busy, the CS result may be busy. If both the virtual CS and the physical CS are idle, the CS result may be idle. There may also be the case in which an STA includes multiple NAVs. For example, an STA may include an intra-BSS NAV and a basic NAV. The intra-BSS NAV may be an NAV set by an intra-BSS frame or an intra-BSS PPDU. A regular NAV may be a NAV set by an inter-BSS frame or an inter-BSS PPDU, or by a frame or a PPDU that cannot be determined to be intra-BSS or inter-BSS. In addition, the virtual CS may be busy when at least one of the intra-BSS NAV and the basic NAV has a value greater than 0. Alternatively, the NAV may be said to have a value greater than 0 when at least one of the intra-BSS NAV and the basic NAV is greater than 0. When both the intra-BSS NAV and the basic NAV are 0, the virtual CS can be idle. Alternatively, the NAV may be said to be 0 when both intra-BSS NAV and basic NAV are zero.

For an STA, an intra-BSS frame or an intra-BSS PPDU may be a frame or a PPDU that is determined to have been transmitted from the same BSS as the STA. For an STA, an inter-BSS frame or an inter-BSS PPDU may be a frame or PPDU that is determined to have been transmitted from a BSS different from the STA. The determination of whether transmission has been made from the same BSS or a different BSS may also be made based on a BSS color field included in a preamble of an PPDU, an address field included in a MAC header, etc. For example, when the BSS color field or the address field has a value corresponding to the same BSS, a frame or PPDU may be determined to be an intra-BSS frame or intra-BSS PPDU. Also, when the BSS color field or the address field does not include a value corresponding to the same BSS, the frame or the PPDU may be determined to be an inter-BSS frame or inter-BSS PPDU. The address field may include an RA field, a TA field, a BSSID field, etc.

According to an embodiment, when a Resource Allocation (RA) field of a received frame is not a MAC address of an SAT, the STA may set an NAV based on the received frame. Alternatively, an STA may set an NAV based on a received trigger frame. More specifically, an STA may set an NAV based on a trigger frame that is a received intra-BSS frame. In this case, the NAV may be an intra-BSS NAV. In this case, the NAV may be set regardless of whether the trigger frame triggers the STA. Alternatively, an STA may set an NAV when a received frame or a received PPDU does not indicate an immediate response from the STA.

According to an embodiment of the present invention, when the CS is busy, an STA may not transmit a frame or PPDU.

According to an embodiment of the present invention, an STA with an NAV set to a value greater than 0 may not be able to transmit a frame or a PPDU. More specifically, an STA with NAV set to a value greater than 0 may not be able to transmit a frame or PPDU when a predetermined condition is not satisfied.

According to an embodiment, an STA may perform transmission regardless of an NAV (or without considering the NAV) when a received frame is addressed to the STA and requires an immediate response. More specifically, the received frame may not be an RTS frame and may not be a trigger frame. That is, even when an NAV is set to a value greater than 0, an STA may perform transmission regardless of the NAV when a received frame is addressed to the STA and requires an immediate response. Furthermore, the case where a frame is addressed to an STA may include the case where an RA field of the frame is set to the address of the STA. Alternatively, the case where a frame is addressed to an STA may include the case where the frame includes an identifier corresponding to the STA. The identifier may include a MAC address, an association ID (AID), a MAC address-based ID, an AID-based ID, etc.

According to another embodiment, when a received frame has been transmitted from a TXOP holder, an STA may transmit a response to the received frame regardless of an NAV. In this case, the NAV may be an NAV that is set by the frame or PPDU transmitted by the TXOP holder. Alternatively, the NAV may be an intra-BSS NAV. Furthermore, the received frame may be an RTS frame. The fact that a frame has been transmitted from a TXOP holder may be determined based on a TA field included in the frame. An STA may store a TXOP holder address. When an STA has received an RTS frame transmitted by a TXOP holder, and when the RTS frame has been addressed to the STA, the STA may respond to the RTS frame without considering an NAV. In this case, a CTS frame may be transmitted in response to the RTS frame.

According to another embodiment, when a trigger frame is received, an STA may transmit a response to the trigger frame regardless of an NAV. In this case, the NAV may be limited to an intra-BSS NAV. Thus, when an NAV is set by an STA of the same BSS or by an AP of the same BSS, and when a response is indicated by a trigger frame, an STA may transmit a response to the trigger frame regardless of an NAV. When a trigger frame is received, an STA may determine whether to transmit a response thereto in consideration of an intra-BSS NAV and without considering a basic NAV. Furthermore, when an STA receives a trigger frame, the STA may determine whether to transmit a response to the trigger frame, based on a CS result. For example, a trigger frame may include signaling indicating whether determination of whether to transmit a response at the time of reception of the trigger frame is made based on a CS result. For example, the signaling may be the CS Required subfield shown in FIG. 16. If the CS Required subfield indicates that whether to respond is determined based on the CS result, an STA may respond to a trigger frame when virtual CS and physical CS indicate idle, and may not respond to the trigger frame when the virtual CS or the physical CS indicates busy. In this case, as a virtual CS, an intra-BSS NAV may not be considered and a basic NAV may be considered. Also, if the CS Required subfield indicates that a response is not based on the CS result, an STA may respond to a trigger frame without identifying a CS result.

In the embodiment of FIG. 19, in an STA that received a modified MU-RTS frame, an NAV has been set, and thus it is impossible to transmit a frame, which is not a CTS frame, during a shared TXOP. This will be further described with reference to FIG. 20.

With respect to FIG. 20, the description of FIG. 19 may be omitted. Referring to FIG. 20, STA1 and STA2 may be present, and may be associated with each other. Furthermore, STA1 may be an AP. STA2 may be a non-AP STA. STA1 may transmit an MU-RTS frame. STA2 may also transmit a CTS frame in response to the MU-RTS frame. In this case, STA2 transmits the CTS frame because physical CS result of STA2 is idle and a basic NAV is not set. Alternatively, STA2 may transmit the CTS frame because STA2 has received a frame that is addressed to STA2 and requires an immediate response. In this case, even if an exchange of other frames occurs besides the exchange of the MU-RTS and the CTS frame, STA2 may transmit a response frame based on a frame received from STA1 because the frame has been addressed to STA2 and requires an immediate response. In addition, STA2 may have set an NAV based on the MU-RTS frame or a frame other than the MU-RTS frame transmitted by STA1. In this case, the NAV may be an intra-BSS NAV.

In addition, STA1 may perform TXOP sharing with STA2. That is, STA1 may send a modified MU-RTS frame to STA2. In this case, as described above, STA2 may use a shared TXOP to 1) transmit a CTS frame followed by transmitting another frame, or 2) transmit another frame without transmitting a CTS frame. However, in this case, it is difficult for STA2 to transmit a frame because an NAV is set. For example, STA2 may have set an NAV by using a frame transmitted to obtain a TXOP before STA1 allocates a shared TXOP. In other words, STA2 may have set an NAV by receiving a frame which STA1 transmitted before transmitting a modified MU-RTS frame. Alternatively, STA2 may have set an NAV by receiving a frame transmitted from another STA during the same TXOP before receiving a modified MU-RTS frame addressed to STA2. Alternatively, STA2 may have set an NAV based on the modified MU-RTS frame addressed to STA2. That is, STA2 may have set an NAV because STA2 will receive at least a modified MU-RTS frame when using a shared TXOP. Therefore, it may be difficult for STA2 to transmit a frame by using a shared TXOP.

Thus, according to an embodiment of the present invention, an STA that received TXOP sharing may transmit a frame regardless of an NAV. For example, an STA that has received TXOP sharing may transmit a frame regardless of an NAV during a shared TXOP. For example, an STA that has received TXOP sharing may transmit a frame even when an NAV has been set (or even when an NAV is greater than 0). According to a more specific embodiment, the NAV may be limited to an intra-BSS NAV. For example, an STA that has received TXOP sharing may transmit a frame regardless of an intra-BSS NAV. Also, an STA that has received TXOP sharing may not transmit a frame when a basic NAV has been set. Alternatively, an STA that has received TXOP sharing may transmit a frame regardless of an NAV set by a frame or a PPDU sent by an associated AP. For example, when an NAV of an STA that has received TXOP sharing is set by a frame sent by an STA other than the associated AP, a frame may not be transmitted during a shared TXOP.

That is, when an STA receives sharing of a TXOP, the STA may transmit a PPDU regardless of an NAV set within the shared TXOP. Specifically, when an AP has transmitted a trigger frame (a modified MU-RTS frame or an MU-RTS TXS trigger frame) to share a TXOP, an NAV may be set by the AP within the shared TXOP. In this case, the STA having received the TXOP sharing may not transmit a PPDUs due to the NAV set within the shared TXOP. Therefore, the STA that has received the TXOP sharing may transmit a PPDU by ignoring the NAV which the AP sharing the TXOP has set within the shared TXOP.

The wording "frame" in the present invention may be replaced with a PPDU including a frame, and then the disclosure may be applied.

Furthermore, in this case, the frame, which the STA having received the TXOP sharing transmits regardless of an NAV, may be transmitted after SIFS from a preceding PPDU.

According to another embodiment, when an STA having received TXOP sharing transmits a frame, the STA may consider an NAV, provided that the STA transmits the frame after PIFS from a preceding PPDU.

Referring to FIG. 20, STA2 may set an NAV based on an MU-RTS frame or a modified MU-RTS frame. For example, an intra-BSS NAV may be set. Alternatively, STA2 may set an NAV based on an intra-BSS frame. Alternatively, STA2 may set an NAV based on a frame transmitted by an associated AP. In this embodiment, the wording "NAV" may refer to all of these NAVs. STA1 may perform TXOP sharing with STA2. STA2 may receive TXOP sharing through a modified MU-RTS frame. STA2 may transmit a frame regardless of an NAV when transmitting the frame in a shared TXOP. In this case, according to an embodiment, the transmitted frame may be a frame transmitted immediately after a CTS frame transmitted immediately after a received modified MU-RTS frame. In another embodiment, in this case, the transmitted frame may be a frame transmitted immediately after a received modified MU-RTS frame. In addition, according to an embodiment, the frame transmitted by STA2 may be a frame sent to an STA that transmitted a modified MU-RTS frame. That is, an RA field of the transmitted frame may be set to a value of a TA field of a received modified MU-RTS frame. Alternatively, the RA field of the transmitted frame may be set to a MAC address of an AP. According to another embodiment, the frame transmitted by STA2 may be a frame transmitted to STA3. Furthermore, "transmitting a frame immediately after" may imply that a start time point of transmission of a PPDU including the frame is after SIFS from the end of a preceding PPDU.

Figure 21:
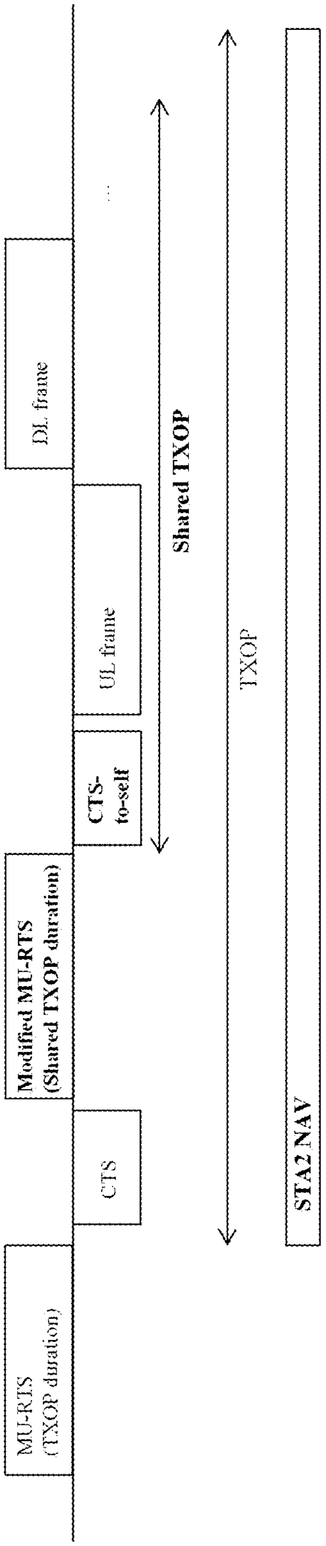
FIG. 21 illustrates sharing of a TXOP and transmission of a CTS frame according to an embodiment of the present invention.

FIG. 21 illustrates sharing of a TXOP and transmission of a CTS frame according to an embodiment of the present invention.

The embodiment of FIG. 21 may be a method for solving the problems described in FIGS. 19 and 20. Therefore, the foregoing description may be omitted.

According to an embodiment of the present invention, in order to solve the problem of difficulty in transmitting a frame during a shared TXOP in consideration of an NAV, a frame sequence may be continued such that a condition in which a response can be transmitted regardless of NAV is satisfied.

According to an embodiment of the present invention, an STA that has received TXOP sharing may transmit a CTS-to-self frame in response to a modified MU-RTS frame. The CTS-to-self frame may be a CTS frame in which an RA field is set to a MAC address of the STA transmitting the CTS-to-self frame. In this case, an STA making the TXOP sharing may determine that a shared TXOP has been successfully allocated, provided that after transmitting the modified MU-RTS frame, the STA receives a frame including the MAC address of the STA receiving the TXOP sharing.

Referring to FIG. 21, STA2 may receive a modified MU-RTS frame from STA1. Furthermore, STA2 may transmit a CTS-to-self frame immediately after the modified MU-RTS frame. That is, STA2 may set an RA field of a CTS frame to a MAC address of STA2 and transmit the CTS frame. In this case, the CTS-to-self frame sent by STA2 may be considered to be a frame addressed thereto and requiring an immediate response. Alternatively, STA2 may consider that transmission of the CTS-to-self frame is reception of a frame addressed thereto and requiring an immediate response. Therefore, STA2 may transmit a frame immediately after the CTS-to-self frame, even when an NAV is set.

According to an embodiment of the present invention, the RA field of a CTS frame transmitted in response to an RTS frame or an MU-RTS frame may be set to a TA field value of the RTS frame or the MU-RTS frame, or to a value obtained by setting an Individual/Group bit in the TA field value to 0. However, an additional method for setting the RA field of a CTS frame may be defined in order to transmit a CTS-to-self frame as that described in FIG. 21. For example, the RA field of a CTS frame transmitted in response to a modified MU-RTS frame may be set to a MAC address of an STA transmitting the CTS frame.

According to an embodiment of the present invention, an STA that has received TXOP sharing may perform recovery within a shared TXOP. That is, an STA that has received TXOP sharing may perform recovery when a frame transmitted by the STA within a shared TXOP fails. For example, an STA that has received TXOP sharing may transmit a frame after PIFS when a frame transmitted by the STA within a shared TXOP fails. According to an embodiment of the present invention, a TXOP holder may perform recovery. In addition, when a TXOP holder has performed TXOP sharing, an STA that has received the TXOP sharing may perform recovery. That is, when an STA, which is 1) a TXOP responder or 2) is neither a TXOP holder nor a TXOP responder, becomes an STA that has received TXOP sharing, it is possible to perform recovery. In addition, even when transmitting a first frame other than a CTS frame after reception of a modified MU-RTS frame, the STA that received the TXOP sharing may perform a recovery operation provided that the frame other than the CTS frame fails. For example, a TXOP holder may not perform a recovery operation when a first transmitted frame in a sequence fails. In this case, a TXOP may not been obtained. However, an STA that has received TXOP sharing may perform a recovery operation even when a first frame other than a CTS frame, transmitted in a shared TXOP, fails.

Referring to FIG. 21, STA2 may transmit a UL frame shown in the drawing, and may perform a recovery operation when the transmission of the UL frame fails. That is, STA2 may transmit a UL frame and may retransmit the frame when STA2 does not receive a DL frame shown in the drawing. In this case, the retransmitted frame may start to be transmitted after PIFS from the end of a PPDU including the failed UL frame shown in the drawing. In addition, whether a channel is idle during recovery may be identified. Also, in the recovery operation performed by the STA that has received the TXOP sharing, only physical CS may be considered without considering virtual CS.

Figure 22:
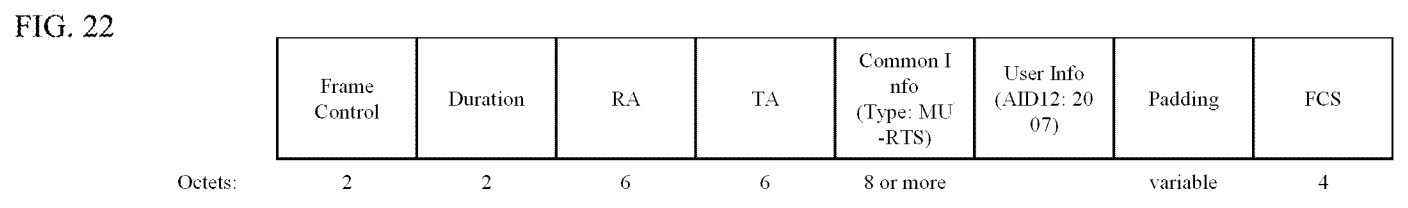

FIG. 22 illustrates an example of a trigger frame for sharing a TXOP according to an embodiment of the present invention.

As described with reference to FIG. 19, whether a trigger frame is a modified MU-RTS frame may be based on the number of user information fields. However, the trigger frame defined by the 802.11ax standard may have been designed without considering a function extended in later standards. Thus, for example, the common information field (Common Info field) shown in FIG. 16B may not have enough signaling space to include the expanded function. Thus, according to an embodiment of the present invention, a user information field including a predetermined AID12 subfield value may have a format different from that shown in FIG. 16C. Furthermore, the user information field including the predetermined AID12 subfield value may include information corresponding to all or one or more receivers of a trigger frame including the user information field. For example, the user information field including the predetermined AID12 subfield value may include information about at least one among PHY version ID, bandwidth extension, bandwidth, spatial reuse, and U-SIG reserved bits. Furthermore, the predetermined AID12 subfield value may be based on a value that is not allocated as an actual AID. The predetermined AID12 subfield value may be 12 LSBs of a value that is not allocated as the actual AID. For example, the predetermined AID12 subfield value may be 2007.

Furthermore, the aforementioned expanded function may include, for example, a widened bandwidth. For example, the bandwidth may be extended from a maximum of 160 MHz to a maximum of 320 MHz. In addition, the extended function may include information for generating a U-SIG field.

Thus, according to an embodiment of the present invention, in order to use the extended function even within a modified MU-RTS frame or a shared TXOP, the modified MU-RTS frame may include the user information field that includes the aforementioned predetermined AID12 subfield value.

According to an embodiment of the present invention, a modified MU-RTS frame may include no user information field or only the user information field including the aforementioned predetermined AID12 subfield value as a user information field. That is, when a received trigger frame includes no user information field or only the user information field including the aforementioned predetermined AID12 subfield value as a user information field, the trigger frame may be determined to be a modified MU-RTS frame. Alternatively, when a received MU-RTS frame includes no user information field or includes only the user information field including the aforementioned predetermined AID12 subfield value as a user information field, the MU-RTS frame may be determined to be a modified MU-RTS frame. In this case, an STA that receives TXOP sharing may be indicated by an RA field of the trigger frame.

Referring to FIG. 22, a modified MU-RTS frame may have a Type subfield that is set to MU-RTS. The modified MU-RTS frame may also have one user information field, wherein an AID12 subfield included in the user information field may be set to a predetermined value. In this case, the predetermined value may be a value that is not allocated as an AID. Furthermore, the predetermined value may be a value that is different from 12 LSBs of an AID of an STA having an RA field value of the modified MU-RTS frame as a MAC address. For example, the predetermined value may be 2007. Alternatively, the modified MU-RTS frame may include no user information field. That is, an STA that received a trigger frame may determine that the trigger frame is a modified MU-RTS frame when the Type of the trigger frame is configured as an MU-RTS frame, and when the trigger frame does not include any user information field or includes only a user information field including the AID12 subfield having the preset value.

Figure 23:
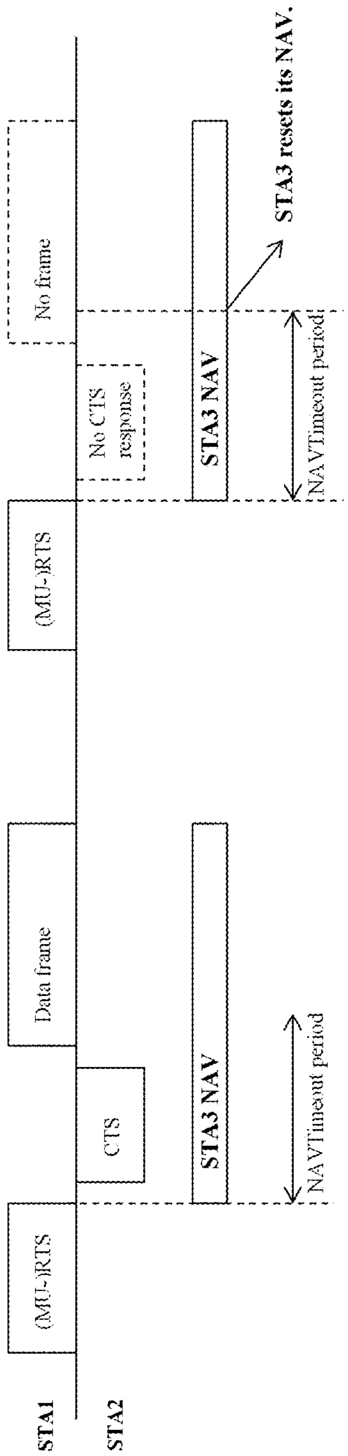
FIG. 23 illustrates NAV timeout according to an embodiment of the present invention.

FIG. 23 illustrates NAV timeout according to an embodiment of the present invention.

According to an embodiment of the present invention, an STA may reset a set NAV. For example, when an NAV is set based on an RTS frame or an MU-RTS frame, it may be possible to reset the NAV. More specifically, when an NAV is set based on an RTS frame or an MU-RTS frame, it may be possible to reset the NAV when PPDU reception is not be successfully started for a predetermined time. This operation may be called a NAV timeout or NAVTimeout. The predetermined time may be called an NAVTimeout period or NAV timeout period. The NAVTimeout period may start when PHY-RXEND.indication primitive corresponding to an RTS frame or an MU-RTS frame is received.

In an embodiment of the present invention, setting an NAV based on an RTS frame or an MU-RTS frame may imply that the most recent NAV update was based on an RTS frame or an MU-RTS frame. If duration information received by an STA from an RTS frame or an MU-RTS frame has a value greater than the current NAV value of the STA, an NAV may be set or updated based on the RTS frame or the MU-RTS frame. The duration information may be obtained based on a Duration/ID field included in a MAC header, or based on TXOP duration or a TXOP field included in a preamble of a PPDU.

Furthermore, in an embodiment of the present invention, when PPDU reception is successfully started, PHY-RXSTART.indication primitive may be received. Alternatively, when PPDU reception is successfully started, the PHY-RXSTART.indication primitive may be issued. The PHY-RXSTART.indication primitive may be transferred from a PHY to a MAC. For example, the PHY-RXSTART.indication primitive may be generated when the PHY has received a valid start of a PPDU. In addition, the reception of the valid start of the PPDU may refer to reception of a valid PHY header. In addition, the PHY-RXSTART.indication primitive may be generated after determining a PPDU format. When the PHY-RXSTART.indication primitive is generated, the PHY may maintain a physical medium in a busy status during the length of the PPDU or a length indicated by a preamble of the PPDU indicates. If the PHY-RXSTART.indication primitive is generated, the PHY may maintain the physical medium in a busy status during the length of the PPDU or a length indicated by the preamble of the PPDU, even when reception fails in the middle of the PPDU. In addition, PHY-RXEND.indication may be generated when PPDU reception has ended.

According to an embodiment of the present invention, the aforementioned NAV timeout period may be based on the response time to an RTS frame or an MU-RTS frame. That is, if a response to an RTS frame or an MU-RTS frame is a CTS frame, the NAV timeout period may be based on a CTS frame time. The CTS frame time may be represented by CTS_Time. Alternatively, a response time regarding the RTS frame or the MU-RTS frame may be represented by CTS_Time. In this case, the response time regarding the RTS frame or the MU-RTS frame may refer to the length of a PPDU including the response.

According to an embodiment, the NAV timeout period may be based on at least one of the following.

1) CTS_Time
2) aSIFSTime
3) aRxPHYStartDelay
4) aSlotTime

According to an embodiment, CTS_Time may be calculated based on a predetermined rate. That is, CTS_Time may be the length of a CTS frame that is calculated based on the predetermined rate. Alternatively, the CTS_Time may be the length of the PPDU containing the CTS frames calculated based on the predetermined rate. For example, the predetermined rate may be 6 Mbps. For example, CTS_Time may be calculated based on a data rate of 6 Mbps. Alternatively, the predetermined rate may be the rate of an RTS frame or an MU-RTS frame that caused an NAV to be set. Alternatively, the predetermined rate may be a rate indicated by the RTS frame or MU-RTS frame that caused the NAV to be set.

According to an embodiment, aSIFSTime may be a SIFS length. For example, aSIFSTime may be 10 us when operating in the 2.4 GHz band. For example, aSIFSTime may be 16 us when operating in the 5 GHz band or 6 GHz band.

According to an embodiment, aRxPHYStartDelay may be a delay from the start of a PPDU until a receiver generates PHY-RXSTART.indication primitive. For example, aRxPHYStartDelay may be the time from the start of a PPDU to determination of a PPDU format. For example, aRxPHYStartDelay may vary depending on the PPDU format. aRxPHYStartDelay may be 20 us for a non-HT PPDU. Also, aRxPHYStartDelay may be 28 us for an HT PPDU of an HT-mixed format. Also, aRxPHYStartDelay may be 24 us for an HT PPDU of a HT-greenfield format. Also, aRxPHYStartDelay may be (36+4*(the maximum possible value for N_VHT-LTF supported)+4) us for a VHT PPDU. N_VHT-LTF may be the number of VHT-LTFs. Also, aRxPHYStartDelay may be 32 us for an HE SU PPDU or an HE TB PPDU. Also, aRxPHYStartDelay may be 40 us for an HE ER SU PPDU. Also, aRxPHYStartDelay may be (32+

4*N_HE-SIG-B) us for an HE MU PPDU. N_HE-SIG-B may be the number of OFDM symbols in an HE-SIG-B field. Also, aRxPHYStartDelay may be 32 us for an EHT MU PPDU or an EHT TB PPDU.

According to an embodiment, the NAV timeout period may be ((2*aSIFSTime)+(CTS_Time)+aRxPHYStartDelay+(2*aSlotTime)).

According to an embodiment of the present invention, an RTS frame may be a frame that indicates a CTS frame. Alternatively, the RTS frame may be a frame that indicates a CTS frame from a single STA. The RTS frame may include a Frame Control field, a Duration field, an RA field, a TA field, and an FCS field. The Duration field may include time information required for STAs receiving the Duration field to set NAVs. Furthermore, the RA field may include an address of an intended immediate receiver. For example, when an RA field included in an RTS frame received by an STA is the address of the STA, it is possible to respond to the RTS frame with a CTS frame. It may also be determined that a frame is an RTS frame, based on a frame control field included in the frame. For example, it may be determined that a frame is an RTS frame, based on a Type subfield and a Subtype subfield included in a Frame Control field included in the frame. For example, when a Type subfield is 01 (B3 B2) and a Subtype subfield is 1011 (B7 B6 B5 B4), a frame including the Type subfield and the Subtype subfield may indicate an RTS frame. For example, an RTS frame may be a Control frame.

A CTS frame may include a Frame Control field, a Duration field, an RA field, and an FCS field. The duration field may include time information for STAs receiving the duration field to set NAVs. For example, when a Type subfield is 01 (B3 B2) and a Subtype subfield is 1100 (B7 B6 B5 B4), a frame including the Type subfield and the Subtype subfield may indicate a CTS frame. For example, a CTS frame may be a Control frame.

Referring to the first sequence of FIG. 23, STA1, STA2, and STA3 may be present. Furthermore, STA1 may transmit an RTS frame or an MU-RTS frame to STA2. For example, when the RA field of the RTS frame or the MU-RTS frame is set to an address of STA2, the RTS frame or the MU-RTS frame may be transmitted to STA2. Alternatively, when a User Info field contained in the MU-RTS frame indicates STA2, the MU-RTS frame may be transmitted to STA2. When STA2 has successfully received the RTS frame or the MU-RTS frame, it is possible to respond with a CTS frame. In this case, STA2 may respond based on a carrier sense result. In addition, when STA3 receives the RTS frame or the MU-RTS frame, STA3 may set an NAV based on duration information included in the RTS frame or the MU-RTS frame or duration information included in a PPDU including the RTS frame or the MU-RTS frame. Also, when STA1 successfully receives a CTS frame transmitted by STA2, STA1 may send a frame to STA2. In addition, after setting the NAV, STA3 may have received a CTS frame transmitted by STA2 or a frame transmitted by STA1 to STA2. In this case, STA3 may receive the PHY-RXSTART.indication primitive within the NAVTimeout period. Therefore, the NAV set by STA3 may not be reset.

Referring to the second sequence of FIG. 23, STA1, STA2, and STA3 may be present. Furthermore, STA1 may transmit an RTS frame or an MU-RTS frame to STA2. If STA2 does not successfully receive the RTS frame or the MU-RTS frame, STA2 may not respond with a CTS frame. Alternatively, STA2 may have successfully received the RTS frame or the MU-RTS frame but may not respond with a CTS frame, based on a carrier sense result. In this case, a sequence of frames sent by STA1 to STA2 may not be continuous.

Furthermore, when STA3 receives the RTS frame or the MU-RTS frame, STA3 may set an NAV based on duration information included in the RTS frame or the MU-RTS frame or duration information included in a PPDU including the RTS frame or the MU-RTS frame. In addition, after STA3 sets the NAV, STA3 may not receive a CTS frame transmitted by STA2 or a frame transmitted by STA1 to STA2 after STA3 has established its NAV. In this case, STA3 may not have received PHY-RXSTART.indication primitive within the NAVTimeout period. Therefore, the NAV set by STA3 can be reset. This may solve the problem that STA3 fails to access a channel by maintaining the NAV even though the sequence has not continued.

Figure 24:
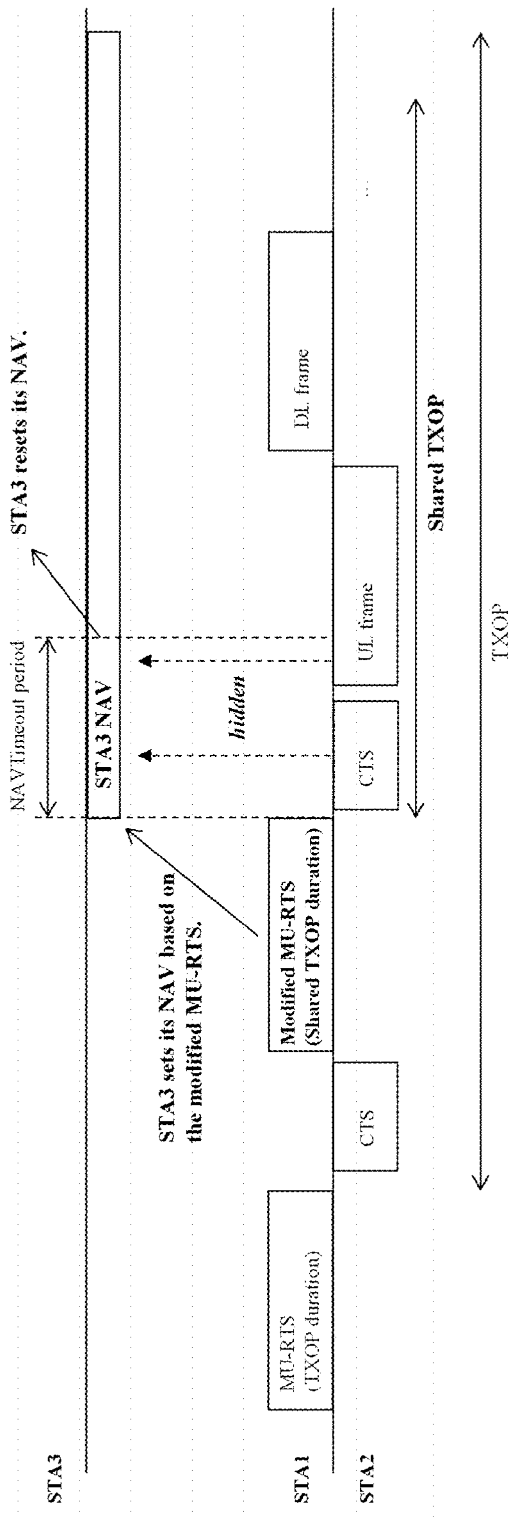
FIG. 24 illustrates TXOP sharing and NAV timeout according to an embodiment of the present invention.

FIG. 24 illustrates TXOP sharing and NAV timeout according to an embodiment of the present invention.

Referring to FIG. 24, as described above, it is possible for STA1 to perform TXOP sharing with STA2. STA1 may be an STA performing the TXOP sharing and STA2 may be an STA receiving the TXOP sharing. STA1 may transmit the first frame of a sequence to STA2. Referring to FIG. 24, the first frame of the sequence, transmitted from STA1 to STA2, may be an MU-RTS frame. In addition, a CTS frame, which is a response to the MU-RTS frame, may be transmitted.

For example, a CTS frame may be transmitted from STAs including STA2. STA1 may obtain a TXOP. In addition, STA3 may not have successfully received the MU-RTS frame and the CTS frame. STA1 may transmit a modified MU-RTS frame to STA2. That is, STA1 may perform TXOP sharing with STA2. In addition, STA3 may successfully receive the modified MU-RTS frame. Therefore, STA3 may set an NAV based on the modified MU-RTS frame. In this case, STA3 may have set the NAV based on the MU-RTS frame. Furthermore, according to the above-described TXOP sharing sequence, in response to the modified MU-RTS frame, STA2 may 1) transmit a CTS frame, and transmit a frame immediately after transmitting the CTS frame. Alternatively, for the modified MU-RTS frame, STA2 may 2) transmit a frame without transmitting a CTS frame. Also, STA3 may not receive a frame or a PPDU from STA2. For example, STA3 may exist in a location that STA3 is hidden from STA2. For example, power transmitted by STA2 may not be sufficient to be received by STA3. In this case, STA3 may not receive a PPDU during an NAV timeout period. This is because the NAV timeout period is determined based on CTS_Time. That is, when STA2 transmits a frame after transmitting a CTS frame, the NAVTimeout period will end while the frame is being transmitted to STA3. Alternatively, when STA2 transmits a frame without transmitting a CTS frame, the frame is likely to be longer than the CTS frame, and thus the NAVTimeout period will end while the frame is being transmitted to STA3. Therefore, STA3 may reset the NAV. If STA3 reset the NAV, STA3 may access a channel to interrupt a sequence during a shared TXOP.

Figure 25:
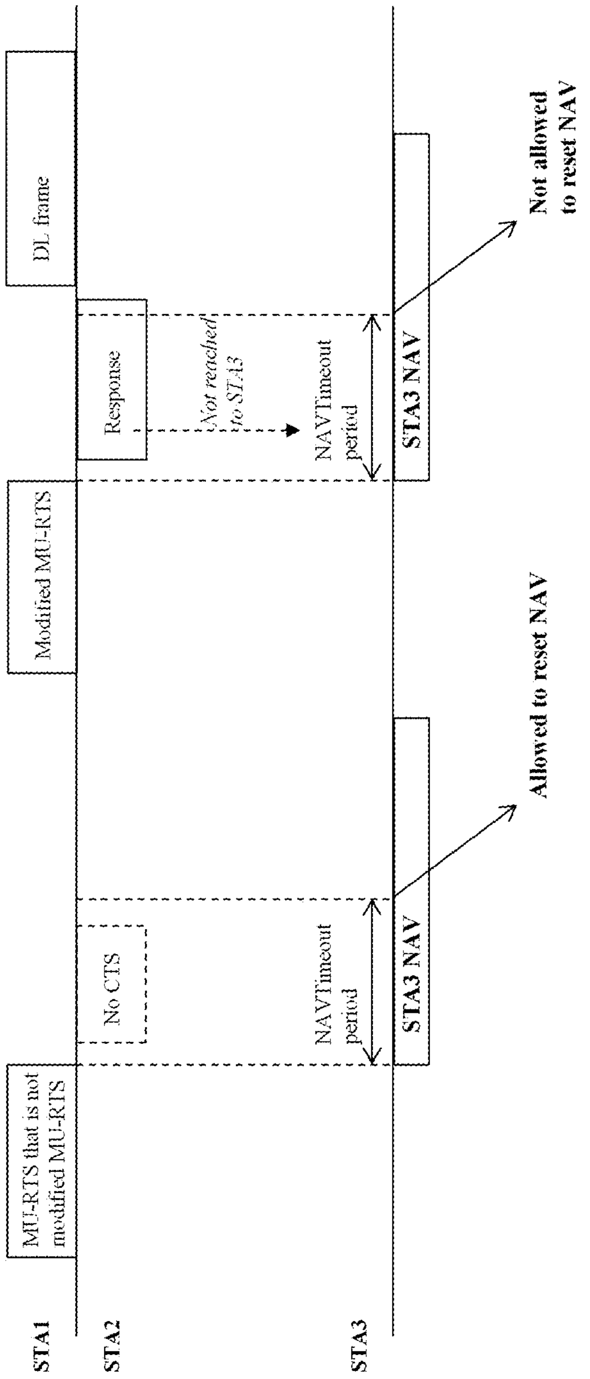
FIG. 25 illustrates TXOP sharing and NAV timeout according to another embodiment of the present invention.

FIG. 25 illustrates TXOP sharing and NAV timeout according to another embodiment of the present invention.

Referring to FIG. 25, when a TXOP is shared by an AP, an STA (a third STA) other than an STA with which the TXOP is shared by the AP may not release the shared TXOP even when a CTS frame or another frame has not been transmitted from the STA, with which the TXOP is shared, for a predetermined time. The embodiment of FIG. 25 may be intended to solve the problems described with reference to FIGS. 23 and 24. In addition, the foregoing descriptions may be omitted.

Specifically, a NAV timeout for releasing a TXOP may or may not be allowed based on whether a trigger frame (e.g., an MU-RTS frame) transmitted from an AP is a modified MU-RTS frame or an MU-RTS TXS trigger frame for sharing the TXOP. That is, whether an STA other than an STA in which a TXOP has been set is allowed a NAV timeout for releasing a set TXOP may be determined based on depending on whether the TXOP is a normally set TXOP or a TOXP which is set by an AP and shared in part or in whole.

For example, when an NAV is set based on an MU-RTS frame that is not a frame (a modified MU-RTS frame or an MU-RTS TXS trigger frame) for sharing of a part or all of the set TXOP, the NAV timeout may be allowed. That is, when an STA sets an NAV based on an MU-RTS frame, the NAV may be reset, provided that the MU-RTS frame is not a modified MU-RTS frame and that PPDU reception is not successfully started during an NAVTimeout period.

However, when an NAV is set by a modified MU-RTS frame or an MU-RTS TXS trigger frame, which is frame for sharing a part or all of a set TXOP, NAV timeout may not be allowed. That is, when an STA sets an NAV based on an MU-RTS frame, and when the MU-RTS frame is an MU-RTS TXS trigger frame or a modified MU-RTS frame for TXOP sharing, the STA may not reset the NAV even when the STA does not successfully start PPDU reception during an NAVTimeout period.

That is, when the most recent frame received by an STA in order to update an NAV is a modified MU-RTS frame or an MU-RTS TXS trigger frame that is a frame for TXOP sharing, the STA must not reset the NAV after the NAV-Timeout has expired.

Determining whether a received MU-RTS frame is a modified MU-RTS frame may follow the above-described embodiment. For example, whether an MU-RTS frame is a modified MU-RTS frame may be determined based on a GI and HE-LTF Type subfield included in the MU-RTS frame. For example, when a GI and HE-LTF Type subfield has a value of 0, an MU-RTS frame including the GI and HE-LTF Type subfield may not be a modified MU-RTS frame. Also, when a GI and HE-LTF Type subfield has a non-zero value, an MU-RTS frame including the GI and HE-LTF Type subfield may be a modified MU-RTS frame. For example, when a GI and HE-LTF Type subfield has a value of 1 or 2, an MU-RTS frame including the GI and HE-LTF Type subfield may be a modified MU-RTS frame.

In accordance with an embodiment of the present invention, it is possible to prevent the problem described with reference to FIG. 24, i.e., the problem that an STA sets an NAV based on a modified MU-RTS frame, and then performs a NAV timeout operation to interrupt the sequence of a shared TXOP.

Furthermore, this embodiment can be performed by terminals after the 802.11be standard (a terminal following subsequent standards including the EHT standard), but cannot be performed by terminals (HE STAs) following the 802.11ax standard. HE STAs cannot perform the above embodiment, but the above embodiment may reduce the probability that the described problems will occur.

Referring to FIG. 25, there may be STA1, STA2, and STA3. In addition, STA1 may send an MU-RTS frame to STA2. For example, STA1 may transmit an MU-RTS frame that is not a modified MU-RTS frame. However, STA2, an intended receiver of the MU-RTS frame, may not respond to the MU-RTS frame. Therefore, STA2 may not transmit a CTS frame. In addition, STA3 may set an NAV based on the MU-RTS frame. However, since STA2 failed to transmit the CTS frame, STA3 may not have successfully started PPDU reception during an NAVTimeout period. In this case, STA3 may reset the set NAV based on an NAV timeout operation. This may be because a frame that caused STA3 to set the NAV was an MU-RTS frame and not a modified MU-RTS frame.

In addition, STA1 may transmit a modified MU-RTS frame. In FIG. 25, frames preceding a modified MU-RTS frame may have been omitted. STA2, which is the intended receiver of the modified MU-RTS frame, may respond to the modified MU-RTS frame. In addition, STA3 may set an NAV based on the modified MU-RTS frame. However, STA3 may not have received the response, transmitted by STA2, to the modified MU-RTS frame. For example, this may be because the response transmitted by STA2 to STA3 may not be heard with sufficient power. For example, this may be because STA3 and STA2 are far away from each other. In this case, STA3 may not have successfully started PPDU reception during the NAVTimeout period. This may be because STA2 transmitted a frame after transmitting a CTS frame, after a modified MU-RTS frame. Alternatively, this may be because STA2 transmitted, after a modified MU-RTS frame, a frame longer than a CTS frame. Alternatively, this may be because that STA2 transmitted, after the modified MU-RTS frame, a PPDU that is longer than a PPDU including a CTS frame. In this case, STA3 may not perform an operation of resetting the NAV based on the NAV timeout operation. This may be because the frame that caused STA3 to set the NAV is an MU-RTS frame that is a modified MU-RTS frame.

Figure 26:
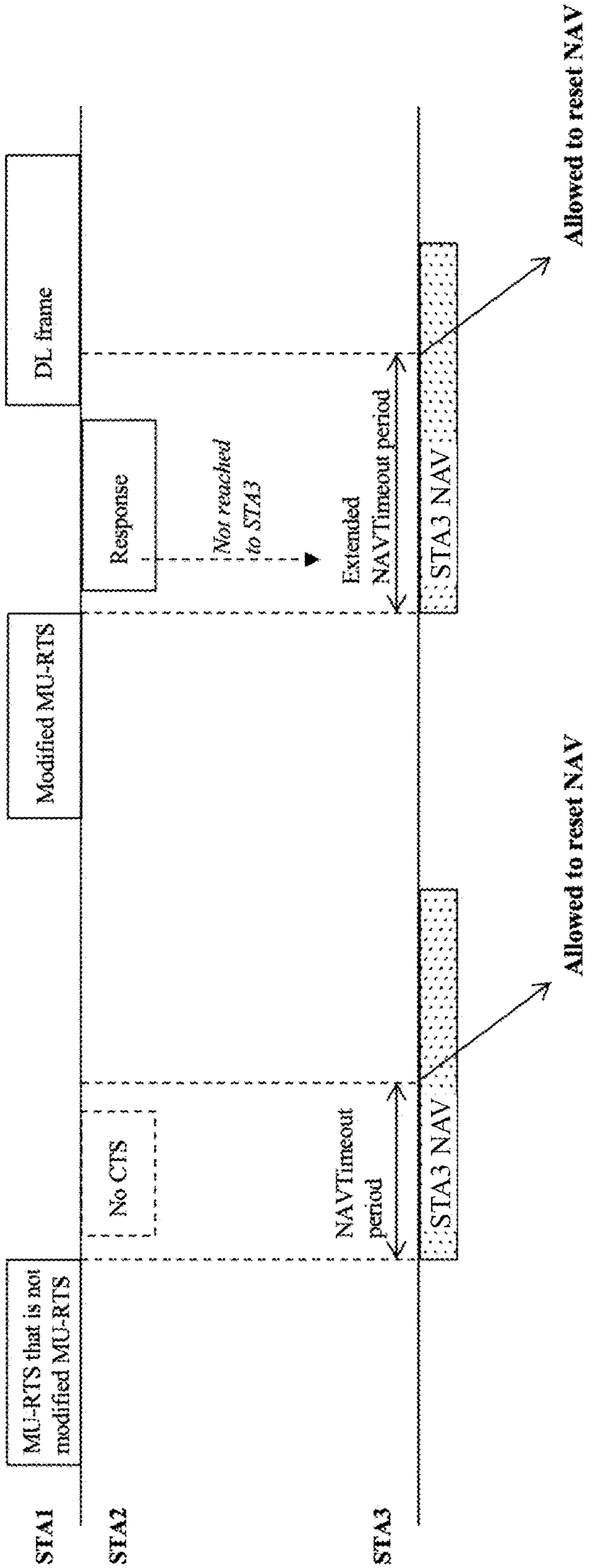
FIG. 26 illustrates TXOP sharing and NAV timeout according to another embodiment of the present invention.

FIG. 26 illustrates TXOP sharing and NAV timeout according to another embodiment of the present invention.

The embodiment of FIG. 26 may be intended to solve the problems described with reference to FIGS. 23 and 24. In addition, the foregoing descriptions may be omitted.

According to an embodiment of the present invention, an NAV timeout period may be determined differently based on whether an MU-RTS frame is a modified MU-RTS frame or not. For example, CTS_Time may be determined differently based on whether an MU-RTS frame is a modified MU-RTS frame or not. According to an embodiment, when an MU-RTS frame is a modified MU-RTS frame, an NAV timeout period may be longer than an NAV timeout period when the MU-RTS frame is not a modified MU-RTS frame. In the present embodiment, when an MU-RTS frame is a modified MU-RTS frame, an NAV timeout period may be referred to as an extended NAVTimeout period. The NAVTimeout period described in FIG. 23 and the extended NAVTimeout period may start at the same time point, that is, may start when the PHY-RXEND.indication primitive corresponding to an MU-RTS frame has been received. The NAVTimeout period described in FIG. 23 may be a time based on a CTS frame time. For example, the NAVTimeout period described in FIG. 23 may be a time based on the time it takes to transmit a CTS frame at 6 Mbps.

According to an embodiment of the present invention, when an STA has set an NAV based on a modified MU-RTS frame, the NAV may be reset provided that the STA has not successfully started PPDU reception during the extended NAVTimeout period. When an STA has set an NAV based on a modified MU-RTS frame, the NAV may not be reset even when the STA does not successfully start PPDU reception during the NAVTimeout period described in FIG. 23.

Additionally, when an STA has set an NAV based on an MU-RTS frame that is not a modified MU-RTS frame, the NAV may be reset when the STA has not successfully started PPDU reception during the NAVTimeout period described in FIG. 23.

According to an embodiment of the present invention, the extended NAVTimeout period may be determined based on length information included in a modified MU-RTS frame. For example, CTS_Time may be determined based on the length information included in the modified MU-RTS frame. Alternatively, the extended NAVTimeout period may be determined based on length information contained in a modified MU-RTS frame and a rate corresponding to the modified MU-RTS frame. For example, CTS_Time may be determined based on the length information included in the modified MU-RTS frame and the rate corresponding to the modified MU-RTS frame. For example, the length information included in the modified MU-RTS frame may be included in the UL Length subfield shown in FIG. 16. In another embodiment, the length information included in the modified MU-RTS frame may be included in the User Info field shown in FIG. 16. More specifically, the length information included in the modified MU-RTS frame may be included in a User Info field, among the USER Info Fields shown in FIG. 16, which indicates an STA receiving TXOP sharing.

In addition, am STA that receives TXOP sharing may transmit a PPDU based on the length information including in the modified MU-RTS frame. For example, the STA receiving TXOP sharing may transmit the first PPDU of a shared TXOP, based on the length information included in the modified MU-RTS frame. Alternatively, the STA receiving TXOP sharing may transmit the first PPDU that does not include a CTS frame of a shared TXOP based on the length information included in the modified MU-RTS frame. The first PPDU that does not contain the CTS frame of the shared TXOP may be the first PPDU after a PPDU including a CTS frame.

Referring to FIG. 26, there may be STA1, STA2, and STA3. In addition, STA1 may transmit an MU-RTS frame to STA2. For example, STA1 may transmit an MU-RTS frame that is not a modified MU-RTS frame. However, STA2, an intended receiver of the MU-RTS frame, may not respond to the MU-RTS frame. Therefore, STA2 may not transmit a CTS frame. In addition, STA3 may set an NAV based on the MU-RTS frame. However, since STA2 failed to transmit the CTS frame, STA3 may not have successfully started PPDU reception during the NAVTimeout period. In this case, STA3 may reset the set NAV based on an NAV timeout operation. This may be an operation based on an NAVTimeout period determined because a frame that caused STA3 to set the NAV is an MU-RTS frame that is not a modified MU-RTS frame. That is, because the frame that caused STA3 to set the NAV is a MU-RTS frame that is not a modified MU-RTS frame, the NAVTimeout period may be determined based on the time it takes to transmit a CTS frame.

In addition, STA1 may transmit a modified MU-RTS frame. In FIG. 26, frames preceding a modified MU-RTS frame may be omitted. STA2, which is the intended receiver of the modified MU-RTS frame, may respond to the modified MU-RTS frame. In addition, STA3 may set an NAV based on the modified MU-RTS frame. However, STA3 may not have received the response, transmitted by STA2, to the modified MU-RTS frame. For example, this may be because the response transmitted by STA2 to STA3 is not heard with sufficient power. For example, this may be because STA3 and STA2 are far away from each other. In this case, STA3 may not have successfully started PPDU reception during the NAVTimeout period described in FIG. 23. However, in this case, STA3 may successfully start PPDU reception during the extended NAVTimeout period. Therefore, STA3 may not perform an NAV timeout operation. The reason that STA3 may wait for the extended NAVTimeout period and not perform the NAV reset operation when the NAVTimeout period described in FIG. 23 has elapsed may be because the frame that caused STA3 to set the NAV was a MU-RTS frame which is a modified MU-RTS frame.

If STA2, which has received the modified MU-RTS frame, fails to respond, STA1 may perform a recovery operation. Therefore, the PPDU reception may be successfully started before STA3 performs the NAV timeout operation.

Alternatively, when STA2, which has received the modified MU-RTS frame, fails to respond, the sequence of a shared TXOP may be interrupted. In this case, STA3 may perform a NAV timeout operation to solve the problem of not being able to access a channel due to unnecessarily setting the NAV when no actual frame exchange is occurring.

In TXOP sharing, a problem, in which a scheduled STA that has received sharing of a part or all of the TXOPs set by an AP has difficulty in performing transmission due to the set NAV, and a solution method have been described with reference to FIG. 20. A solution according to another embodiment will be described with reference to FIG. 27. Hereinafter, a scheduled STA and an STA with which a TXOP is shared are the same STA, and the terms may be used interchangeably.

Figure 27:
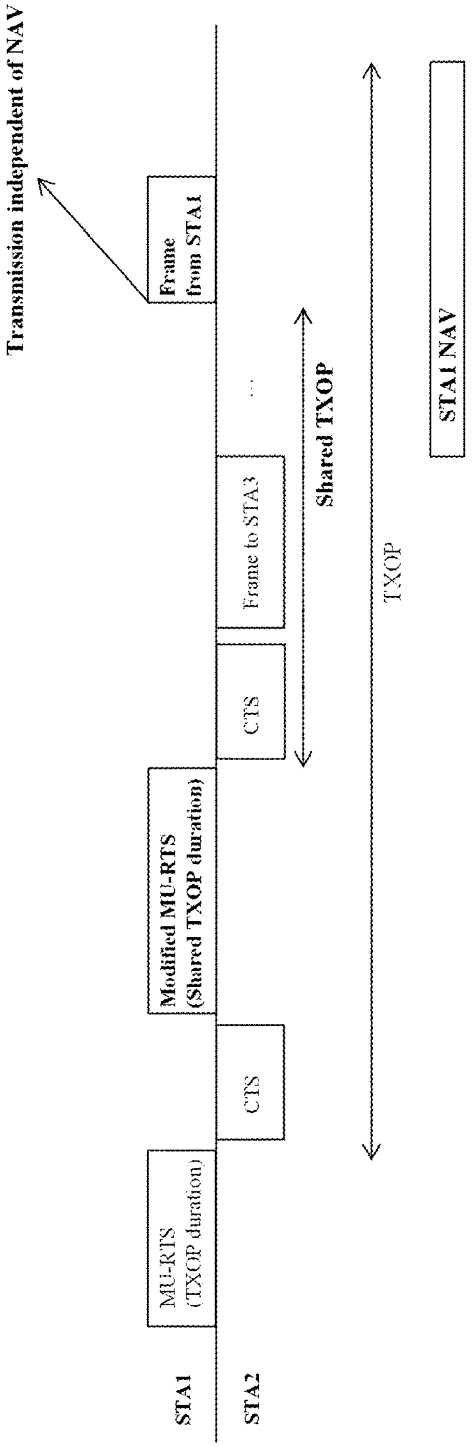
FIG. 27 illustrates the application of an NAV by an STA and an AP when TXOP sharing is applied according to an embodiment of the present invention.

FIG. 27 illustrates the application of an NAV by an STA and an AP when TXOP sharing is applied according to an embodiment of the present invention.

In TXOP sharing, a scheduled STA may not set an NAV. Specifically, in TXOP sharing, a scheduled STA may not set an NAV based on or a MU-RTS TXS trigger frame or a modified MU-RTS frame, which is an MU-RTS frame for TXOP sharing setting. An STA that has received an MU-RTS frame for TXOP sharing setting may not set an NAV based on an MU-RTS frame for TXOP sharing setting. An STA scheduled by an MU-RTS frame for TXOP sharing setting may not set an NAV based on the MU-RTS frame for TXOP sharing setting. Therefore, when an STA receives a trigger frame and when the trigger frame schedules TXOP sharing for the STA, the STA may not set an NAV based on the trigger frame. That is, depending on whether the trigger frame is a trigger frame for sharing a TXOP, the STA may set the NAV based on the received trigger frame. For example, when a received MU-RTS frame is a modified MU-RTS frame or an MU-RTS TXS trigger frame for sharing TXOP, the STA does not set the NAV based on the received MU-RTS frame. However, when a received MU-RTS frame is not a modified MU-RTS frame or a MU-RTS TXS trigger frame for TXOP sharing, the STA sets the NAV based on the received MU-RTS frame.

Additionally, in TXOP sharing, a scheduled STA may not set an NAV based on a frame received within a shared TXOP.

In this case, the wording "within the shared TXOP" may indicate the time until the shared TXOP ends, even when the duration of the shared TXOP is not fully utilized. In the case in which the scheduled STA in the shared TXOP transmits a PPDU and the PPDU includes only a frame that does not request an immediate response, the TXOP ends when the STA transmits the PPDU. Therefore, "within the shared TXOP" may be any time from when the TXOP sharing is set until when the scheduled STA of the TXOP sharing transmits the PPDU including only the frame that does not request an immediate response. When the scheduled STA of the TXOP sharing has signaled the end of the shared TXOP, the shared TXOP may be ended. Therefore, "within the shared TXOP" may be from when the TXOP sharing is set to when the scheduled STA of the TXOP sharing signals the end of the shared TXOP. Also, "within the TXOP" may be from when the TXOP sharing is set until the duration of the shared TXOP elapses. Alternatively, a shared TXOP may end when an STA that received TXOP sharing (or an STA that performed the TXOP sharing) transmits or receives a signal indicating that the shared TXOP is ending. In this case, the durations of the shared TXOP and a TXOP used by an AP for sharing (a TXOP initially acquired by the AP's frame) are equal to each other, or the duration of the shared TXOP is shorter than the duration of the TXOP. Therefore, the TXOP may not end when the shared TXOP ends. That is, in the case in which the duration of the shared TXOP is equal to the duration of the TXOP, when the shared TXOP ends, the TXOP may also ends, but in the case in which the duration of the shared TXOP is shorter than the duration of the TXOP, the TXOP may be maintained even when the shared TXOP ends.

In another specific embodiment, even when the shared TXOP ends before the duration of the shared TXOP, "within the duration of the shared TXOP" may be from when the TXOP sharing is set until the duration of the shared TXOP elapses.

As described above, in TXOP sharing, a scheduled STA may transmit frames regardless of an NAV. That is, when an NAV is set within a TXOP set by an AP (e.g., an NAV set by an intra-BSS PPDU), a scheduled STA may transmit a PPDU within a shared TXOP regardless of the set NAV. In other words, an STA with which a TXOP has been shared may transmit a frame while ignoring, within the shared TXOP, an NAV set by a frame transmitted by an STA sharing the TXOP. In this case, the shared TXOP may end earlier than an interval set by an MU-RTS frame. That is, an STA with which a TXOP has been shared may stop the sharing of the TXOP by transmitting signaling to request the stop of the sharing of the TXOP before an interval set by MU-RTS within the shared TXOP. For example, when a non-AP STA has received sharing of all or part of a TXOP from an AP, and when there is no PPDU which is to be transmitted (or pending), the non-AP STA may stop the sharing of the TXOP by transmitting signaling to end the TXOP sharing to the AP in order to end the shared TXOP. A time point at which the TXOP sharing is stopped may be either at a time point when the non-AP STA transmits a signaling requesting the stop of the TXOP sharing or a time point when the non-AP STA receives a response frame regarding the signaling. In this case, the signaling for the TXOP sharing may or may not require an immediate response. Furthermore, in this case, the TXOP sharing is stopped earlier than the interval which has been set by the MU-RTS frame and over which the TXOP is shared, and thus the non-AP STA may ignore the set NAV only until the end of the TXOOP sharing.

In this case, the STA that has set the TXOP sharing may also transmit a frame regardless of the NAV. In the embodiment of FIG. 27, a first STA (STA1) transmits, to a second STA (STA2), an MU-RTS frame for setting TXOP sharing. In this case, the first STA (STA1) may be an AP. The second STA (STA2) receives the MU-RTS frame for setting TXOP sharing and transmits a CTS frame in response to the MU-RTS frame for setting TXOP sharing. The second STA (STA2) performs a frame exchange within a shared TXOP. The first STA (STA1) may set an NAV based on a frame transmitted by the second STA (STA2) or transmitted to the second STA (STA2). For example, within the shared TXOP, the second STA (STA2) may perform a frame exchange with a third STA (STA3). In this case, the first STA (STA1) may set the NAV based on a frame transmitted by the third STA (STA3) to the second STA (STA2). In addition, the first STA (STA1) may set the NAV based on a frame transmitted by the second STA (STA2) to the third STA (STA3). When the first STA (STA1) sets the NAV in this manner, it may be difficult to transmit a frame within a TXOP from which the shared TXOP has been allocated. For example, when the first STA (STA1) tries to transmit a frame after the shared TXOP has ended, the first STA (STA1) may not transmit the frame due to the NAV set within the shared TXOP. Specifically, when a frame included in a PPDU transmitted within the shared TXOP is not a frame that solicits an immediate response from the first STA (STA1), the first STA (STA1) may not transmit the frame due to the set NAV.

The STA that has set TXOP sharing may transmit a frame regardless of an NAV within a TXOP acquired by the STA. In another specific embodiment, an STA that has set TXOP sharing may transmit a frame regardless of an NAV within a TXOP acquired from the end of the shared TXOP. The STA that has set the TXOP sharing may be a TXOP holder or an STA which has transmitted an MU-RTS frame for setting the TXOP sharing.

In this case, as described above, the shared TXOP may end earlier than an interval set by an MU-RTS frame. That is, an STA with which a TXOP has been shared may stop the sharing of the TXOP by transmitting signaling to request the stop of the sharing of the TXOP before an interval set by MU-RTS within the shared TXOP. For example, when a non-AP STA has received sharing of all or part of a TXOP from an AP, and when there is no PPDU which is to be transmitted (or pending), the non-AP STA may stop the sharing of the TXOP by transmitting signaling to end the TXOP sharing to the AP in order to end the shared TXOP. A time point at which the TXOP sharing is stopped may be either at a time point when the non-AP STA transmits a signaling requesting the stop of the TXOP sharing or a time point when the non-AP STA receives a response frame regarding the signaling. In this case, the signaling for the TXOP sharing may or may not require an immediate response. Furthermore, in this case, the TXOP sharing is stopped earlier than the interval which has been set by the MU-RTS frame and over which the TXOP is shared, and thus from a time point when the sharing of the TXOP ends, the AP may ignore an NAV set by the AP based on a PPDU transmitted or received by non-AP STAs.

In the above-described embodiments, transmitting a frame regardless of the NAV by an STA that has set TXOP sharing may indicate transmitting a frame regardless of an NAV set based on a frame exchanged by a scheduled STA within the TXOP sharing. This is because when the STA that has set TXOP sharing transmits a frame regardless of an NAV set based on a frame that is not exchanged by the scheduled STAs within the TXOP sharing, a frame exchange between other STAs may be interrupted. In addition, the STA may determine, based on a MAC header of a frame, whether the frame was exchanged by the scheduled STA within the TXOP sharing. Specifically, the STA may determine, based on an address field of a frame, whether the frame was exchanged by the scheduled STA within the TXOP sharing. The address field may include at least one of an RA field, a TA field, and a BSSID field. For example, when one field in the address field of a frame indicates the MAC address of the STA, the STA may determine that the frame was exchanged by the scheduled STA within the TXOP sharing. Furthermore, the STA may determine whether a frame was exchanged by the scheduled STA within the TXOP sharing, based on a preamble of a PPDU including the frame. Furthermore, the STA may determine whether a frame was exchanged by the scheduled STA within the TXOP sharing, based on at least one of BSS color and STA ID included in a preamble of a PPDU including the frame. When a preamble of a PPDU includes BSS color of BSS to which a scheduled STA of TXOP sharing belongs, and when the preamble of the PPDU includes an STA ID corresponding to the scheduled STA of the TXOP sharing, the STA may determine that a frame included in the PPDU was exchanged by the scheduled STA. In this case, the STA ID may be a value set based on the STA's AID.

In another specific embodiment, an STA that has set TXOP sharing may only use physical CS, such as CCA, as carrier sensing (CS) when transmitting a frame regardless of an NAV. Therefore, the STA may not perform virtual CS.

In the present specification, setting an NAV may be used interchangeably with updating an NAV. Also, in the present specification, an NAV may include at least one of an intra-BSS NAV or a basic NAV. Also, when no specific description is made of the type of NAV, the NAV may refer to an intra-BSS NAV. Furthermore, in the present specification, setting an NAV based on a frame by an STA may include setting the NAV based on a PPDU that includes the frame. Therefore, in the present specification, not setting an NAV based on a frame by an STA may include not setting the NAV based on a PPDU that includes the frame.

An MU-RTS frame for setting TXOP sharing may indicate a scheduled STA for a TXOP by using a MAC address, e.g., an RA field or a User Info field. Setting an NAV based on duration information of a frame or a PPDU may indicate that the most recently set NAV is set based on the duration information of the frame or the PPDU.

In another specific embodiment, a Duration/ID field of a frame transmitted within a shared TXOP, or a TXOP of a PPDU including the frame may be set based on the shared TXOP. Specifically, a Duration/ID field of a frame transmitted within a shared TXOP, or a TXOP of a PPDU including the frame may not be allowed to be set beyond the shared TXOP. This may prevent an STA, which has set the shared TXOP, from failing to transmit a frame even after the end of the shared TXOP.

That is, when a TXOP set by an AP is shared with an STA through a trigger frame, duration information (e.g., a Duration/ID field) included in a frame (e.g., a PPDU) transmitted within the shared TXOP may be set based on the shared TXOP. Specifically, a TXOP of a frame transmitted within a shared TXOP is not allowed to be set beyond the shared TXOP. Therefore, a TXOP of a PPDU transmitted to the AP that has set the TXOP or a third STA for peer-to-peer communication within the shared TXOP must end at the same time as or earlier than the shared TXO. Therefore, an end time point of duration indicated by the duration information included in the PPDU may be the same as or earlier than the end time point of the shared TXOP. In other words, when apart or all of the TXOP set by the AP is shared with a specific STA, a TXOP of a PPDU transmitted by the specific STA may not exceed the shared TXOP and must expire earlier than the shared TXOP. Therefore, an end time point of the length (or TXOP) of the PPDU transmitted by the specific STA to the AP or the third STA for P2P communication cannot be later than an end time point of the shared TXOP and must be earlier than the shared TXOP. In this case, since the end time point of the length (or TXOP) of the PPDU must be the same as or earlier than the end time point of the shared TXOP, a value indicated by duration information included in the PPDU may be set based on the shared TXOP.

In another specific embodiment, an STA that has set a shared TXOP may not set an NAV based on a frame exchanged by a scheduled STAs for TXOP sharing.

Within a shared TXOP, an STA that has set the shared TXOP may not transmit a trigger frames. This is because when the STA that has set the shared TXOP transmits a trigger frame within the shared TXOP, a frame triggered by the trigger frame may overlap a frame exchange by a scheduled STA. Also, when the STA that has set the shared TXOP transmits a trigger frame to a scheduled STA within the shared TXOP, the scheduled STA may be required to transmit a response to the trigger frame. This may not serve the purpose of setting the shared TXOP. In these embodiments, the trigger frame may include an MU-RTS frame for setting TXOP sharing. In these embodiments, after a shared TXOP ends, the STA that has set the shared TXOP may transmit a trigger frame.

In the above-described embodiments, trigger frames, which are not transmitted by the STA that has set a shared TXOP, may be all trigger frames except a trigger frame for only the scheduled STA of the TXOP sharing. Therefore, the STA that has set a shared TXOP may transmit a trigger frame only for the scheduled STA of the TXOP sharing within the shared TXOP. For example, an STA that has set a shared TXOP may transmit an MU-RTS frame for setting TXOP sharing in order to extend the shared TXOP. In this case, an STA that receives the MU-RTS frame for setting TXOP sharing may start a frame exchange without transmitting a CTS frame. Specifically, in TXOP sharing, when only a frame exchange with an STA that has set the TXOP sharing is allowed, an STA that receives an MU-RTS frame for setting the TXOP sharing may start a frame exchange without transmitting a CTS frame.

In the present specification, an operation performed during a shared TXOP may be an operation in which the shared TXOP is utilized by a scheduled STA for TXOP sharing. The operation performed during the shared TXOP may be transmitting a frame by the scheduled STA of the TXOP sharing in response to an MU-RTS frame for setting the TXOP sharing, or transmitting a frame by the scheduled STA of the TXOP sharing within the shared TXOP. In this case, a response frame to the MU-RTS frame for setting the TXOP sharing may be a CTS frame.

Signaling for an TXOP sharing operation will be described. An STA may signal whether the STA is cable of operating as a scheduled STA of TXOP sharing. The STA may signal whether the STA is capable of operating as a scheduled STA of TXOP sharing through an EHT Capabilities element. In addition, the STA may use a (re)association request frame or a probe request frame to transmit signaling indicating that the STA is capable of operating as the scheduled STA for TXOP sharing. An STA that wants to set TXOP sharing may only transmit an MU-RTS frame for setting the TXOP sharing only to an STA that has signaled that the STA can operate as a scheduled STA for the TXOP sharing. In addition, the STA that wants to set TXOP sharing not transmit the MU-RTS frame for setting the TXOP sharing to an STA that has signaled that the STA cannot operate as a scheduled STA for the TXOP sharing.

Furthermore, the MU-RTS frame may include information indicating whether the MU-RTS frame is an MU-RTS frame for setting TXOP sharing. In addition, when the MU-RTS frame is an MU-RTS frame for setting the TXOP sharing, the MU-RTS frame may also indicate the mode of the TXOP sharing. The mode of the TXOP sharing may dictate which STA a scheduled STA for the TXOP sharing may transmit a frame to. For example, in the first mode, the scheduled STA of the TXOP sharing may transmit a frame only to the STA that has set the TXOP sharing. Also, in the second mode, the scheduled STA for the TXOP sharing can send frames to an STA that has set the TXOP sharing, or may transmit a P2P frame. When the value of the information indicating whether the MU-RTS frame is an MU-RTS frame for setting TXOP sharing is 1, the first mode may be indicated. Additionally, when the value of the information indicating whether the MU-RTS frame is an MU-RTS frame for setting TXOP sharing is 2, the second mode may be indicated. Additionally, when the value of the information indicating whether the MU-RTS frame is an MU-RTS frame for setting TXOP sharing is 0, it may be indicated that the MU-RTS frame is not a MU-RTS frame for setting TXOP sharing.

In the preceding embodiments, the GI and HE-LTF Type subfield may indicate whether the MU-RTS frame is a MU-RTS frame for setting TXOP sharing. When the MU-RTS frame is a MU-RTS frame for setting TXOP sharing, the GI and HE-LTF Type subfield may indicate the mode of TXOP sharing as described above. In this case, the GI and HE-LTF Type subfield may be referred to as a TXOP Sharing Mode subfield. The TXOP Sharing Mode subfield may be a subfield from the 21st bit B20 to the $22^{nd}$ bit B21 of the Common Info field in FIG. 16.

A method for ending TXOP sharing will be described with reference to FIG. 28.

Figure 28:
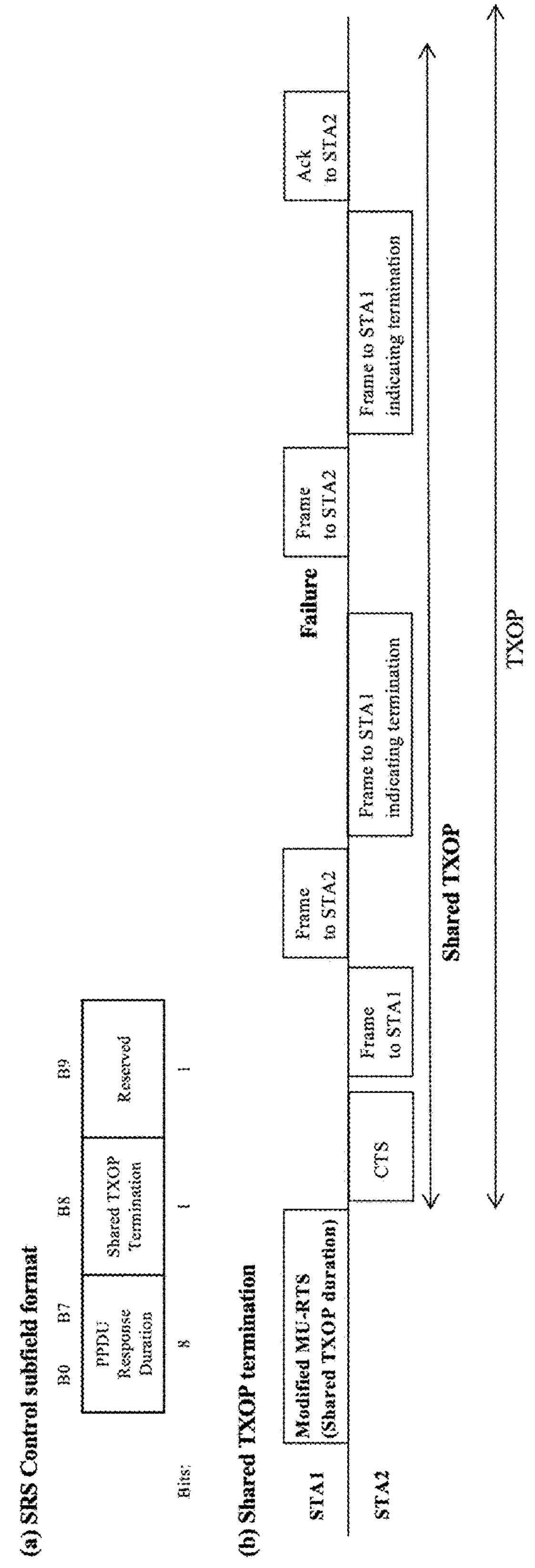
FIG. 28 illustrates an STA terminating TXOP sharing according to an embodiment of the present invention.

FIG. 28 illustrates an STA terminating TXOP sharing according to an embodiment of the present invention.

A scheduled STA of TXOP sharing may signal the termination of the TXOP sharing. When an STA that has set the TXOP sharing receives the TXOP sharing termination signaling, the STA that has set the TXOP sharing may be a TXOP holder. In addition, when the STA that has set the TXOP sharing receives the TXOP sharing termination signaling, the STA that has set the TXOP sharing may transmit a frame or a PPDU. Specifically, when the STA that has set the TXOP sharing receives the TXOP sharing termination signaling, the STA that has set the TXOP sharing may transmit a frame or a PPDU even within the shared TXOP. In addition, when the scheduled STA of the TXOP sharing has signaled the termination of the TXOP sharing, the scheduled STA of the TXOP sharing may not transmit any frame or any PPDU within the remaining shared TXOP.

The scheduled STA of the TXOP sharing may use an A-Control subfield to signal the termination of the TXOP sharing. Specifically, a single response scheduling (SRS) Control subfield of the A-Control subfield may signal the termination of the TXOP sharing. An STA that has received the SRS Control subfield may respond to a frame including the SRS Control subfield by using a PPDU that is not a TB PPDU. In addition, the length of the response PPDU for the frame including the SRS Control subfield may be determined based on the SRS Control subfield. Specifically, the STA that has received the SRS Control subfield may set the length of the response PPDU for the frame including the SRS Control subfield to a length indicated by the SRS Control subfield.

FIG. 28A illustrates the format of an SRS Control subfield. As described above, the SRS Control subfield may include a field indicating the length of a PPDU that is a response to a MAC frame including the SRS Control subfield. In this case, the field may be referred to as a PPDU Response Duration field. The PPDU Response Duration field may indicate time in units of 4 us. The length of the PPDU indicated by the PPDU Response Duration field may be a value of the PPDU Response Duration field×4 us. In addition, the PPDU Response Duration field may be an 8-bit field.

In addition, an STA may signal capability for the SRS Control subfield. Specifically, the STA may signal whether the STA is capable of receiving the SRS Control subfield. In addition, the STA may signal whether the STA is capable of responding to a frame including the SRS Control subfield. The STA may not transmit the SRS Control subfield to an STA signaling that the STA does not support an operation regarding the SRS Control subfield. The STA may transmit the SRS Control subfield to an STA signaling that the STA supports an operation regarding the SRS Control subfield.

Additionally, the SRS Control field may include a field that signals the termination of TXOP sharing. The field that signals the termination of the TXOP sharing may be referred to as a Shared TXOP Termination field. The Shared TXOP Termination field may be a 1-bit field. When the value of the Shared TXOP Termination field is 1, the Shared TXOP Termination field may indicate that the TXOP sharing is terminated. When the value of the Shared TXOP Termination field is 0, the Shared TXOP Termination field may indicate that the TXOP sharing is not terminated. When an STA receives a QoS Data frame or a QoS Null frame with a value of 1 in the Shared TXOP Termination field, the STA may determine that the TXOP sharing is terminated.

In another specific embodiment, a frame with predetermined settings may signal the termination of TXOP sharing. In this case, the frame with the predetermined settings may be a Qos Null frame. Specifically, the frame with the predetermined settings may be a QoS Null frame that does not include an A-Control subfield. In addition, the frame with the predetermined settings may be a QoS Null frame that does not include an SRS Control subfield. A scheduled STA of the TXOP sharing may signal the termination of the TXOP sharing by transmitting the frame with the predetermined settings. In addition, when an STA that has set the TXOP sharing receives the frame with the predetermined settings, the STA that has set the TXOP sharing may determine that the TXOP sharing is terminated.

The scheduled STA of the TXOP sharing has transmit TXOP sharing termination signaling, but the STA that has set the TXOP sharing may not receive the signaling. In this case, the scheduled STA of the TXOP sharing may determine that the TXOP sharing has been terminated, and may not transmit a frame. Also, the STA that has set the TXOP sharing may determine that the TXOP sharing has not been terminated, and may not transmit a frame.

In a specific embodiment, when the scheduled STA of the TXOP sharing, that signaled the termination of the TXOP sharing, receives a response to the signaling, the scheduled STA of the TXOP sharing may determine that the TXOP sharing has been terminated. At this time, the scheduled STA of the TXOP sharing may determine that the TXOP sharing has been terminated, and may not transmit a frame. The response to the TXOP sharing termination signaling may be an immediate response. Additionally, the response to the TXOP sharing termination signaling may be an ACK. However, such an embodiment may be applied only when the Ack policy for TXOP sharing termination signaling is configured to require an immediate response. Specifically, when the Ack policy for TXOP sharing termination signaling requires an immediate response, the scheduled STA of the TXOP sharing, which signaled the termination of the TXOP sharing, may determine that the TXOP sharing has been terminated when the scheduled STA of the TXOP sharing has received a response to the signaling. When the Ack Policy for TXOP sharing termination signaling does not require an immediate response, such as in the case of No ACK, the scheduled STA of the TXOP sharing, which that signaled the termination of the TXOP sharing, may determine that the TXOP sharing has been terminated even when the scheduled STA of the TXOP sharing does not receive a response to the signaling. In this case, the scheduled STA of the TXOP sharing may determine that the TXOP sharing is terminated when the TXOP sharing termination signaling has been transmitted. In addition, when the transmission of the TXOP sharing termination signaling fails, an error recovery operation may be performed. Specifically, the scheduled STA of the TXOP sharing may perform an error recovery operation. In addition, the STA that has set the TXOP sharing may perform an error recovery operation.

In FIG. 28B, a first STA (STA1) transmits, to a second STA (STA2), an MU-RTS frame for setting TXOP sharing. In this case, the first STA (STA1) may be an AP. The second STA (STA2) receives the MU-RTS frame for setting the TXOP sharing, and transmits a CTS frame in response to the MU-RTS frame for setting the TXOP sharing. Within a shared TXOP, the second STA (STA2) transmits, to the first STA (STA1), TXOP sharing termination signaling (Frame to STA1 indicating termination). The first STA (STA1) fails in receiving the TXOP sharing termination signaling (Frame to STA1 indicating termination). At this case, the first STA (STA1) determines that the TXOP sharing has not been terminated. As described above, the first STA (STA1) or the second STA (STA1) may perform an error recovery operation. After the error recovery operation, the second STA (STA2) transmits, to the first STA (STA1), the TXOP sharing termination signaling (Frame to STA1 indicating termination). The first STA (STA1) transmits, to the second STA (STA2), an ACK (Ack to STA2) in response to the TXOP sharing termination signaling (Frame to STA1 indicating termination). The second STA (STA2), which has received the ACK (Ack to STA2), determines that the TXOP sharing has been terminated.

Even after the TXOP sharing has been terminated, a scheduled STA of the TXOP sharing may transmit a frame when an STA that has set the TXOP sharing has indicated a response.

As described above, an SRS Control subfield may not be transmitted to an STA signaling that the STA does not support an operation regarding the SRS Control subfield. When the termination of TXOP sharing is signaled via the SRS Control subfield, the STA signaling that the STA does not support an operation regarding the SRS Control subfield may not receive the TXOP sharing termination signaling. Therefore, the scheduled STA of the TXOP sharing may transmit an SRS Control subfield signaling the termination of the TXOP sharing even to the STA which has signaled that the STA does not support an operation regarding the SRS Control subfield. The SRS Control subfield signaling the termination of the TXOP sharing may be an SRS Control subfield in which a TXOP Termination subfield has a value of 1. The scheduled STA of the TXOP sharing may not transmit an SRS Control subfield, in which a TXOP Termination subfield has a value of zero, to the STA which has signaled that the STA does not support an operation regarding the SRS Control subfield. In addition, the restriction of not transmitting an SRS Control subfield to an STA which has signaled that the STA does not support the operation regarding the SRS Control subfield may be applied only when the SRS Control subfield is transmitted outside a shared TXOP.

When the SRS Control subfield signals the termination of TXOP sharing, a PPDU Response Duration subfield may be configured as a reserved field. All bits in the reserved field may be set to 0. When the SRS Control subfield does not signal the termination of TXOP sharing, the PPDU Response Duration subfield may indicate the length of a PPDU including a frame which is a response to a frame including the SRS Control subfield.

When the SRS Control subfield signals the termination of the TXOP sharing, an STA that received the SRS Control subfield may not transmit a response to the frame including the SRS Control subfield. In another specific embodiment, when the SRS Control subfield signals the termination of TXOP sharing, the STA that received the SRS Control subfield may transmit a response to the frame including the SRS Control subfield, regardless of information signaled by the SRS Control field. In this case, the STA that received the SRS Control subfield may transmit a response PPDU regardless of the length of the response PPDU for the frame including the SRS Control subfield, signaled by the SRS Control subfield.

An STA that received an SRS Control subfield within a shared TXOP may not transmit a response to a frame including the SRS Control subfield. In another specific embodiment, an STA that received an SRS Control subfield within a shared TXOP may transmit a response to the frame including the SRS Control subfield regardless of information signaled by the SRS Control field. In this case, the STA that received the SRS Control subfield may transmit a response PPDU regardless of the length of the response PPDU for the frame including the SRS Control subfield, signaled by the SRS Control subfield.

Alternatively, an STA receiving an SRS Control subfield within a shared TXOP may not respond based on the duration information (a PPDU Response Duration subfield value) included in the SRS Control subfield. For example, an STA that receives an SRS Control subfield within a shared TXOP may respond regardless of duration information (a PPDU Response Duration subfield value) included in the SRS Control subfield.

According to an embodiment of the present invention, a modified MU-RTS frame may not be the first frame within a TXOP. For example, to obtain a TXOP, a TXOP holder may not transmit a modified MU-RTS frame, but may transmit other frames. This allows an STA to set an NAV before setting the NAV based on a modified MU-RTS frame. That is, the STA may set the NAV based on a frame transmitted earlier than the modified MU-RTS frame in the TXOP. The above-described NAV timeout operation may be performed when the NAV setting has been performed based on an RTS frame or an MU-RTS frame, and may reduce instances of setting an NAV based on an RTS frame or an MU-RTS frame by allowing a frame to be transmitted earlier than the modified MU-RTS frame in the TXOP. Also, duration information included in the modified MU-RTS frame may not increase the TXOP.

Figure 29:
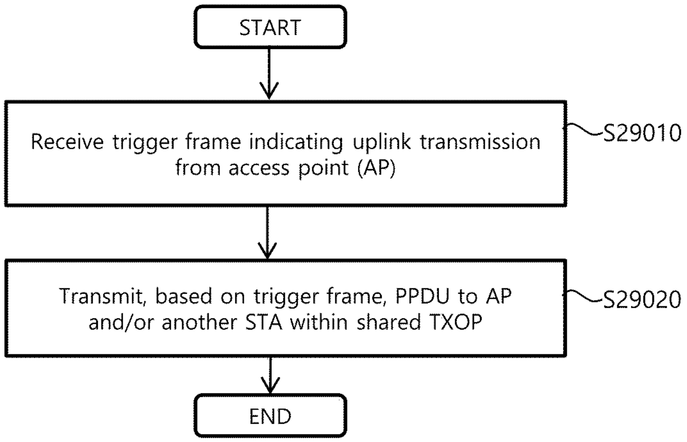
FIG. 29 is a flowchart illustrating one example of an operation of an STA according to an embodiment of the present invention.

FIG. 29 is a flowchart illustrating one example of an operation of an STA according to an embodiment of the present invention.

Referring to FIG. 29, an STA may receive sharing of a part or all of a TXOP from an AP, and may transmit, based thereon, a PPDU within the shared TXOP.

Specifically, an STA may receive, from an access point (AP), a trigger frame indicating an uplink transmission (S29010). The trigger frame may be used to allow a part or all of a transmission opportunity (TXOP) acquired by the AP to be shared with the STA, and may be referred to as a modified MU-RTS frame or an MU-RTS TXS trigger frame when used to share a part or all of the TXOP. In this case, the STA may use the above-described type field of the trigger frame to recognize whether the received frame is a frame for sharing of the TXOP.

Thereafter, the STA may transmit, based on the trigger frame, a PPDU to the AP and/or another STA within the shared TXOP (S29020). The PPDU may include duration information indicating a TXOP for transmission of the PPDU, and the duration information may be set based on the shared TXOP.

An end time point of duration indicated by the duration information may be the same as or end earlier than an end time point of the shared TXOP.

When a network allocation vector (NAV) is set by a frame transmitted by the AP within a TXOP, the PPDU is transmitted regardless of the set NAV within the shared TXOP.

In the case in which a NAV and a NAV timeout period indicating an end time of the NAV are set by another STA within the shared TXOP based on the trigger frame, even when the NAV timeout period expires within the shared TXOP, the NAV set by the other STA within the shared TXOP may not be reset.

The trigger frame includes a subfield indicating whether the TXOP is shared by the trigger frame.

When the subfield indicates sharing of the TXOP, a value of the subfield indicates whether transmission to and from the other STA are possible within the shared TXOP.

The trigger frame includes a type field indicating a type of the trigger frame, and the sharing of a part or all of the TXOP is set based on the type of the trigger frame indicated by the type field.

The above description of the present invention is for illustrative purposes, and a person skilled in the art to which the present invention belongs will understand that modifications to other specific forms can be easily made without changing the technical idea or essential features of the present invention. It should therefore be understood that the above-described embodiments are illustrative and not limiting in all respects. For example, each element described in a single form may also be implemented in a distributed form, and likewise, elements described as distributed may also be implemented in a combined form.

The scope of the present invention is defined by the following claims rather than by the detailed description above, and the meaning and scope of the claims and all modifications or variations derived from the equivalents thereof should be construed as being within the scope of the present invention.

What is claimed is:

1. A station (STA) configured to operate in a wireless communication system, comprising:
- a transceiver; and
- a processor configured to control the transceiver, wherein the processor is configured to:
- receive a trigger frame from an access point (AP), wherein the trigger frame is used to share a specific time, which is part or all of a transmission opportunity (TXOP) obtained by the AP, with the STA; and
- transmit a non-trigger-based physical layer protocol data unit (non-TB PPDU) to the AP and/or another STA within the specific time based on the trigger frame,
- wherein the non-TB PPDU includes duration information,
- wherein the duration information is set based on the specific time, and
- wherein the processor is configured to not reset a network allocation vector (NAV) based on expiration of a NAV timeout within the specific time when the NAV timeout indicating termination of the NAV and the NAV are set based on the trigger frame.

2. The STA of claim 1,
- wherein an end time indicated by the duration information is no later than an end time of the specific time.

3. The STA of claim 1, wherein the processor is further configured to:
- transmit a specific frame, which is a last frame transmitted by the STA within the specific time,
- wherein when the specific frame is transmitted:
  - the specific time is returned to the AP, and
  - the STA performs transmission regardless of an intra-BSS NAV until the specific time is returned.

4. The STA of claim 1,
- wherein the trigger frame comprises a specific field indicating whether the TXOP is shared by the trigger frame.

5. The STA of claim 4,
- wherein a value of the specific field indicates whether transmission to or reception from at least one of the AP or another STA is possible within the specific time when the specific field indicates sharing of the TXOP.

6. The STA of claim 1,
- wherein the trigger frame comprises a type field indicating a type of the trigger frame, and
- wherein the specific time configured for sharing part or all of the TXOP is set based on the type of the trigger frame indicated by the type field.

7. A method for transmitting a frame by a station (STA) configured to operate in a wireless communication system, the method comprising:
- receiving a trigger frame from an access point (AP),
- wherein the trigger frame is used to share a specific time, which is part or all of a transmission opportunity (TXOP) obtained by the AP, with the STA; and
- transmitting a non-trigger-based physical layer protocol data unit (non-TB PPDU) to the AP and/or another STA within the specific time based on the trigger frame,
- wherein the non-TB PPDU includes duration information,
- wherein the duration information is set based on the specific time; and
- wherein a NAV is not reset based on expiration of a network allocation vector (NAV) timeout within the specific time when the NAV timeout indicating termination of the NAV and the NAV are set based on the trigger frame.

8. The method of claim 7, wherein an end time indicated by the duration information is no later than an end time of the specific time.

9. The method of claim 7, wherein the method further comprises:
- transmitting a specific frame, which is a last frame transmitted by the STA within the specific time,
- wherein when the specific frame is transmitted:
  - the specific time is returned to the AP, and
  - the STA performs transmission regardless of an intra-BSS NAV until the specific time is returned.

10. The method of claim 7, wherein the trigger frame comprises a specific field indicating whether the TXOP is shared by the trigger frame.

11. The method of claim 10,
- wherein a value of the specific field indicates whether transmission to or reception from at least one of the AP or another STA is possible within the specific time when the specific field indicates sharing of the TXOP.

12. The method of claim 7, wherein the trigger frame comprises a type field indicating a type of the trigger frame, and wherein the specific time configured for sharing part or all of the TXOP is set based on the type of the trigger frame indicated by the type field.

* * * * *